US012001999B2

(12) United States Patent
Simpson

(10) Patent No.: US 12,001,999 B2
(45) Date of Patent: *Jun. 4, 2024

(54) PRICE BASED NAVIGATION

(71) Applicant: CirclesX LLC, Houston, TX (US)

(72) Inventor: Erik M Simpson, Houston, TX (US)

(73) Assignee: CIRCLESX LLC, Houston, TX (US)

( * ) Notice: Subject to any disclaimer, the term of this patent is extended or adjusted under 35 U.S.C. 154(b) by 1048 days.

This patent is subject to a terminal disclaimer.

(21) Appl. No.: 16/242,967

(22) Filed: Jan. 8, 2019

(65) Prior Publication Data

US 2019/0251509 A1 Aug. 15, 2019

Related U.S. Application Data

(63) Continuation-in-part of application No. 16/239,485, filed on Jan. 3, 2019, which is a continuation-in-part
(Continued)

(51) Int. Cl.
*G06Q 10/0835* (2023.01)
*G06Q 30/08* (2012.01)

(52) U.S. Cl.
CPC ....... *G06Q 10/08355* (2013.01); *G06Q 30/08* (2013.01)

(58) Field of Classification Search
CPC .. G06Q 30/08; G06Q 10/08355; G06Q 10/02; G06Q 50/30; G06F 2209/5014;
(Continued)

(56) References Cited

U.S. PATENT DOCUMENTS

| 4,476,954 A | 10/1984 | Johnson et al. |
| D318,073 S | 7/1991 | Jang |

(Continued)

FOREIGN PATENT DOCUMENTS

| CN | 107341968 A | 11/2017 |
| GB | 2539556 A | 12/2016 |

(Continued)

OTHER PUBLICATIONS

PCT International Search Report and Written Opinion; PCT/US2020/027543, dated Jul. 1, 2020.
(Continued)

*Primary Examiner* — Fahd A Obeid
*Assistant Examiner* — Avia Salman
(74) *Attorney, Agent, or Firm* — Pramudji Law Group PLLC; Ari Pramudji

(57) ABSTRACT

Implementations of various price based navigation methods and systems based on a network, GPS system, mobile computing devices, servers, transportation unit data transformations, forward commodity market servers, grouping instructions for virtual hubs, transparent open access pricing systems, blockchain audit and safety instructions, virtual hub instructions, banking and credit account instructions, priced based GPS map routing algorithms in a simple easy to use graphical user interface format for mobile, audio interface or virtual interface computing over various mediums which are connected via a network to transact and trade transportation seats or capacity units in airline transport, subway transport, train transport, automobile transport, autonomous vehicle transport, taxi transport, space transport, package freight transport, tractor trailer freight transport, cargo freight transport, container freight transport, virtual transport, underground transport, ship or sea transport, public transport, private transport or drone transport on a computer, mobile computer device, audio computer device, virtual reality computer device or mixed reality computing device.

20 Claims, 41 Drawing Sheets

Related U.S. Application Data of application No. 16/183,647, filed on Nov. 7, 2018, now Pat. No. 11,861,527, which is a continuation-in-part of application No. 16/167,525, filed on Oct. 22, 2018, now Pat. No. 11,810,023, which is a continuation-in-part of application No. 15/877,393, filed on Jan. 23, 2018, which is a continuation-in-part of application No. 15/266,326, filed on Sep. 15, 2016, now Pat. No. 11,138,827.

(58) Field of Classification Search
CPC .............. G16Y 10/40; B60K 2370/166; B60K 2370/175; B60K 2370/178; B60K 2370/56; B60K 2370/563; B60W 2040/0881; B60W 2556/00; B60W 30/025; B60W 40/09; B60W 50/00; B60W 60/00; G05D 2201/0213; G05D 1/0088; G05D 1/0212; G05D 2201/0212
See application file for complete search history.

(56) References Cited

U.S. PATENT DOCUMENTS

| | | | |
|---|---|---|---|
| 5,412,560 A | 5/1995 | Dennison | |
| 5,604,676 A | 2/1997 | Penzias | |
| 5,726,885 A | 3/1998 | Klein et al. | |
| 5,751,245 A | 5/1998 | Janky et al. | |
| 5,973,619 A | 10/1999 | Paredes | |
| 6,175,831 B1 | 1/2001 | Weinreich et al. | |
| 6,240,396 B1* | 5/2001 | Walker | G06Q 10/02 705/13 |
| 6,285,999 B1 | 9/2001 | Page | |
| D453,945 S | 2/2002 | Shan | |
| 6,356,838 B1 | 3/2002 | Paul | |
| 6,421,606 B1 | 7/2002 | Asai et al. | |
| 6,434,530 B1 | 8/2002 | Sloane et al. | |
| D468,738 S | 1/2003 | Lin | |
| D469,089 S | 1/2003 | Lin | |
| 6,609,103 B1 | 8/2003 | Kolls | |
| 6,618,062 B1 | 9/2003 | Brown et al. | |
| 6,646,659 B1 | 11/2003 | Brown et al. | |
| 6,663,564 B2 | 12/2003 | Miller-Kovach et al. | |
| 6,708,879 B2 | 3/2004 | Hunt | |
| 6,850,907 B2 | 2/2005 | Lutnick et al. | |
| 7,090,638 B2 | 8/2006 | Vidgen | |
| 7,373,320 B1 | 5/2008 | Mcdonough | |
| D590,396 S | 4/2009 | Lo | |
| 7,584,123 B1 | 9/2009 | Karonis et al. | |
| 7,634,442 B2 | 12/2009 | Alvarado et al. | |
| 7,680,690 B1 | 3/2010 | Catalano | |
| 7,680,770 B1 | 3/2010 | Buyukkokten et al. | |
| 7,711,629 B2 | 5/2010 | Laurent et al. | |
| 7,747,739 B2 | 6/2010 | Bridges et al. | |
| 7,756,633 B2 | 7/2010 | Huang et al. | |
| 7,788,207 B2 | 8/2010 | Alcorn et al. | |
| 7,886,166 B2 | 2/2011 | Shnekendorf et al. | |
| D638,879 S | 5/2011 | Suto | |
| 7,987,110 B2 | 7/2011 | Cases et al. | |
| 8,024,234 B1 | 9/2011 | Thomas et al. | |
| 8,065,191 B2 | 11/2011 | Senior | |
| D650,385 S | 12/2011 | Chiu | |
| 8,121,780 B2 | 2/2012 | Gerdes et al. | |
| 8,249,946 B2 | 8/2012 | Froseth et al. | |
| 8,296,335 B2 | 10/2012 | Bouve et al. | |
| 8,388,451 B2 | 3/2013 | Auterio et al. | |
| 8,570,244 B2 | 10/2013 | Mukawa | |
| 8,762,035 B2 | 6/2014 | Levine et al. | |
| 8,798,593 B2 | 8/2014 | Haney | |
| 8,918,411 B1 | 12/2014 | Latif et al. | |
| 8,920,175 B2 | 12/2014 | Black et al. | |
| 8,930,490 B2 | 1/2015 | Brown et al. | |
| 8,968,099 B1 | 3/2015 | Hanke et al. | |
| 9,011,153 B2 | 4/2015 | Bennett et al. | |
| 9,020,763 B2 | 4/2015 | Faaborg et al. | |
| 9,077,204 B2 | 7/2015 | More et al. | |
| 9,092,826 B2 | 7/2015 | Deng et al. | |
| 9,159,088 B2 | 10/2015 | Dillahunt et al. | |
| 9,213,957 B2 | 12/2015 | Stefik et al. | |
| 9,274,540 B2 | 1/2016 | Anglin et al. | |
| 9,292,764 B2 | 3/2016 | Yun et al. | |
| 9,387,928 B1 | 7/2016 | Gentry et al. | |
| 9,389,090 B1 | 7/2016 | Levine et al. | |
| 9,389,094 B2 | 7/2016 | Brenner et al. | |
| 9,410,963 B2 | 8/2016 | Martin et al. | |
| 9,436,923 B1 | 9/2016 | Sriram et al. | |
| 9,528,972 B2 | 12/2016 | Minvielle | |
| 9,558,515 B2 | 1/2017 | Babu et al. | |
| 9,665,983 B2 | 5/2017 | Spivack | |
| 9,880,577 B2 | 1/2018 | Dyess et al. | |
| 9,952,042 B2 | 4/2018 | Abovitz et al. | |
| 9,960,637 B2 | 5/2018 | Sanders et al. | |
| 9,978,282 B2 | 5/2018 | Lambert et al. | |
| 10,262,289 B2 | 4/2019 | Vaananen | |
| 10,395,332 B1 | 8/2019 | Konrardy et al. | |
| 10,403,050 B1 | 9/2019 | Beall et al. | |
| 10,460,520 B2 | 10/2019 | Simpson et al. | |
| 10,533,850 B2 | 1/2020 | Abovitz et al. | |
| 10,586,084 B2 | 3/2020 | Burch et al. | |
| 10,685,503 B2 | 6/2020 | Ricci | |
| 10,737,585 B2 | 8/2020 | Chaudhary et al. | |
| 10,872,381 B1 | 10/2020 | Leise et al. | |
| 10,832,337 B1 | 11/2020 | Floyd et al. | |
| D910,758 S | 2/2021 | Leong | |
| 11,138,827 B2 | 10/2021 | Simpson | |
| 11,288,563 B2 | 3/2022 | Lee et al. | |
| 11,296,897 B2 | 4/2022 | Endress et al. | |
| 11,298,017 B2 | 4/2022 | Tran | |
| 11,298,591 B2 | 4/2022 | Evancha | |
| 11,555,709 B2 | 1/2023 | Simpson | |
| 11,586,993 B2 | 2/2023 | Handler et al. | |
| D993,316 S | 7/2023 | Lin | |
| D1,000,137 S | 10/2023 | Shuster | |
| 2002/0004788 A1 | 1/2002 | Gros et al. | |
| 2002/0013718 A1 | 1/2002 | Cornwell | |
| 2002/0013761 A1 | 1/2002 | Bundy | |
| 2002/0017997 A1 | 2/2002 | Wall | |
| 2002/0065738 A1 | 5/2002 | Riggs et al. | |
| 2002/0065766 A1 | 5/2002 | Brown et al. | |
| 2002/0133456 A1 | 9/2002 | Lancaster et al. | |
| 2002/0161689 A1 | 10/2002 | Segal | |
| 2003/0055776 A1 | 3/2003 | Samuelson | |
| 2003/0191725 A1* | 10/2003 | Ratliff | G06Q 30/06 705/26.1 |
| 2003/0233311 A1 | 12/2003 | Bramnick et al. | |
| 2004/0019552 A1 | 1/2004 | Tobin | |
| 2004/0115596 A1 | 6/2004 | Snyder et al. | |
| 2004/0249742 A1 | 12/2004 | Laurent et al. | |
| 2004/0260581 A1 | 12/2004 | Baranowski et al. | |
| 2005/0021346 A1 | 1/2005 | Nadan et al. | |
| 2005/0027637 A1 | 2/2005 | Kohler | |
| 2005/0132070 A1 | 6/2005 | Redlich et al. | |
| 2005/0288974 A1 | 12/2005 | Baranowski et al. | |
| 2005/0288986 A1 | 12/2005 | Barts et al. | |
| 2006/0104224 A1 | 5/2006 | Singh et al. | |
| 2007/0005224 A1 | 1/2007 | Sutardja | |
| 2008/0033833 A1 | 2/2008 | Senior | |
| 2008/0040232 A1 | 2/2008 | Perchthaler | |
| 2008/0077309 A1 | 3/2008 | Cobbold | |
| 2008/0129490 A1 | 6/2008 | Linville et al. | |
| 2008/0140557 A1 | 6/2008 | Bowlby et al. | |
| 2008/0157990 A1 | 7/2008 | Belzer et al. | |
| 2008/0195432 A1 | 8/2008 | Fell et al. | |
| 2008/0262892 A1 | 10/2008 | Prager et al. | |
| 2009/0221338 A1 | 9/2009 | Stewart | |
| 2009/0231687 A1 | 9/2009 | Yamamoto | |
| 2009/0271236 A1 | 10/2009 | Ye et al. | |
| 2009/0275002 A1 | 11/2009 | Hoggle | |
| 2009/0276154 A1 | 11/2009 | Subramanian et al. | |
| 2009/0287401 A1 | 11/2009 | Levine et al. | |
| 2010/0042421 A1 | 2/2010 | Bai et al. | |
| 2010/0081548 A1 | 4/2010 | Labedz | |
| 2010/0114790 A1 | 5/2010 | Strimling et al. | |
| 2010/0191834 A1 | 7/2010 | Zampiello | |

(56) References Cited

U.S. PATENT DOCUMENTS

| | | |
|---|---|---|
| 2010/0211441 A1 | 8/2010 | Sprigg et al. |
| 2010/0217680 A1 | 8/2010 | Fusz et al. |
| 2010/0228574 A1 | 9/2010 | Mundinger et al. |
| 2010/0280748 A1 | 11/2010 | Mundinger et al. |
| 2010/0280884 A1 | 11/2010 | Levine et al. |
| 2010/0306078 A1 | 12/2010 | Hwang |
| 2011/0025267 A1 | 2/2011 | Kamen et al. |
| 2011/0098056 A1 | 4/2011 | Rhoads et al. |
| 2011/0106660 A1 | 5/2011 | Ajjarapu et al. |
| 2011/0202418 A1 | 8/2011 | Kempton et al. |
| 2012/0023032 A1 | 1/2012 | Visdomini |
| 2012/0078743 A1 | 3/2012 | Betancourt |
| 2012/0101629 A1 | 4/2012 | Olsen et al. |
| 2012/0158762 A1 | 6/2012 | IwuchukWu |
| 2012/0303259 A1 | 11/2012 | Prosser |
| 2012/0323645 A1 | 12/2012 | Spiegel et al. |
| 2013/0024041 A1 | 1/2013 | Golden et al. |
| 2013/0147820 A1 | 6/2013 | Kalai et al. |
| 2013/0173326 A1 | 7/2013 | Anglin et al. |
| 2013/0179205 A1 | 7/2013 | Slinin |
| 2013/0191237 A1 | 7/2013 | Tenorio |
| 2013/0211863 A1 | 8/2013 | White |
| 2013/0265174 A1 | 10/2013 | Scofield et al. |
| 2013/0268325 A1 | 10/2013 | Dembo |
| 2013/0275156 A1 | 10/2013 | Kinkaid et al. |
| 2013/0304522 A1 | 11/2013 | Cundle |
| 2013/0311264 A1 | 11/2013 | Solomon et al. |
| 2014/0038781 A1 | 2/2014 | Foley |
| 2014/0075528 A1 | 3/2014 | Matsuoka |
| 2014/0098009 A1 | 4/2014 | Prest et al. |
| 2014/0122190 A1 | 5/2014 | Wolfson et al. |
| 2014/0129302 A1 | 5/2014 | Amin et al. |
| 2014/0149157 A1* | 5/2014 | Shaam .................. G06Q 50/14  705/26.63 |
| 2014/0162598 A1 | 6/2014 | Villa-Real |
| 2014/0220516 A1 | 8/2014 | Marshall et al. |
| 2014/0229258 A1 | 8/2014 | Seriani |
| 2014/0236641 A1 | 8/2014 | Dawkins |
| 2014/0244413 A1 | 8/2014 | Senior |
| 2014/0310019 A1 | 10/2014 | Blander et al. |
| 2014/0324633 A1 | 10/2014 | Pollak et al. |
| 2014/0349672 A1 | 11/2014 | Kern et al. |
| 2015/0006428 A1 | 1/2015 | Miller et al. |
| 2015/0016777 A1 | 1/2015 | Abovitz et al. |
| 2015/0058051 A1 | 2/2015 | Movshovich |
| 2015/0161564 A1 | 6/2015 | Sweeney et al. |
| 2015/0178642 A1* | 6/2015 | Abboud ................ G06Q 10/02  705/5 |
| 2015/0198459 A1 | 7/2015 | MacNeille et al. |
| 2015/0206443 A1 | 7/2015 | Aylesworth et al. |
| 2015/0220916 A1 | 8/2015 | Prakash et al. |
| 2015/0241236 A1 | 8/2015 | Slusar et al. |
| 2015/0248689 A1 | 9/2015 | Paul et al. |
| 2015/0260474 A1 | 9/2015 | Rublowsky et al. |
| 2015/0269865 A1 | 9/2015 | Volach et al. |
| 2015/0324831 A1 | 11/2015 | Barua et al. |
| 2015/0348282 A1 | 12/2015 | Gibbon et al. |
| 2015/0371186 A1 | 12/2015 | Podgurny et al. |
| 2016/0041628 A1 | 2/2016 | Verma |
| 2016/0117657 A1 | 4/2016 | Forbes, Jr. et al. |
| 2016/0117756 A1 | 4/2016 | Carr et al. |
| 2016/0162989 A1 | 6/2016 | Cole et al. |
| 2016/0171891 A1 | 6/2016 | Banatwala et al. |
| 2016/0203422 A1 | 7/2016 | Demarchi et al. |
| 2016/0224935 A1 | 8/2016 | Burnett |
| 2016/0225115 A1 | 8/2016 | Levy et al. |
| 2016/0307276 A1 | 9/2016 | Young |
| 2016/0297316 A1 | 10/2016 | Penilla et al. |
| 2016/0300296 A1 | 10/2016 | Alonso Cembrano |
| 2016/0307288 A1 | 10/2016 | Yehuda et al. |
| 2016/0307373 A1 | 10/2016 | Dean et al. |
| 2016/0321609 A1 | 11/2016 | Dube et al. |
| 2016/0349835 A1 | 12/2016 | Shapira |
| 2016/0364679 A1 | 12/2016 | Cao |
| 2017/0019496 A1 | 1/2017 | Orbach |
| 2017/0039770 A1 | 2/2017 | Lanier et al. |
| 2017/0046658 A1 | 2/2017 | Jones et al. |
| 2017/0046664 A1 | 2/2017 | Haldenby et al. |
| 2017/0046799 A1 | 2/2017 | Chan et al. |
| 2017/0046806 A1 | 2/2017 | Haldenby et al. |
| 2017/0048216 A1 | 2/2017 | Chow et al. |
| 2017/0061509 A1 | 3/2017 | Rosenberg et al. |
| 2017/0089710 A1 | 3/2017 | Slusar |
| 2017/0122746 A1 | 5/2017 | Howard et al. |
| 2017/0146360 A1 | 5/2017 | Averbuch |
| 2017/0232300 A1 | 8/2017 | Tran et al. |
| 2017/0243286 A1 | 8/2017 | Castinado et al. |
| 2017/0243310 A1 | 8/2017 | Dawkins |
| 2017/0249626 A1 | 8/2017 | Marlatt |
| 2017/0276500 A1 | 9/2017 | Margalit et al. |
| 2017/0293881 A1 | 10/2017 | Narkulla |
| 2017/0293950 A1 | 10/2017 | Rathod |
| 2017/0330274 A1 | 11/2017 | Conant, II et al. |
| 2018/0012149 A1 | 1/2018 | Yust |
| 2018/0013211 A1 | 1/2018 | Ricci |
| 2018/0025417 A1 | 1/2018 | Brathwaite et al. |
| 2018/0046431 A1 | 2/2018 | Thagadur Shivappa et al. |
| 2018/0053226 A1 | 2/2018 | Hutton et al. |
| 2018/0053237 A1 | 2/2018 | Hayes et al. |
| 2018/0068355 A1 | 3/2018 | Garry |
| 2018/0075695 A1 | 3/2018 | Simpson |
| 2018/0095471 A1 | 4/2018 | Allan et al. |
| 2018/0102053 A1 | 4/2018 | Hillman et al. |
| 2018/0111494 A1 | 4/2018 | Penilla et al. |
| 2018/0117447 A1 | 5/2018 | Bao et al. |
| 2018/0121958 A1 | 5/2018 | Aist et al. |
| 2018/0129276 A1 | 5/2018 | Nguyen et al. |
| 2018/0140903 A1 | 5/2018 | Poure |
| 2018/0143029 A1 | 5/2018 | Nikulin et al. |
| 2018/0173742 A1 | 6/2018 | Liu et al. |
| 2018/0173800 A1 | 6/2018 | Chang et al. |
| 2018/0240542 A1 | 8/2018 | Grimmer |
| 2018/0278984 A1 | 9/2018 | Aimone et al. |
| 2018/0293638 A1 | 10/2018 | Simpson |
| 2018/0313798 A1 | 11/2018 | Chokshi et al. |
| 2018/0342106 A1 | 11/2018 | Rosado |
| 2018/0348863 A1 | 12/2018 | Aimone et al. |
| 2018/0357899 A1 | 12/2018 | Krivacic et al. |
| 2018/0365598 A1 | 12/2018 | Jamail |
| 2018/0365904 A1 | 12/2018 | Holmes |
| 2018/0374268 A1 | 12/2018 | Niles |
| 2019/0047427 A1 | 2/2019 | Pogorelik |
| 2019/0050634 A1 | 2/2019 | Nerayoff et al. |
| 2019/0066528 A1 | 2/2019 | Hwang et al. |
| 2019/0102946 A1 | 4/2019 | Spivack et al. |
| 2019/0108686 A1 | 4/2019 | Spivack et al. |
| 2019/0139448 A1 | 5/2019 | Marshall et al. |
| 2019/0143628 A1 | 5/2019 | Sawada et al. |
| 2019/0146974 A1 | 5/2019 | Chung et al. |
| 2019/0158603 A1 | 5/2019 | Nelson et al. |
| 2019/0160958 A1 | 5/2019 | Chaudhary et al. |
| 2019/0178654 A1 | 6/2019 | Hare |
| 2019/0188450 A1 | 6/2019 | Spivack et al. |
| 2019/0205798 A1 | 7/2019 | Rosas-Maxemin et al. |
| 2019/0228269 A1 | 7/2019 | Brent et al. |
| 2019/0236741 A1 | 8/2019 | Bowman et al. |
| 2019/0236742 A1 | 8/2019 | Tomskii et al. |
| 2019/0271553 A1 | 9/2019 | Simpson |
| 2019/0318286 A1 | 10/2019 | Simpson |
| 2019/0333166 A1 | 10/2019 | Simpson |
| 2019/0333181 A1 | 10/2019 | Simpson |
| 2019/0353499 A1 | 11/2019 | Stenneth |
| 2020/0013498 A1 | 1/2020 | Gelber |
| 2020/0027096 A1 | 1/2020 | Cooner |
| 2020/0047055 A1 | 2/2020 | Ward |
| 2020/0098071 A1 | 3/2020 | Jackson |
| 2020/0125999 A1 | 4/2020 | Simpson |
| 2020/0151816 A1 | 5/2020 | Simpson |
| 2020/0156495 A1 | 5/2020 | Lindup |
| 2020/0160461 A1 | 5/2020 | Kaniki |
| 2020/0173808 A1 | 6/2020 | Beaurepaire et al. |
| 2020/0317074 A1 | 10/2020 | Miller et al. |
| 2020/0317075 A1 | 10/2020 | Yokoyama et al. |
| 2020/0389301 A1 | 12/2020 | Detres et al. |

(56) References Cited

U.S. PATENT DOCUMENTS

| | | | |
|---|---|---|---|
| 2021/0012278 | A1 | 1/2021 | Alon et al. |
| 2021/0318132 | A1 | 10/2021 | Simpson |
| 2021/0379447 | A1 | 12/2021 | Lee |
| 2022/0068081 | A1 | 3/2022 | Pariseau |
| 2022/0100731 | A1 | 3/2022 | Tirapu Azpiroz et al. |
| 2022/0122026 | A1 | 4/2022 | Okabe et al. |
| 2023/0377409 | A1 | 11/2023 | Rye |

FOREIGN PATENT DOCUMENTS

| | | |
|---|---|---|
| JP | 2003177034 A | 12/2001 |
| WO | 2001041084 A2 | 6/2001 |
| WO | 2015059691 A1 | 4/2015 |
| WO | 2015161307 A1 | 4/2015 |
| WO | 2018024844 A1 | 2/2018 |
| WO | 2019/134005 A1 | 7/2019 |
| WO | 2019183468 A1 | 9/2019 |
| WO | 2021/163675 A1 | 8/2021 |

OTHER PUBLICATIONS

PCT International Search Report and Written Opinion; PCT/US2020/023223, dated Jun. 19, 2020.
PCT International Search Report and Written Opinion; PCT/US2020/023729, dated Jun. 18, 2020.
PCT International Search Report and Written Opinion; PCT/US2020/021546, dated Jun. 8, 2020.
PCT International Search Report and Written Opinion; PCT/US2020/018012, dated Apr. 21, 2020.
PCT International Search Report and Written Opinion; PCT/US2020/012208, dated Mar. 24, 2020.
Westerman; Longitudinal Analysis of Biomarker Data from a Personalized Nutrition Platform in Healthy Subjects; Nature, Scientific Reports; vol. 8; Oct. 2, 2018 (retrieved Jun. 10, 2020).
Ahmed, et al.; Energy Trading with Electric Vehicles in Smart Campus Parking Lots; Applied Sciences; Sep. 7, 2018.
Fitzsimmons; Uber Hit with Cap as New York City Takes Lead in Crackdown; New York Times; Aug. 8, 2018 (retrieved Feb. 29, 2020). https://www.wral.com/uber-hit-with-cap-as-new-york-city-takes-lead-in-crackdow/17755819/?version=amp?.
Peters, et al.; Student Support Services for Online Learning Re-Imagined and Re-Invigorated: Then, Now and What's To Come; Contact North | Contact Nord; Sep. 2017.
Soccer ball-shaped drone might be the safest flying robot yet https://mashable.com/2015/12/21/soccer-ball-drone/; Dec. 21, 2015.
Fleishman; Use Parking Apps to Find Lots, Garages, Valet, and Meters; Macworld; Jul. 19, 2015.
Borras, et al. Intelligent Tourism Reminder Systems: A Survey; Expert Systems with Applications 41; Elsevier; Jun. 9, 2014.
Pentland; After Decades of Doubt, Deregulation Delivers Lower Electricity Rates; Forbes; Oct. 13, 2013 (retrieved Feb. 29, 2020). https://www.forbes.com/sites/williampentland/2013/10/13/after-decades-of-doubt-deregulation-delivers-lower-electricity-prices/#201d4a9c1d13.
Sun, et al.; Real-Time MUAV Video Augmentation with Geo-Information for Remote Monitoring; 2013 Fifth International Conference on Geo-Information Technologies for Natural Disaster Management; pp. 114-118; IEEE; 2013.
U.S. Appl. No. 60/035,205, filed Jan. 10, 1997; Page.
The Wayback Machine, Interest Rate Swaps, https://web.archive.org/web/20171006212154/https://global.pimco.com/en/gbl/resources/education/understanding-interest-rate-swaps, 2016, pp. 1-7.
Freight Derivatives—a Vital Tool For YOur Business, https://www.reedsmith.com/-/media/files/perspectives/2007/02/freight-derivatives--a-vital-tool-for-your-business/files/freight-derivatives--a vital-tool-for-your-business/fileattachment/etcfreightderivativesavitaltoolforyourbusiness.pdf (Year: 2007), Energy, Trade & Commodities, pp. 1-3.
Barry, Kieth, App lets drivers auction public parking spaces, Wired, Aug. 11, 2011, pp. 1-4.
Jiang, Landu, et al., Sun Chase: Energy-Efficient Route Planning for solar-powered Evs, IEEE 37th international conference on distrubuted computing systems, 2017, pp. 1-11.
Netlingo, https://web.archive.org/web/20170122184857/https://www.netlingo.com/word/electronic-exchange.php,dated Oct. 22, 2017.
Laseter, Tim, "B2B benchmark: The State of Electronic Exchanges", Tech & Innovation, dated Oct. 1, 2001.
Directed Graph, https://en.wikipedia.org/wiki/Directed_graph, pp. 1-6, 2022.
About IBM Food Trust, https://www.ibm.com/downloads/cas/E9DBNDJG, pp. 1-17, 2019.
IBM Blockchain Transparent Supply, https://www.ibm.com/downloads/cas/BKQDKOM2, pp. 1-14, Aug. 2020.
Radocchia, Samantha, 3 Innovative Ways Blockchain Will Build Trust In The Food Industry, https://www.forbes.com/sites/samantharadocchia/2018/04/26/3-innovative-ways-blockchain-will-build-trust-in-the-food-industry/?sh=65bc79f42afc, Forbes, pp. 1-5, Apr. 26, 2018.
Change the World, https://fortune.com/change-the-world/2019/ibm/, Fortune Media IP Limited, pp. 1-5, 2022.
IBM Food Trust, https://www.constellationr.com/node/17601/vote/application/view/588, Constellation Research Inc., pp. 1-4, 2010-2022.
Dey, Somdip, et al., FoodSQRBlock: Digitizing Food Production and the Supply Chain with Blockchain and QR Code in the Cloud, https://www.mdpi.com/2071-1050/13/6/3486/htm, MDPI, pp. 1-27, Mar. 22, 2021.
Ramasubramanian, Vasant, "Quadrasense: Immersive UAV-based cross-reality environmental sensor networks," phD diss., Massachusetts Institute of Technology, pp. 1-75, 2015.
Wyzant, https://web.archive.org/web/20190327185429/https://www.wyzant.com/hotitworks/students, Wyzant tutoring, pp. 1-13, Mar. 27, 2019.
PCT International Search Report and Written Opinion; PCT/US2021/065855, dated Mar. 29, 2022.
PCT International Search Report and Written Opinion; PCT/US2022/012717, dated Mar. 30, 2022.
Zhao, et al., Incentives in Ridesharing with Deficit Control, Proceedings of the 13th International Conference on Autonomous Agents and Multiagent Systems (AAMAS 2014), May 5-9, 2014, pp. 1021-1028.
PCT/US22/27077 International Search Report and Written Opinion dated Nov. 1, 2022, pp. 1-16.
EP23168879.7 European Search Report, dated Jul. 5, 2023, pp. 1-13.
Wei, et al. "impact of aircraft size and seat availability on airlines demand and market share in duopoly markets" Published by Elsevier, 2005, pp. 315-327.
PCT International Search Report and Written Opinion; PCT/US2022/052969, dated Mar. 21, 2023.
Little, T.D., et al., On the Joys of Missing Data, Journal of pediatric psychology, 2014, pp. 151-162.
Honaker, J., et al., What to do About Missing Values in Time-Series Cross-Section Data, American Journal of Political Science, Sep. 6, 2008, pp. 561-581.
Westerhoff, Market Depth and Price Dynamics: A Note, University of Osnabrueck, Department of Economics Rolandstrasse 8, D-49069 Osnabrueck, German, Mar. 30, 2004, pp. 1-8.
PCT International Search Report and Written Opinion; PCTUS2022/051998, dated Mar. 8, 2023.
EP23153137.7 European Search Report, dated May 2, 20234, pp. 1-10.
EP20787830.7 European Search Report, dated May 12, 2023, pp. 1-10.
Zheyong, Bian, et al., "Planning the Ridesharing Route for the First-Mile Service Linking to Railway Passenger Transportation," Joint Rail Conference, Apr. 2017, pp. 1-11.
Papa, U., & Del Core, G., "Design of Sonar Sensor Model for Safe Landing of an UAV," IEEE Metrology for Aerospace, 2015, pp. 346-350.

(56) References Cited

OTHER PUBLICATIONS

Li, Jundong, et al., "Multi-network Embedding", pp. 1-9, 2018.
Speediance, All-in-One Smart Home Gym; retrieved from internet: https://www.amazon.com/Speediance-Equipment-Resistance-Training-Machine-Works/dp/B0C4KF7844/?th=1; May 8, 2023; p. 1.
Freebeat, Smart Exercise Bike; retrieved from internet: https://www.amazon.com/Resistance-Cushioned-Detection-Altorithm-Instructors/dp/BOBZKKZ683/?th=1; Mar. 3, 2023; p. 1.

\* cited by examiner

PRICE BASED NAVIGATION

RELATED APPLICATIONS

THIS APPLICATION IS RELATED TO THE FOLLOWING APPLICATIONS: (1) U.S. patent application Ser. No. 15/266,326, "IMPLEMENTATIONS OF VARIOUS METHODS TO CREATE ECONOMIC INCENTIVES TO DIRECTLY LINK USERS OF A SOCIAL NETWORK OR SOCIAL NETWORK REALITY GAME TO ACTUAL PROJECTS AND PEOPLE WITHIN A CHARITY OR DEVELOPING WORLD AREA," FILED Sep. 15, 2016; (2) U.S. patent application Ser. No. 15/877,393, "ELECTRONIC FORWARD MARKET EXCHANGE FOR TRANSPORTATION SEATS AND CAPACITY IN TRANSPORTATION SPACES AND VEHICLES," FILED Jan. 23, 2018; (3) U.S. patent application Ser. No. 16/167,525 "MULTI-LAYERED NODAL NETWORK TOPOLOGY FOR A MULTI-MODAL SECURE FORWARD MARKET AUCTION IN TRANSPORTATION CAPACITY AND SPACE," FILED Oct. 22, 1018; (4) U.S. patent application Ser. No. 16/183,647 "FINANCIAL SWAP PAYMENT STRUCTURE METHOD AND SYSTEM ON TRANSPORTATION CAPACITY UNIT ASSETS," FILED Nov. 7, 1018; (5) U.S. patent application Ser. No. 16/239,485 "MARKET LAYER PRICE QUEUE ROUTING FOR MULTI-LAYERED NODAL NETWORK TOPOLOGY FOR A MULTI-MODAL SECURE FORWARD MARKET AUCTION IN TRANSPORTATION CAPACITY AND SPACE," FILED Jan. 3, 1019;

BACKGROUND OF THE INVENTION

Field of the Invention

Implementations of various methods and systems of a price based navigation network and commodity forward market to transact and trade transportation seats or capacity units in airline transport, subway transport, train transport, automobile transport, autonomous vehicle transport, bike transport, bus transport, limo transport, boat transport, moped transport, package transport, cargo transport, motorcycle transport, shuttle transport, taxi transport, space transport, virtual transport, atomic particle transport, underground transport, ship transport, sea transport or drone transport on a computer, mobile computer device, virtual reality computer device or mixed reality computing device. Implementations of methods will occur in various modules considering, but not limited to all forms of transportation and movement of freight. Navigation routes and GPS systems have typically been designed to calculate the a plurality of routing methods such as shortest mileage, most scenic, least amount of traffic, shortest path, shortest distance by air. No navigation system has been designed to function by displaying the economic market value of rides on a navigation route between two or more virtual hub addresses and allowing users to transact on the system until the disclosed aforementioned system of price based navigation. While former systems have been useful, they do not place a cost or an economic value to the routing methods which causes very inefficient behavior. Further Transportation systems have generally assumed transportation is a personalized good rather than a commodity which is substitutable. In the United States, 85% of all vehicles ride with a single passenger in the vehicle which is a tremendously inefficient use of energy and it causes high levels of traffic congestion. While car pools have existed for many decades they are largely not utilized by a majority of the population because the time involved to coordinate schedules outweighs the benefit of cost savings and reduced energy use. Mobile networks have allowed for the rise of Transportation Network Companies that promote hired drivers but the cost of these systems has continued to be expensive for the majority of the public which has held back wide scale adoption. It has also been proven that transportation network companies have increased traffic and pollution (Fitzsimmons, E., "Uber Hit With Cap as New York City Takes Lead in Crackdown Further, transportation companies.", Aug. 8, 2018, https://www.nytimes.com/2018/08/08/nyregion/uber-vote-city-council-cap.html) rather than reducing traffic and pollution due to incorrect and inefficient methods and systems. Transportation Network Companies have created systems which allow a given company to set the prices of transportation capacity rather than an open transparent market place. Often times, Transportation Network Companies even provide similar customers with pricing that may vary by 30% from the same pick up and delivery points at the same time of ride request. The implementation of the disclosed method and system creates an open and transparent market which forces the lowest cost solution to dominate the market since all participants have equal access to the market method and system for transportation capacity units. It is a well-known fact that transparent open access markets create the lowest price for a good or service with fungible characteristics such as occurred in airlines, telecom and electricity markets (Pentland, W., "After decades of doubt, deregulation delivers lower electricity prices.", Oct. 13, 2013, https://www.forbes.com/sites/williampentland/2013/10/13/after-decades-of-doubt-deregulation-delivers-lower-electricity-prices/#710fb94b1d13). The lowest cost and most efficient solution will greatly reduce pollution, increase transportation capacity utilization rates, reduce traffic congestion, increase service frequency and save consumers of transportation services trillions in cost by increasing utilization rates. An open access transparent system for trading transportation capacity will also ensure that new technologies such as autonomous cars do not become elitist and are only reserved for the wealthy and do not actually add to pollution and congestion problems as New York City has seen with Transportation Network Companies. Transportation is currently one of the most inefficient markets in the world and an open forward market for transportation capacity units will bring market discipline and low-cost commodity pricing to all classes and forms of transportation capacity, freight movement and services.

The current economic system and global network generally assumes that the economic choice with the highest level of utility and highest level of efficiency is one governed by acting in self-interest with competition. Modern economic game theory suggests that the former assumption can be improved by acting in self interest in an atmosphere of competition but by also considering the economic outcome for the group as well as self-interest. In the specific economic case of transportation and freight movement, there is no open transparent market to make transparent the economic cost of not valuing transportation capacity down to the commodity unit level. Because the market for transportation is generally valued at the whole vehicle level (not the smaller unit/seat or space level), tremendous inefficiencies exist. These inefficiencies are for the benefit of large fuel companies, large auto companies and large transportation companies and they are at the expense of the consumer who must buy more transportation than they need because there is no market for smaller units. Accordingly, inefficient choices are made which waste a great deal of energy and time. Most participants in the current economic system simply do not know how their choices affect others in the system, especially that choices in the developed world may affect disproportionately the outcomes for those in the undeveloped world or the wealthy compared to those with fewer resources. The current global transportation system is not linked and therefore sub-optimal economic outcomes are achieved because there are limited governing mechanisms to consider the global group outcome. A transparent open access forward market system and method for trading transportation units solves these inefficiencies by placing the discipline of a market to the poorly utilized resources.

Further making the argument for this new and novel disclosed method and system to valuing transportation and freight capacity, are the example of large public subway systems in New York City, Paris or London as a few examples. In these metropolitan markets, all people of all ethnicities, all sex types and all income levels ride the public subway system. In these markets, each consumer buys an individual seat and they then are allowed to sit in any seat (proving fungibility), but there is no designation of where they sit, only that they are given a space on the transportation mode/method. The aforementioned example is evidence that indeed seats and rides are interchangeable and they indeed fit the definition of a fungible commodity which is one of many basis and premise for the disclosed new and novel invention. It is widely known that products which fit the definition of a commodity are most efficiently priced in transparent commodity markets and commodity forward markets have been set up for those products such as oil, power, natural gas, foreign exchange, gold, silver, corn, wheat and many other products. Even though the basis of a fungible commodity product definition is met through the example of a public subway system, the subway market continues to exist as a fixed price market set by the local transportation authorities. Again, the public subway system could be further improved by allowing a variable transparent market system to be added to the subway systems of the world. No such forward commodity trading market has existed for transportation units because the solution to integrate the technical requirements are complex and novel. The method and system of the transportation capacity forward market of the new and novel disclosed invention of this patent document solves the complicated market problem and may provide the most efficient system and open market-based solution to pricing transportation in such a way that the global consumer will save money by using market pricing, methods and systems to fully utilize all market transportation capacity to the fullest extent possible. Because an open transparent market is setting the price of the methods and systems of the aforementioned novel invention rather than a company or single provider, the solution is the most elegant and mathematically efficient answer for the global economy.

City planners across the globe discuss the field of shared-use mobility which encompasses transportation services that are shared among users, including public transit; taxis and limos; bikesharing; carsharing (round-trip, one-way and personal vehicle sharing); ridesharing (car-pooling, van-pooling); ridesourcing/ride-splitting; scooter sharing; shuttle services; neighborhood jitneys; and commercial delivery vehicles providing flexible goods movement. It is the use of any combination of shared mobility services, above, that have the effect of improving options to travel without a vehicle. Yet, in all these plans and studies, there has never been a proposal to integrate the power of a transparent marketplace to transportation capacity which elegantly combines technology to make the concept feasible with market mechanisms and methods. The key to motivate the move to shared-use mobility is to integrate a commodity market to trade the individual value of a single unit of capacity which has not been done by any other prior art or patent globally and has not been practiced by any business. The novelty of the method and system is to combine the technology of commodity markets with global positioning system ("GPS") location services and defining transportation as hub to hub capacity such as has been accomplished in energy and telecom markets among other methods and systems. Ample market participants actively physically participate in hub to hub transportation already and the unitized capacity of transport is a tradable commodity if the systems and methods existed to trade and price the market in such a manner.

Similarly, a highly publicized New York City study found that the services provided by Transportation Network Companies (TNCs) created a net increase of 600 million vehicle miles traveled in New York City during 2016, which was a three to four percent increase in traffic citywide. Accordingly, the method and systems of prior art are actually making city congestion problems worse, not better. While governments suggest effective policy leading towards shared-use vehicles and services, and away from single occupancy uses, much more is needed to prevent worsening congestion. Instead, a much simpler solution is to utilize an open access transparent marketplace for virtual hub to virtual hub multi-modal transportation capacity such as is accomplished in the contents of this patent document and novel invention. The solution is therefore fundamentally different, novel and unique compared to the models and patents pursued by TNCs and transportation pooling patents.

Using methods and systems of a transparent virtual hub to virtual hub market for transportation and freight capacity to promote shared-use practices will have immediate benefits of taking drivers off the road and reducing the congestion, infrastructure costs, greenhouse gas emissions and household transportation costs, even without the benefit of electric and autonomous vehicles, offering a more immediate way to shape the future with affordable, accessible and equitable multi-modal options. Cultivating shared mobility practices now is important to start the behavioral shift towards a shared, electric autonomous vehicle future.

Shared-use vehicle technology is already here and is advancing but it has been a slow process because there has yet to be an open access transportation marketplace to make transparent the price of a single unit of transportation capacity. The disclosed technology may be utilized with a range of services from a public transportation service as the backbone of the transportation network, to individual shared services that can provide first and last mile options; or multi-passenger "micro-transit" options operated in areas where high-capacity transit is not feasible. Another way to view the contents of this patent is that the method and system will have the effect of creating a virtual hub to virtual hub subway (using various transportation types and modes) in every city throughout the world through multiple methods of transportation (normalizing modes of transportation with respect to price). The alternative or status quo has led to urban planning infrastructure expenses that are skyrocketing, congestion that has become unmanageable in most urban areas, escalating pollution and resulting health care costs, increased vehicular deaths from congestion and excessive costs at the consumer level which can be reduced significantly. The disclosed patent invention method and system creates and harnesses program instructions so that a market force can bring these benefits in a way that clearly has been unobtainable in the past through other methods and inventions. If another system and method was solving these problems there would be clear evidence as a counter-example in the market, but no such evidence exists. In fact, evidence suggests all these aforementioned problems have escalated with alternative inventions which have been patented and moved forward in business models for the marketplace.

Efficiently implementing a multi-modal open forward market for transportation and freight capacity requires not only the use of direct virtual hub to virtual hub technology, but also multi-hub and multi-modal series of market auctions to allow the user more efficient selection criteria such as cheapest route, single-mode transport, multi-mode transport, fastest route transport, most scenic route transport, highest rating transport, most available transport, highest volume transport, most frequent transport, service level transport, security and safety transport and group restricted transport. The novel art and patent further describes the optimization methods of allowing a user to participate in a series of virtual hub to virtual hub auctions that may be presented as a series of auctions or as one combined auction with multiple hubs, modes and legs presented as one single auction. The open market auctions and multi-modal methods may be constrained by using no method, cheapest route method, single-mode transport method, multi-mode transport method, fastest route transport method, most scenic route transport method, highest rating transport method, most available transport method, highest volume transport method, most frequent transport method, service level transport method, security method and safety transport method and group restricted transport methods, or additional methods which optimize a series of auctions for transportation and freight units within an open forward market method. The aforementioned dependent methods of the open forward market for transportation and freight capacity units comprise a plurality of map routing solutions over a multi-layered, multi-modal layered network node topology subject to a plurality of constraints.

The creation of a price based navigation forward market of transportation units between virtual hubs along map routes has also never held the attributes of a forward contract which allows for one transportation unit to be substitutable for another transportation unit. In other words, if user A bought a transportation unit from user B, but then user A was not able to perform the obligation to purchase the transportation unit from user B, user A could resell the transportation unit contract to a third party user C on the forward transportation unit auction market to retrieve the financial payment made for their original purchase from user B and then user C would replace user A and be matched with user B. No other system or method performs the aforementioned data transformation combination.

Lastly, common transportation modes have lacked basic security. Anyone skilled the art of transportation would quickly recognize that there is fairly robust security to travel by air, but nearly no security while traveling by bus, car, autonomous car, motorcycle, ship, train, subway, light rail or many other methods. While all these common methods of transportation lack security checks, the number one reason people use to not carpool or combine transportation units is security. The disclosed novel invention integrates a high level of security technology within the open market method of a multi-modal open forward market for transportation and freight capacity. The security technology greatly reduces former barriers to ride-sharing safety.

Description of the Related Art

The following descriptions and examples are not admitted to be prior art by virtue of their inclusion within this section.

The current implementations of methods to use networks and computer systems to ride-share, car pool or move freight are generally governed by single companies which set the price using non-transparent mechanisms. Further, no navigation system is based on market pricing for routes, because no market exists for people to exchange transformed transportation units under a forward contract specification until the disclosed invention. Further, most implementations of methods do not allow price discovery between various sellers and buyers of transportation because the systems are disparate and are not open access or transparent. Users of Transportation Network Company services today in New York City may request a ride at the same moment in time from the exact same pick up location and drop off location and experience pricing that is 30% different. The majority of mobile method and system transportation services are utilizing mobile technology and GPS as well as system algorithms to manage transportation as a service which is fundamentally different than viewing transportation as a commodity and as a commodity market which the disclosed system and method accomplish. Competing methods price transportation as a service with the consumer buying multiple units with no transparent marketplace governing price competition for a single freight or transportation unit along a hub to hub route. Additional competing implementations of methods do not allow for forward selling or forward purchasing of transportation seats, freight or capacity beyond a single transaction which a commodity forward market allows through the systems and methods. The disclosed creation of a forward market of transportation units between virtual hubs along map routes has also never held the attributes of a forward contract which allows for one transportation unit to be substitutable for another transportation unit. In other words, if user A bought a transportation unit from user B, but then user A was not able to perform the obligation to purchase the transportation unit from user B, user A could resell the transportation unit contract to a third party user C on the forward transportation unit auction market to retrieve the financial payment made for their original purchase from user B and then user C would replace user A and be matched with user B. No other system or method performs the aforementioned data transformation combination.

An open and transparent market allows for large increases in price discovery and by economic theory results in the lowest possible price for consumers. City planners from New York to Austin to San Francisco to Paris to Mumbai to Tokyo to Beijing to Sao Paulo or Johannesburg all struggle to see how the future options of transportation will shape city planning. City planners have large concerns that when markets move to autonomous cars that cities will still have massive congestion problems if people continue to ride as a single passenger in one car. Additional alternative methods in transportation markets are taxi queues or TNC time and ranking based queues where drivers sit in or near airports and are in a long line waiting for passengers. The alternative methods do not allow a free market mechanism based on price to allow any driver of transportation services to move to the "front of the queue" due to price alone which is the function of a free and open forward market for transportation. Because no such example exists, there is a strong counterexample that the new unique novel invention functions as a unique, novel and independent method from any other prior art. Accordingly, the disclosed novel invention allows for significant new product offerings, much higher utilization rates by redefining the market into unitized commodity units in transportation and freight capacity markets and providing the technology methods and systems to accomplish the goal of higher efficiency and lower consumer pricing for transportation and freight units.

Implementations of methods have been made in systems that provide transportation on demand through technology methods and systems but none frame the problem as a forward commodity market or a unitized capacity market with simple elegant systems and methods which allows the natural forces of supply and demand to set the price through a universally transparent medium such as an open transportation and freight capacity forward market. Additionally, no prior art system or method proposes a technically capable solution of integrating the technical software and hardware requirements for integrating the tasks of a network, GPS system, mobile computing devices, servers, forward commodity markets, grouping software for hubs, transparent open access pricing systems, blockchain audit, safety methods and systems, virtual hub systems, map routing systems, algorithms for no arbitrage conditions in a simple easy to use graphical user interface format for mobile or virtual computing over various mediums which are connected via a network.

1) U.S. Pat. No. 6,356,838 issued Mar. 12, 2002 to Sunil Paul discloses a method, system and program for determining an efficient transportation route. The prior art relates to a computer-implemented method is described for determining an efficient transportation route comprising: compiling travel data over one or more travel segments, the travel data transmitted from one or more transportation vehicles traveling over the travel segments; receiving positional data associated with a transportation request, the positional data including an origin and a destination; and providing a driver of a vehicle with a first efficient route from the origin to the destination using the travel data, the first efficient route including one or more of the travel segments. Also described is a computer-implemented method for providing transportation services comprising: receiving a transportation request from a passenger; tracking the passengers position following the request using positional detection logic; and transmitting positional data identifying the passengers position to a pickup vehicle. The prior art patent is widely cited as the business model taken by most mobile application based transportation services companies. While the prior art does describe the service model of the current construct of the market for transportation with a custom on demand service and then a corresponding company delivering that service through both the technology and the actual physical transportation, it defines a completely different market scenario than a virtual hub to virtual hub transportation open transparent market forward market for an individual transportation or freight capacity unit. As previously discussed a commodity based transportation capacity unit market has a completely different market construct than is defined by all operators and patents in the space. The prior art is simply matching transportation requests through a series of servers, GPS systems, and mobile devices. The prior art clearly was a novel invention, but as evidenced by the market, the method has been utilized to replace the inefficient taxi model rather than create a marketplace for transportation units that can be priced as a commodity with specific commodity contract specifications and the discipline a market brings to a business problem to fill up unutilized transportation capacity through the efficient mechanism of price. It is very clear the result of the methods and systems of the prior art has contributed to increased congestion and traffic unlike the disclosed methods and systems. In a commodity-based transportation capacity system with open access transparent systems and methods, the price will continue to go lower until all space has been utilized or supply for the transportation units is equal to the demand for transportation units. As any observer with ordinary skill would see, most transportation or freight unit seats or capacity goes unutilized and this is a proof and counterexample that no such system is in existence and that the patents and prior art in this field do not address the present novel invention of bringing a commodity market to bear on the prices of individual units of transportation or freight capacity between virtual hub to virtual hub routes. If prior art addressed the novel invention, then a marketplace would exist for transportation units of capacity which is open access and transparent and prices would drop until a level was reached where all transportation was fully utilized. The prior art simply makes the method of taxi cab and private service cars more efficient and in fact adds to congestion as has been empirically documented by all cities across the world. By contrast the novel invention may use the method and system integrating the technical software and hardware requirements for integrating the tasks of a network, GPS system, mobile computing devices, servers, forward commodity markets, grouping software for hubs, transparent open access pricing systems, blockchain audit and safety methods and systems, virtual hub topology systems, algorithms for no arbitrage conditions in a simple easy to use graphical user interface format for mobile or virtual computing over various mediums which are connected via a network.

2) U.S. Pat. No. 6,421,606 issued Jul. 16, 2002 to Asai et al., discloses a method and system for a route guiding apparatus and medium. The prior art specifically addresses a route guiding apparatus providing information for a route using public transportation as an alternative to a vehicular route. In addition to searching for a vehicular route from a current location to a destination, it is determined whether the current location and the destination are within a zone in which public transportation can be used. When the current location and the destination are determined to be within a public transportation zone, a route using public transportation is searched for. Subsequently, the cost of the route using public transportation and the cost of the vehicular route are compared. When the cost of the public transportation route falls within a predetermined limit, the apparatus indicates the public transportation route. The route costs are calculated considering factors such as required travel time and ticket fees. The apparatus may also recommend public transportation when no parking is available near the destination, or based on traffic information concerning the vehicular route. The prior art clearly addresses a comparing function to determine the lowest cost route to move from one point to another point however the prior art is completely void of providing an open access transparent forward commodity market for individual capacity units to place the method of a market over the system which would then allow for dramatically lower and more efficient prices and utilization would increase dramatically as supply and demand forces would force the market to balance through price. Accordingly, the prior art is not comparable from a market method and system basis or from an efficiency basis. The novel invention by contrast integrates the technical software and hardware requirements for integrating the tasks of a network, GPS system, mobile computing devices, servers, forward commodity markets, grouping software for hubs, transparent open access pricing systems, blockchain audit and safety methods and systems, virtual hub topology systems, algorithms for no arbitrage conditions in a simple easy to use graphical user interface format for mobile or virtual computing over various mediums which are connected via a network.

3) U.S. Pat. No. 7,373,320 issued May 13, 2008 to Timothy Francis McDonough discloses a method and system for an invention relating to a futures exchange for services contracts. The SerFEx is an electronic market system that enables the exchange of cash (spot and futures) contracts and futures contracts for the delivery of services. Services are traded on the exchange similar to commodities on a prior art commodities exchange. The exchange allows the futures market to determine the right price for services for the producers and consumers of those services. Participants may buy, sell, or leverage services contracts through a variety of order types. The exchange is composed of an electronic infrastructure that has four major components: a front-end facility comprised of licensed authorized intermediaries, an automated bid/ask matching system, a clearinghouse system, and a title management system. The exchange operates twenty-four hours per day and seven days per week with all accounts settled at least once in every twenty-four hours. Participants in the exchange may be producers of services, intermediaries, speculators, and consumers of the services. The prior art very clearly calls the title and claims of the patent a contract futures exchange. A person with ordinary skill in the art would know there is a dramatic difference between a futures contract which are on regulated exchanges and forward contracts which trade over the counter. Futures contracts are highly regulated by definition. There are very specific legal differences between futures and forward contracts and they can't be confused or used interchangeably. As one of many examples, speculators are not permitted to trade forward contracts as all contracts must be transacted with a physical underlying ownership and must be physically delivered unlike regulated futures exchanges which permit speculators. For the sake of clarity, the transportation capacity market is exclusively limited to forward physical contracts which means that the contracts are limited to be traded by only those who are actually providing the underlying service or method. The prior art specifically mentions a data system method for implementing a service contract exchange for construction, transportation, warehousing, postal services, information, real estate, rental, leasing, financial, insurance, professional, scientific, technical services, management, administrative services, educational services, health care, social assistance arts, entertainment and recreation among others. Again someone with ordinary skill would note the specific technical difference between a forward contract which is disclosed and the prior art futures contract. As a very important further technical difference to anyone with ordinary skill in the art, the prior art does not show mobile computers or GPS systems as part of the disclosed futures exchange in any of the claims or as any part of any diagram and it would be clear this would be a necessary requirement to functionally allow for the delivery of futures or forward contracts for transportation or freight. Therefore the prior art method and system would be incapable of completing the novel invention disclosed in this patent method and systems. FIGS. 9A and 9B of the prior art show that the primary art of the patent in question was a futures contract to sell a royalty escrow service contract which does not require GPS or mobile based technology to complete a transaction. Accordingly, the prior art would be disqualified from comparison very clearly to someone with ordinary skill based on the futures to forwards legal differences and the technical inability to complete a transportation capacity contract without mobile or GPS based technology outlined in any claim or figure of the patents. The prior art is limited to a regulated futures exchange which has a clearing house that guarantees the transactions through a highly regulated process. By contrast forward contracts carry default risks. The prior art refers to mark to market contracts which are a hall mark of futures contracts whereas the novel invention forward transportation unit contracts are settled on one date at the end of the contract. The prior art is clearly limited to regulated futures with are heavily participated in by speculators who are betting on price directions and usually close out positions prior to maturity as evidenced by any regulated commodity futures trading commission data. The novel invention by contrast is a forward transportation or freight capacity unit contract which is mainly used by hedgers and physical participants in the market to eliminate the volatility of an asset price and physical delivery usually takes place as would be the case for someone actually using or providing the transportation or freight capacity unit. The prior art futures contracts are generally subject to one single regulatory regime as by definition they must be regulated by a single entity in one jurisdiction. The prior art is limited in the claims to futures which in the case of physical delivery, counterparties are chosen randomly by the exchange. By contrast the novel invention of a forward transportation capacity or freight unit specifies to whom the delivery should be made. The prior art claims limit are limited to futures where there are margin requirements and periodic margin calls by which cash may change hands daily. By contrast the novel invention of a computer implemented forward commodity transportation capacity unit market, no cash flows until physical delivery takes place. By comparison the novel invention may be transacted across jurisdictional boundaries and are primarily governed by the transactional relations between the parties. The prior art is a futures exchange for service contracts for royalties of many service products highlighting the service of transportation or transportation as a service which is not an actual physical fungible good such as a commodity like copper or coffee or oil which can have an associated futures contract. By contrast the novel invention is a fungible commodity forward contract of an actual seat or ride capacity or space freight capacity on a transportation capacity bearing unit. A service of the prior art would not be able to group users using a virtual hub pooling server which would then combine with another virtual hub or combination of hubs to make a tradable commodity unit, again therefore rendering the prior art as incapable of delivering or even rendering the service. The novel invention by contrast integrates the technical software and hardware requirements for integrating the tasks of a network, GPS system, mobile computing devices, servers, forward commodity markets, grouping topology software for hubs, transparent open access pricing systems, blockchain audit and safety methods and systems, virtual hub topology systems, algorithms for no arbitrage conditions in a simple easy to use graphical user interface format for mobile or virtual computing over various mediums which are connected via a network. The prior art is technically incapable of providing the software or hardware that would allow for the completion of a transaction between two users in any of the claims. Lastly, the prior art of McDonough largely resembles the recent U.S. Supreme court decision in Alice Corp. v. CLS Bank International. The issue in the Alice case was whether certain claims about a computer-implemented, electronic escrow service for facilitating financial transactions covered abstract ideas ineligible for patent protection. The patents were held to be invalid because the claims were drawn to an abstract idea, and implementing those claims on a computer was not enough to transform that idea into patentable subject matter. It is very clear that the prior art of McDonough is dangerously close in spirit if not fully resembling the Alice decision as the patent is simply pushing forth the concept of using a financial exchange to cover a general abstract idea with very little evidence to support a novel invention of the actual structure of the market or a novel approach to how to make the physical market perform with either an escrow service contract futures exchange or a transportation service contract futures exchange. In this specific case, the Supreme court gave a two-step test which McDonough would follow the precedent of Alice in that they are simply borrowing the concept of a futures exchange without a novel technical method or system as to facilitating a transaction and as we clearly present in our arguments, the prior art could not facilitate a transportation futures contract implementation because there is no mobile technology to route riders which renders the implementation non-feasible. Further there is no specific computer system or unique program which is novel in the implementation other than regurgitating back the business method of a prior art exchange and then applying it to the abstract concept of applying the existing prior art to service contracts. The novel system and methods of this patent specifically outline the implementation of integrating a novel interfacing of networks, GPS systems, mobile computing devices, services, forward commodity markets, grouping software for hubs, transparent open access pricing systems, virtual hub topology, no arbitrage conditions alongside a novel graphical user interface that combines all these systems and methods for forward transportation contracts. Clearly the current patent (unlike McDonough), adds "something extra" that embodies and "innovative concept" and is not generic, conventional or obvious as no other patent or business offers these novel concepts.

4) U.S. Pat. No. 7,756,633 issued Jul. 13, 2010 to Huang et al., discloses a method and system for a comprehensive security-enhanced rideshare system is provided. The rideshare program includes localization, mapping and ride matching for participants. Participation incentives and revenue methods provide for the financial viability of the rideshare system. Participant security is monitored in near real-time using location-determining communication devices used by the participants in the system. The rideshare system monitors a number of security-indicating criteria and takes action when an anomalous condition is recognized. The method claim of the prior art specifically refers to providing security in a rideshare environment and monitoring that participant to look for anomalies during the travel route or travel times by a pre-defined threshold and sending security alerts to be confirmed by the rideshare participant that indeed they are safe. The novel invention is fundamentally different than the prior art as the blockchain technology for security within the forward transportation capacity market relies upon algorithms which include independent comprehensive background checks of participants combined algorithms which alert towards the actual commodity unit of the transportation capacity unit not being delivered as per the forward contract specifications in the agreement. Further facial recognition, finger print, video 911 and photo recognition sub-methods are not utilized to ensure the identity of users which are part of the novel invention and patent.

5) U.S. Pat. No. 8,121,780 issued Feb. 21, 2012 to Gerdes et al. discloses a method for offering a user reward based on a chosen navigation route includes calculating alternative routes from a starting location to a destination location by taking into consideration route segments including public transportation route segments and road network route segments. The alternative routes are presented to a user. A reward is offered for choosing a respective one of the routes. A navigation system that performs the route calculation preferably queries a network database for public transportation information. The prior art in concept is similar to the Paul et al, US Patent application No 2015/0248689 wherein the user of the system and method are given a reward or incentive for choosing a route which in theory promotes the concept of transportation pooling or the use of public transportation. The clear differences again are that the prior art is not a forward based transportation capacity market which will drive the transportation capacity price to the lowest possible economic level. Accordingly the prior art does not necessarily lead to the most efficient outcome. The forward commodity individual unit transparent open access forward market is required to arrive at the most efficient lowest price outcome in the limit and therefore the disclosed invention uses methods and systems to come to a superior solution and is therefore fundamentally different and unique. The novel invention by contrast integrates the technical software and hardware requirements for integrating the tasks of a network, GPS system, mobile computing devices, servers, forward commodity markets, grouping software for hubs, transparent open access pricing systems, blockchain audit and safety methods and systems, virtual hub topology systems, algorithms for no arbitrage conditions in a simple easy to use graphical user interface format for mobile or virtual computing over various mediums which are connected via a network.

6) U.S. Pat. No. 8,762,035 issued Jun. 24, 2014 to Uri Levine et al., discloses a method and system for real-time community information exchange for a traffic mapping service for allowing plurality of users having each a navigation device to transmit their locations to a server and optionally to signal to the server their requested destination. The system and method are further capable of calculating traffic parameters such as current traffic speed at a given road based on the momentary locations of the users. The system and method of the invention may also calculate and advise the users of preferred roads to take in order to arrive at the requested location with minimum delay. The prior art utilizes GPS systems and mobile devices to route people most efficiently from a starting point to an ending point utilizing a community of users. The prior art utilizes a community but has nothing to mention of an open access transparent transportation or freight trading market for forward transportation or freight capacity. Further the prior art is focused on the shortest mapping route for a transportation segment, not using a market to price the value of the individual capacity units along a given virtual hub to virtual hub topology route or a series of single or multi-modal, multi-hub topology subject to constraints to price the transportation or freight capacity. The novel invention by contrast integrates the technical software and hardware requirements for integrating the tasks of a network, GPS system, mobile computing devices, servers, forward commodity markets, grouping software for hubs, transparent open access pricing systems, blockchain audit and safety methods and systems, virtual hub topology systems, algorithms for no arbitrage conditions in a simple easy to use graphical user interface format for mobile or virtual computing over various mediums which are connected via a network.

7) U.S. Pat. No. 8,798,593 issued Aug. 5, 2014 to Haney, discloses location sharing and tracking using mobile phones or other wireless devices. The prior art systems and methods provide a system for exchanging GPS or other position data between wireless devices for purposes of group activities, child location monitoring, work group coordination, dispatching of employees etc. Cell phones and other wireless devices with GPS receivers have loaded therein a Buddy Watch application and a TalkControl application. The Buddy Watch application communicates with the GPS receiver and other wireless devices operated by buddies registered in the users phone as part of buddy groups or individually. GPS position data and historical GPS position data can be exchanged between cell phones of buddies and instant buddies such as tow truck drivers via a buddy watch server. Referencing the Alice Corp. v. CLS Bank International decision, the prior art generally falls under the category of an abstract concept of grouping people using GPS which is not a novel concept or method beyond a general business method from prior art without specific application. Further, the prior art would struggle to stand the light of Alice additionally considering Bilski v. Kappos that the idea of grouping people with GPS is an abstract idea and does not apply to a specific novel example of transportation, transportation as a commodity, unique transportation contract specifications, uniquely defining transportation capacity as seats or cargo space, transportation to define a virtual or actual hub or hub series topology in the context of a forward contract market for transportation.

8) U.S. Patent Application No. US 2015/0248689 with publication date of Sep. 3, 2015 to Sunil Paul et al., discloses a method and system for providing transportation discounts. The prior art systems and methods for providing transportation discounts are disclosed as a server receives, from a client device of a user, a request for a transportation service. In response, the server identifies that the request relates to a particular characteristic associated with modified pricing. The server then calculates an adjusted price for the transportation service based on the modified pricing associated with the particular characteristic. As we have reviewed in the background section of this patent application the disclosed system and method uses proprietary information for a company to price a transportation discount which is non-transparent and the company assigned the patent uses its technology to price the discount rather than an open transparent market such as a commodity market for transportation or freight capacity. The Paul et al patent application refers to a ride request in FIG. 7 which prices a discount for a ride option based on longer wait time and fewer pick-ups as a disclosed example. In this example, the ride request and the market is not for an individual unit of transportation or freight capacity and the example is not an open access market exchange for the individual units of transportation. Custom discounts or the concept of generally used discounts are not used in Individual custom rides are not commodities which has been why the transportation market has not been able to get to the result that we propose. In a hub to hub based system (or multi-hub topology, there would be enough liquidity and participants to create a viable marketplace of substitutable transportation or freight capacity. A hub to hub transportation model may generally leave the last mile of transportation to another system or method such as the method of a custom transportation request. A commodity market for transportation or freight capacity is only viable where there is ample liquidity for substitution. The disclosed method and system of Paul et al., is fundamentally different and more akin to the current methods and systems currently available through companies such as Uber or Lyft or Grab or Via. Paul et al, in FIG. 8 propose an electronic bulletin board for matching custom requests, but clearly do not function as a commodity forward market with defined commodity delivery points (virtual hubs or multi-layered virtual hubs), product specifications, penalties for non-performance, etc. . . . as are standard in commodity contracts for well-known alternative products such as wheat, corn, natural gas, power, oil, etc. . . . . . Further FIG. 9 disclosed by Paul et al, shows a cross promotional package approach to transportation and theater or dinner shows which defeats the purpose of defining transportation units as a commodity unit which will bear the lowest cost and provide the highest economic incentive for usage. FIG. 12 from Paul et al describes a method and system for using user profile history data to generate discounts which by definition are set by the system. This is fundamentally different from setting a price by an open access market where any participant can offer any price at any time for a given hub to hub route with uniformity of contract. No system or company controls the pricing, the market is left free to float which is different from the system and method Paul et al, propose which has a transportation server price the transportation request for some hot spot location. Further, Paul et al suggest some embodiments are defined from a sponsor giving a transportation discount to a particular location as a promotion. A commodity market eliminates custom behavior and treats a transportation unit for a specific product as uniform without special characteristics such as are disclosed by Paul et al. The novel invention by contrast integrates the technical software and hardware requirements for integrating the tasks of a network, GPS system, mobile computing devices, servers, forward commodity markets, grouping software for virtual hubs, transparent open access pricing systems, blockchain audit and safety methods and systems, virtual hub topology systems, algorithms for no arbitrage conditions in a simple easy to use graphical user interface format for mobile or virtual computing over various mediums which are connected via a network.

9) U.S. Patent Application No. US 2009/0287401 A1 with publication date of Nov. 19, 2009 to Uri Levine et al., disclose a system and method for traffic mapping service are disclosed for allowing plurality of users having each a navigation device to transmit their locations to a server and optionally to signal to the server their requested destination. The system and method are further capable of calculating traffic parameters such as current traffic speed at a given road based on the momentary locations of the users. The system is designed to advise the users of preferred roads to take in order to arrive at the requested location with minimum delay. The prior art systems and methods clearly route based on time based routing which is fundamentally different from price based routing or price based navigation. No prior directly deals with price based navigation because no market has existed for transportation units such as disclosed in the novel and unique invention.

10) U.S. Pat. No. 9,389,094 B2 issued on Jul. 12, 2016 to Jennifer T Brenner et al., disclose systems and methods presented for sequencing locations and events and determining routing and itineraries for the sequence. The prior art method and system very clearly route based on event sequencing rather than price based routing based on a market for underlying transportation units. Event sequencing as disclosed in the prior art is based on event addresses which would be fundamentally different from a route based on an underlying forward market for transportation units. The prior art makes no remote referencing to forward markets for transportation, transportation pricing on a route, price sequencing, or other related routing techniques. The prior art method and system would also be incapable of routing or navigation based on price or forward market transportation units.

SUMMARY

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

The aforementioned deficiencies and other problems associated with the general navigation systems, transportation and freight markets, other novel systems and interfaces and how transportation functions with large inefficiencies which use electronic devices to hail taxi cabs or car-pooling services are reduced or eliminated by the disclosed method and system of integrating and interfacing a plurality of systems into one system which allows the efficiency of a forward market to price and ration unused spaced as to eliminate wasted transportation units or freight capacity. In some embodiments, the methods and systems are on portable devices. In some embodiments, the disclosed method and system is a layer on mapping and map routing software on a plurality of computing devices. In some embodiments, the methods and systems are on stationary devices. In yet other embodiments, the methods and system disclosed may use mixed reality, augmented reality or virtual reality or other audio or visualization methods to allow a user to transact and trade freight and transportation capacity as a forward commodity. In some embodiments the graphical user interface ("GUI") on any mobile or stationary computer device interfaces with one or more processors, memory and one or more modules, programs or sets of instructions stored in the memory for performing multiple functions. In some embodiments, the user interacts with the GUI primarily through finger contacts or voice commands or other sensory methods to interface with the GUI. In some embodiments, the functions may include the user directing the GUI to place a user profile in a virtual hub so that they may participate, transact or trade a combination of virtual hub transportation routes as a forward commodity for transportation or freight capacity. In some embodiments, the functions may include the user instructing the GUI to participate, transact, or trade various modes of transportation capacity such as automobile, air, autonomous vehicle, bike, boat, bus, drone, limo, motorcycle, moped, shuttle, spaceship, subway, taxi, train, other transportation methods, cargo freight, package freight, virtual or various combinations of the aforementioned modes. In some embodiments, the functions may include the user instructing the GUI to form a new or existing virtual hub or virtual hub combination which then has a specification function which forms a basis for the GUI to present the plurality of buyers and sellers of transportation and freight capacity between two or more virtual hubs.

In an aspect of the invention, a computer-implemented method for use in conjunction with a computing device with various display formats comprises: a user at a mobile or fixed computing device with a touchscreen or a computing device without a touchscreen or augmented reality non-screen display or audio non-screen interface detecting a user network login, detecting a secure login based on facial recognition, fingerprint recognition or photo scan or biometric interface recognition of the user, performing multiple local and external security and crime checks on the user, detecting and receiving from the user an origin location through the GUI user input or GPS coordinate input from the computing device and detecting from the user input a destination coordinate and transmission of said coordinates, generating and applying one or more optimization techniques to form a virtual hub with other users that have similar transportation requests within a geographic boundary, determining if two or more virtual hubs are required for the path of the auction between a said starting point and ending point, generating instructions for a plurality of computing devices, networks, virtual hub database servers, network member database servers, transportation platform market database servers to form a combination of virtual hubs and contract specifications for delivery of transportation services or freight capacity between the virtual hubs in a format presented by a GUI which allows the user to submit prices to sell (offer) or bid (buy) transportation or freight capacity between virtual hub combinations, generating instructions to interface a plurality networks, global positioning systems networks, servers, forward commodity markets, grouping software for virtual hubs, map routing systems and methods, transparent open access pricing systems which form a price auction of a given quality, blockchain audit and safety systems, virtual hub topology servers and systems, no arbitrage constraint condition systems which form one system to implement a forward commodity transportation and freight capacity unit market system and method. The programs and instructions are stored in memory and configured to be executed by one or more processes by a plurality of users. The programs may include a plurality of configurations and specification instructions for various modes of transportation capacity. The programs also may include as specification options to select a plurality of timings, quality levels of capacity and service, term of timings such as by the second, minute, hour, day, weekday, weekend, month, annual or day of the week, various order types such as day, good till cancelled, immediate or cancel, good till date, day till cancelled, limit, market, market if touched, snap market, snap mid, snap to primary, peg to benchmark, adaptive custom orders. The programs may also include a plurality of instruction modes such as automobile, air, autonomous vehicle, bike, boat, bus, drone, limo, motorcycle, moped, shuttle, spaceship, subway, taxi, train, packages, multimodal and cargo for transportation or freight capacity. The programs also may include: instructions for virtual hub pick up and drop off points as well as instructions to set various constraints such as cheapest route, single mode, multi-mode, fastest route, most scenic route, highest rating, most available or liquid, highest volume, most frequent, service level, security and safety and group restricted modes. The programs may include a plurality of interfaces with map routing software such as Google Maps, Apple Maps, TomTom Maps, Open Street Maps, Bing Maps, Nokia Maps, or a plurality of other map routing technologies to place the forward transportation unit pricing on the map routes as an integration layer. The programs and instructions from the GUI provide master instructions for the plurality of computing devices and servers which interface to allow the user to participate, transact and trade a plurality of transportation and freight capacity modes between a plurality of virtual hubs.

In another aspect of the invention, a computing system comprises: a plurality of networks, global positioning systems networks, servers, forward commodity market servers and instructions, grouping program instructions for virtual hubs and associated servers, transparent open access pricing servers and instructions, GPS map routing servers, blockchain audit and safety servers and instructions, user identification history and instructions against crime databases and identity databases to confirm security of the system and users, virtual hub servers and instructions, no arbitrage constraint condition servers and instructions which form one system to implement a forward commodity transportation and freight capacity unit market system and method.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
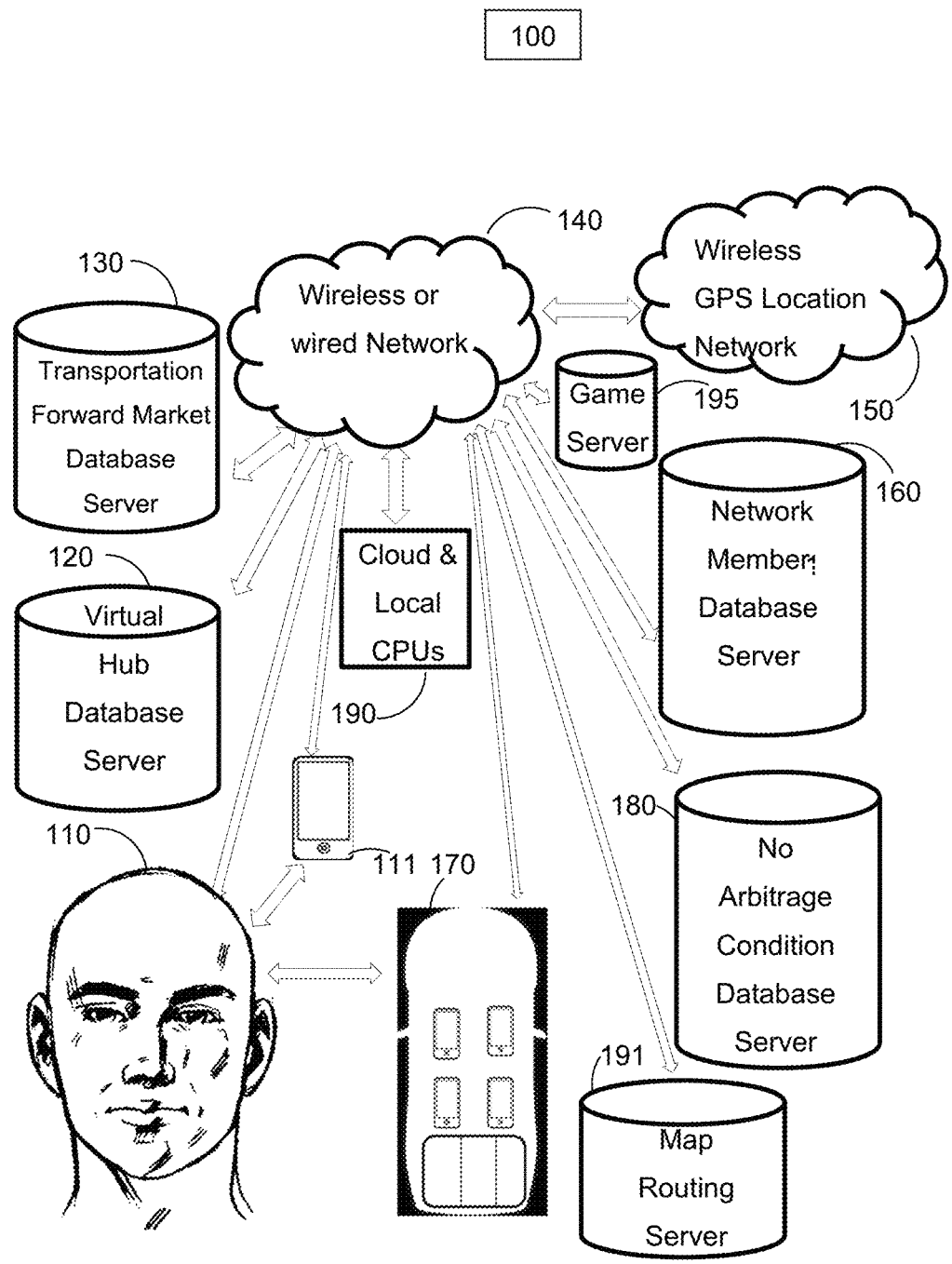
FIG. 1 illustrates a schematic diagram of the network configuration and implementations of methods which support the method and system of trading transportation and freight capacity in accordance with some embodiments.

The discussion below is directed to certain specific implementations. It is to be understood that the discussion below is only for the purpose of enabling a person with ordinary skill in the art to make and use any subject matter defined now or later by the patent "claims" found in any issued patent herein. In other instances, well-known methods, procedures, components, circuits and networks have not been described in detail so as not to unnecessarily obscure aspects of the embodiments.

It will also be understood that, although certain elements of the invention and subject matter will be described in a certain order, the order is not intended to be limiting to the invention as many steps may be performed in a plurality of configurations to accomplish the invention of using various technologies to participate, trade and transact transportation and freight units as a physical forward commodity. It will be further understood that the terms "comprises" or "comprising," when used in this specification, specify the presence of stated features, integers, steps, operations, elements, and/or components, but do not preclude the presence or addition of one or more other features, integers, steps, operations, elements, components, and/or groups thereof.

The terminology used in the description of the invention herein is for the purpose of describing particular embodiments only and is not intended to be limiting of the invention. As used in the description of the invention, the singular forms "a", "an" and "the" are intended to also include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of a mobile computing device may be substituted for a fixed stationary computing device or a virtual reality headset or a mixed reality headset or an augmented reality headset or an audio interfaced computer device. Embodiments may also occur on a projection computing device or in any other method or system which communicates and integrates the use of a network, global positioning system network, mobile computing devices, servers, forward commodity forward market auction database, grouping software instructions for hubs, game servers, navigation servers, virtual hub topology methods and systems, transparent open access user interface pricing systems, blockchain audit and safety methods, facial recognition, fingerprint recognition or photo recognition of users for security and identity check, algorithms for no arbitrage conditions and constraints with a user interface or graphical user interface formatted on mobile or stationary computing devices over various mediums which are connected through a network for the purpose of participating, transacting or trading transportation or freight capacity units between combinations of virtual hubs as a forward commodity in an auction.

The following paragraphs provide a various techniques of various embodiments described herein such as illustrated as in FIG. 1. In one implementation as illustrated in FIG. 1, a user 110 may use a mobile computing device 111 to login through a network 140 to a network member database server 160. The mobile computing device 111 may be substituted for a fixed stationary computing device, an augmented reality projection device, virtual reality projection device, mixed reality projection device, or any computing device which renders a visualization to a user 110. Once the user 110 has logged into the network member database server which confirms user identity through multi-factor facial recognition, passwords, fingerprint recognition, biometric interface and photo scan 160 through the wireless or wired network 140, a token will be passed to the mobile computing device 111 and an authenticated session commences which allows the user 110 access to an exemplary graphical user interface FIG. 2. The user 110 may input an origin/from location 220 and a destination/to location 230 on the mobile computing device 210 GUI. The user 110 may also allow the instructions from the GUI on the mobile computing device 111 locate the users origin/from address automatically through communication with the wireless GPS location network 150. The user 110 may transmit the from/origin address location 220 and to/destination address location information 230 by depressing the go representation 240 on the GUI. The from/origin address location 220 and to/destination address location information 230 are transmitted by the user 110 to the wireless or wired network 140 to a cloud based CPU 190 or a local CPU 190 such that instructions may be performed in the memory of the CPU 190 to form a virtual hub 310 with other users 110 that are a part of the network member database server 160. The virtual hub location information is then saved in the virtual hub database server 120 by the CPUs 190 transmitting the corresponding data to the virtual hub database server 120. Once two or more virtual hubs have been logged into the virtual hub database server 120 with corresponding physical location data, the instructions on the CPU 190 request the corresponding pricing information from the transportation forward market database server 130 through the network 140 to present the current series of bid/buy and offer/sell prices for the combination of virtual hubs the user 110 has requested. The user 110 may set a series of conditions and constraints to give specific instructions to the CPU 190 through the mobile computing device GUI 111. The specific conditions and constraints set by the user 110 form the basis for the forward commodity contract between other users 110 on the network member database server 160 which form the basis for participating, transacting and/or trading transportation or freight capacity as a forward commodity. Further the user 110 may set additional constraints on the mobile computing device GUI 110 which then are transmitted through the network 140 to the no arbitrage condition database server 180 such that the commodity transaction may have important attributes which assist in increasing the liquidity of various transactions on the system. Once a transaction has been completed using the plurality of CPUs, instructions, servers and networks, the user 110 may then physically take delivery of the transportation or freight capacity commodity by getting into the vehicle 170 and taking a unit of capacity as defined by the contract commodity specifications which were set by the user 110 using the mobile computing device 111 network 140 and plurality of database servers such as the transportation database server 130, CPUs 190, instructions on CPUs 190, virtual hub database server 120, wireless GPS location network 150, network member database server 160 and no arbitrage condition database server 180. Further a user 110 may not only take physical delivery of the transportation capacity unit in a vehicle 170 but they may also make physical delivery of the transportation capacity unit if the user 110 is the owner of the transportation capacity unit. If the user 110 is the buyer of the transportation capacity unit, they are taking physical delivery of the transportation capacity unit in the vehicle 170. To avoid confusion, the specifications for the transportation capacity unit mode may have been set for automobile, air, autonomous vehicle, bike, boat, bus, drone, limo, motorcycle, moped, shuttle, space, subway, taxi, train, fastest optimized, cheapest route, packages, cargo or virtual modes. Accordingly the vehicle 170 in the diagram in FIG. 1 may be an automobile, air, autonomous vehicle, bike, boat, bus, drone, limo, motorcycle, moped, shuttle, space, subway, taxi, train, fastest optimized, cheapest route, packages, cargo, virtual, or other form of transportation. To be approved as a network member on the network member database server 160, the user 110 must have input financial information into the network member database server 160 such that the user 110 has the ability to take payment for delivery of the transportation unit commodity or make payment for the transportation unit commodity. Safety and security also have preset configurations and approval levels for network members in the network member database server 160 which are multi-factor to include passwords, facial recognition, biometric recognition, fingerprint recognition and photo recognition and no arbitrage condition database server 180 which are covered in more detail later in the drawings and detailed description. Map routing software and applications from a map routing server 191 may interface with the system. The Map Routing Server 191 may host or interface with internal map routing instructions or third-party map routing software and instructions. In some embodiments, the game server 195 may render augmented reality, mixed reality and standard computer game views of the price based navigation route where passengers in the transportation unit may engage or participate in the game layer of the transportation unit price auction. Virtual hub database server 120 locations are added as a user 110 requests transportation or freight capacity units or offers transportation or freight capacity units from various locations from the GUI on the mobile computing device 111.

Figure 2:
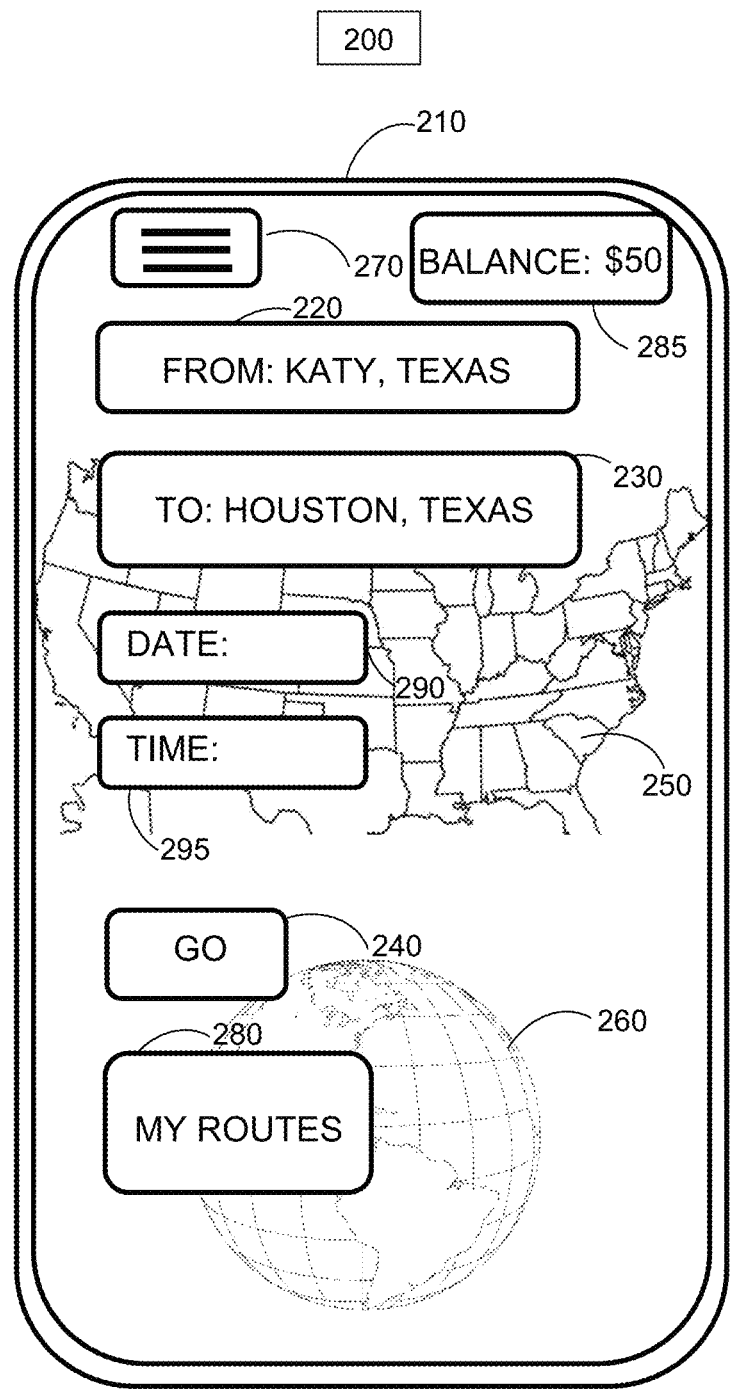
FIG. 2 illustrates an exemplary user interface to configure the origin and destination for a virtual hub to trade transportation and freight capacity in accordance with some embodiments.

FIG. 2 illustrates in some embodiments, exemplary user interfaces 210. In some embodiments, the user 110 may select one or more of the user interface elements to enter an origin/from address 220 and a destination/to address 230 as well as having the GPS network 150 autofill the origin location 220 from the users 110 present location. In some embodiments, the user balance 285 may present the user with their account balance they may use to place purchases or sales of transportation units. In some embodiments, the user 110 may select the balance 285 button to add funds to the account or distribute funds to the user(s) 110. The mobile computing device 111 may be substituted for a fixed stationary computing device, an augmented reality projection device, virtual reality projection device, mixed reality projection device, audio computer computing interface or any computing device which renders a visualization to a user 110 for the purpose of displaying the transportation or freight capacity unit trading market platform auction GUI 210. In some embodiments, the user 110 may select the go button 240 after the origin/from address 220 and a destination/to address 230 have been input. In some embodiments, the GUI 210 may have a background map 250 relative to the location of the user 110. In some embodiments, the user 110 may scroll to a world 260 location using the world icon 260. In some embodiments, the user 110 may select the "my routes" button 280 which may show the users 110 most frequent transportation or freight capacity combinations so that the user can easily navigate to the most relevant transportation capacity markets and notification. As an example, but not limiting by example, the user 110 may have entered routes in the "my routes" 280 saved locations on the virtual hub database server 120, transportation forward market database server 130 and network member database server 160 locations such as "home to work", or work to home" or "work to gym" or "gym to work" or "work to shopping" or "shopping to work" or "home to friend" or "home to school" or "home to downtown" or "downtown to home" or "home to shopping" or "home to yoga" or "home to airport" or "Freight facility to Delivery Route" or a plurality of the most common routes for a user 110. Saved "my routes" in the network member database server 160 are used to notify other network members of common activity between overlapping routes. The hamburger graphic button 270 may allow the user to set many additional settings to set the market constraints for participating, transacting, or trading forward transportation or freight as a commodity. The hamburger graphic button 270 on the GUI 210 may also serve as a menu function for the application GUI instructions. As described previously the hamburger graphic 270 may be used to navigate throughout the various settings of the GUI for transportation or freight capacity as a forward commodity 210 by a user 110.

Figure 3:
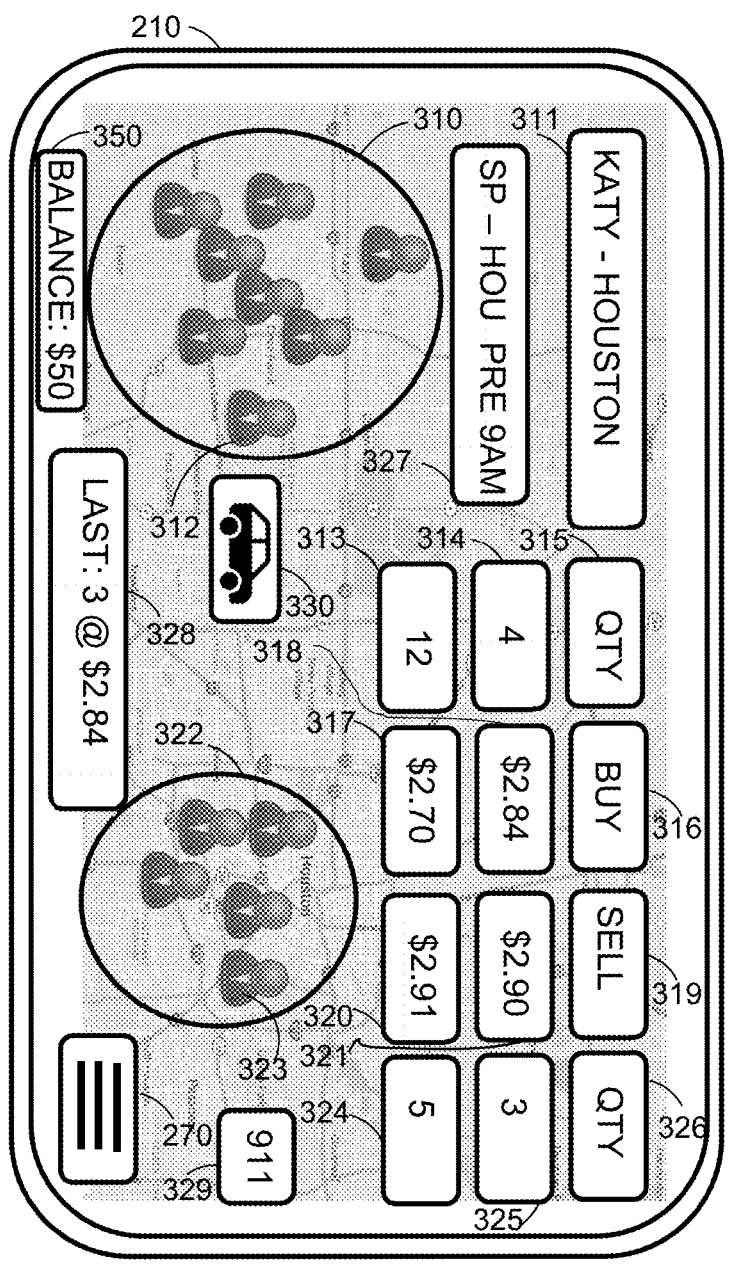
FIG. 3 illustrates an exemplary user interface to transact and trade automobile transportation or freight capacity with various domestic configurations in accordance with some embodiments.

FIG. 3 illustrates exemplary user interfaces 210 for participating, transacting and/or trading transportation or freight as a physical forward commodity between combinations of virtual hubs over various transportation modes. In some embodiments, user interface 210 includes the following elements, or a subset or superset thereof:

exemplary virtual hub combination 311;

exemplary virtual hub origin/from location 310 with users 312 within the virtual hub location 310;

exemplary account balance 350 to display the account balance 350 to the user 110 or enact the application going to the account balance module to add funds or distribute earned funds in the application to the user(s) 110;

exemplary specification summary of the market, level of service and time of delivery commencement 327;

exemplary mode of transportation capacity type 330;

exemplary transaction summary of the last trades quantity and price 328;

exemplary virtual hub destination/to location 322 and user who is being delivered on the transportation capacity unit 323;

exemplary bid/buy quantity title header 315 for an exemplary virtual transportation hub market;

exemplary bid/buy price title header 316 for an exemplary virtual transportation hub market;

exemplary offer/sell price title header 319 for an exemplary virtual transportation hub market;

exemplary offer/sell quantity title header 326 for an exemplary virtual transportation hub market;

exemplary bid/buy quantity 314 for the best bid quantity from a plurality of users 110 for an exemplary respective transportation or freight capacity virtual hub combination 311;

exemplary bid/buy quantity 313 for the second-best bid quantity from a plurality of users 110 for an exemplary respective transportation or freight capacity virtual hub combination 311;

exemplary bid/buy price 318 for the best bid price from a plurality of users 110 for an exemplary respective transportation or freight capacity virtual hub combination 311;

exemplary bid/buy price 317 for the second-best bid price from a plurality of users 110 for an exemplary respective transportation capacity virtual hub combination 311;

exemplary offer/sell price 321 for the best offer price from a plurality of users 110 for an exemplary respective transportation capacity virtual hub combination 311;

exemplary offer/sell price 320 for the second-best offer price from a plurality of users 110 for an exemplary respective transportation or freight capacity virtual hub combination 311;

exemplary offer/sell quantity 325 for the best offer quantity from a plurality of users 110 for an exemplary respective transportation or freight capacity virtual hub combination 311;

exemplary offer/sell quantity 324 for the second-best offer quantity from a plurality of users 110 for an exemplary respective transportation capacity virtual hub combination 311;

exemplary safety dispatch "911" button 329 to enact video and audio recording of the user 110 environment and dispatch of that information to authorities;

exemplary hamburger menu button 270 to move back to menu options and settings away from the participation, transaction, trading GUI 210 embodiment.

In some embodiments the user 110 may enter a transaction quantity and price for transportation or freight capacity units to participate, transact and/or trade by the GUI 210 detecting user 110 contact with a bid/buy price 318 or offer/sell price 321. The GUI 210 detects user 110 contact with any of the GUI 210 buttons which have been aforementioned. Upon user 110 contact with buttons on the GUI 210, instructions are instantiated which allows the user 110 to change the specifications of the respective virtual hub combination 311. A plurality of prices and markets may be presented based on a plurality of contract specifications. For any given contract specification 327 and virtual hub series combination 311 the transportation or freight units are substitutable which is unique and novel to the invention and unlike any other prior art. In some embodiments, the best bid/buy price 318 may be moving up in price or down in price depending on the market conditions at any given time. In some embodiments the last trade or last transacted price for a given specification is listed to help the user 110 understand how the market is moving so that the user 110 may submit a competitive offer/selling price 321 or bid/buying price 314. In some embodiments, users 110 may adjust settings of the GUI 210 to show more bid/buying prices 317 or more offer/selling prices 320. In some embodiments the matrix of market quantities and prices 313, 314, 315, 316, 317, 318, 319, 320, 321, 324, 325, 326 may be referred to as market depth in the GUI 210 embodiment. In some embodiments the number of users 110 may be displayed as user icons 312 or 323 for the amount of people logged in which desire to transact, trade or participate in a given virtual hub 310 to virtual hub 322 combination. In some embodiments, users 110 may select the transportation mode 330 such that the user allows a market for only one form of transportation capacity as a commodity or the user 110 may allow the system to show multiple forms of transportation capacity between two virtual transportation capacity hubs 310, 311, 322. In some embodiments the GUI 210 may detect a user 110 selecting the 911 button 329 which may activate voice and video recording functions on the mobile or stationary device 111 and transmit the data with a confirmation from the user 110 to the authorities to provide enhanced security while participating, transacting or trading forward transportation or freight as a commodity. In some embodiments the user may toggle between the GUI 210 market view screen in FIG. 3 and other menu 270 options and settings by the user 110 selecting the hamburger button 270 and the GUI 210 detecting the user 110 input or contact. In some embodiments the GUI 210 may instantiate instructions in the memory of the mobile computing device 111 which then transmits transportation or freight capacity data through the network 140 or wireless GPS network 150 to call upon instruction routines and instruction sub-routines on the transportation forward market database server 130, virtual hub database server 120, network member database server 160, no arbitrage condition database server 180 and/or instructions in the memory of the cloud and local CPUs 190 which all interface together to make one system which may deliver transportation or freight capacity units to users 110 from and to a plurality of virtual hubs 310, 322 with a plurality of specifications at specific market prices.

Figure 4:
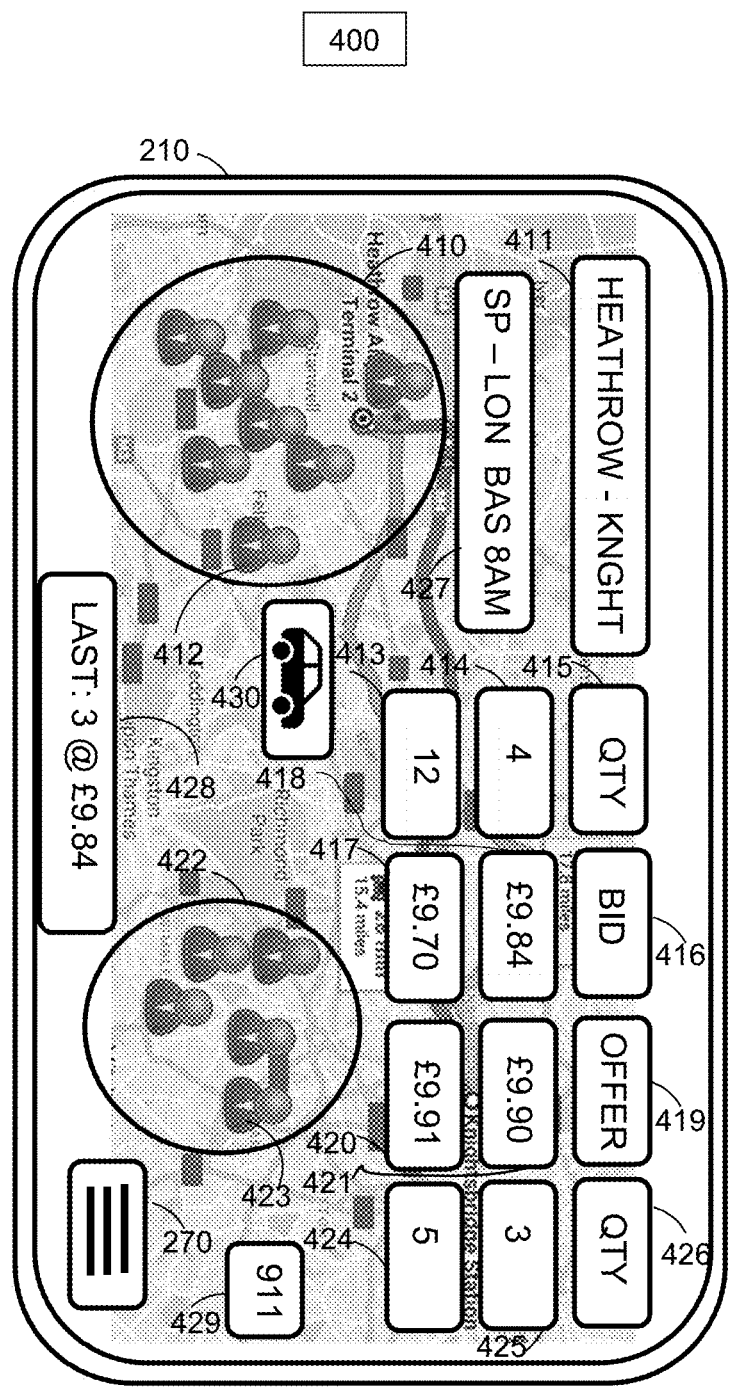
FIG. 4 illustrates an exemplary user interface with various international configurations of trading automobile or freight capacity in accordance with some embodiments.

FIG. 4 illustrates exemplary user interfaces 210 for participating, transacting and/or trading transportation as a physical forward commodity between combinations of virtual hubs over various transportation modes. In some embodiments, user interface 210 includes the following elements, or a subset or superset thereof:

Exemplary virtual hub combination 311;
Exemplary virtual hub origin/from location 410 with users 412 within the virtual hub location 310;
Exemplary specification summary of the market, level of service and time of delivery commencement 427, in this particular embodiment the GUI 210 has moved to an international virtual market hub combination market such as within London;

Exemplary mode of transportation capacity type 430;
Exemplary transaction summary of the last trade auction quantity and price 428 in the local currency or another currency set by the user 110;

Exemplary virtual hub destination/to location 422 and user who is being delivered on the transportation or freight capacity unit 423;

Exemplary bid/buy quantity title header 415 for an exemplary virtual transportation hub market;

Exemplary bid/buy price title header 416 for an exemplary virtual transportation hub market;

Exemplary offer/sell price title header 419 for an exemplary virtual transportation hub market;

Exemplary offer/sell quantity title header 426 for an exemplary virtual transportation hub market;

Exemplary bid/buy quantity 414 for the best bid quantity from a plurality of users 110 for an exemplary respective transportation capacity virtual hub combination 411;

Exemplary bid/buy quantity 413 for the second-best bid quantity from a plurality of users 110 for an exemplary respective transportation or freight capacity virtual hub combination 411;

Exemplary bid/buy price 418 for the best bid price from a plurality of users 110 for an exemplary respective transportation capacity virtual hub combination 411;

Exemplary bid/buy price 417 for the second-best bid price from a plurality of users 110 for an exemplary respective transportation or freight capacity virtual hub combination 411;

Exemplary offer/sell price 421 for the best offer price from a plurality of users 110 for an exemplary respective transportation or freight capacity virtual hub combination 411;

Exemplary offer/sell price 420 for the second-best offer price from a plurality of users 110 for an exemplary respective transportation or freight capacity virtual hub combination 411;

Exemplary offer/sell quantity 425 for the best offer quantity from a plurality of users 110 for an exemplary respective transportation or freight capacity virtual hub combination 411;

Exemplary offer/sell quantity 424 for the second-best offer quantity from a plurality of users 110 for an exemplary respective transportation or freight capacity virtual hub combination 411;

Exemplary safety dispatch "911" button 429 to enact video and audio recording of the user 110 environment and dispatch of that information to authorities.

Exemplary hamburger menu button 270 to move back to menu options and settings away from the participation, transaction, trading GUI 210 embodiment.

In some embodiments the user 110 may enter a transaction quantity and price for transportation or freight capacity units to participate, transact and/or trade by the GUI 210 detecting user 110 contact with a bid/buy price 418 or offer/sell price 421. The GUI 210 detects user 110 contact with any of the GUI 210 buttons which have been aforementioned. The GUI 210 may detect user contact 110 with any of the GUI 210 buttons 418, 417, 420,421 or user 110 voice interface with the application 210 method. Upon user 110 contact with buttons on the GUI 210, instructions are instantiated which allows the user 110 to change the specifications of the respective virtual hub combination 411. A plurality of prices and markets may be presented based on a plurality of contract specifications. In some embodiments, the best bid/buy price 418 may be moving up in price or down in price depending on the market conditions at any given time. In some embodiments the last auction trade or last transacted price for a given specification is listed to help the user 110 understand how the market is moving so that the user 110 may submit a competitive offer/selling price 421 or bid/buying price 414. In some embodiments, users 110 may adjust settings of the GUI 210 to show more bid/buying prices 417 or more offer/selling prices 420. In some embodiments the matrix of market quantities and prices 413, 414, 415, 416, 417, 418, 419, 420, 421, 424, 425, 426 may be referred to as market depth in the GUI 210 embodiment. In some embodiments the number of users 110 may be displayed as user icons 412 or 423 for the amount of people logged in which desire to transact, trade or participate in a given virtual hub 410 to virtual hub 422 combination auction. In some embodiments, users 110 may select the transportation mode 430 such that the user allows a market for only one form of transportation capacity as a commodity or the user 110 may allow the system to show multiple forms of transportation capacity between two virtual transportation capacity hubs 410, 411, 422. In some embodiments the GUI 210 may detect a user 110 selecting the 911 button 429 which may activate voice and video recording functions on the mobile or stationary device 111 and transmit the data with a confirmation from the user 110 to the authorities to provide enhanced security while participating, transacting or trading forward transportation or freight as a commodity. In some embodiments the user may toggle between the GUI 210 market view screen in FIG. 4 and other menu 270 options and settings by the user 110 selecting the hamburger button 270 and the GUI 210 detecting the user 110 input or contact. In some embodiments the GUI 210 may instantiate instructions in the memory of the mobile computing device 111 which then transmits transportation or freight capacity data through the network 140 or wireless GPS network 150 to call upon instruction routines and instruction sub-routines on the transportation forward market database server 130, virtual hub database server 120, network member database server 160, no arbitrage condition database server 180 and/or instructions in the memory of the cloud and local CPUs 190 which all interface together to make one system which may deliver transportation or freight capacity units to users 110 from and to a plurality of virtual hubs 410, 422 with a plurality of specifications 427 at specific market prices.

Figure 5:
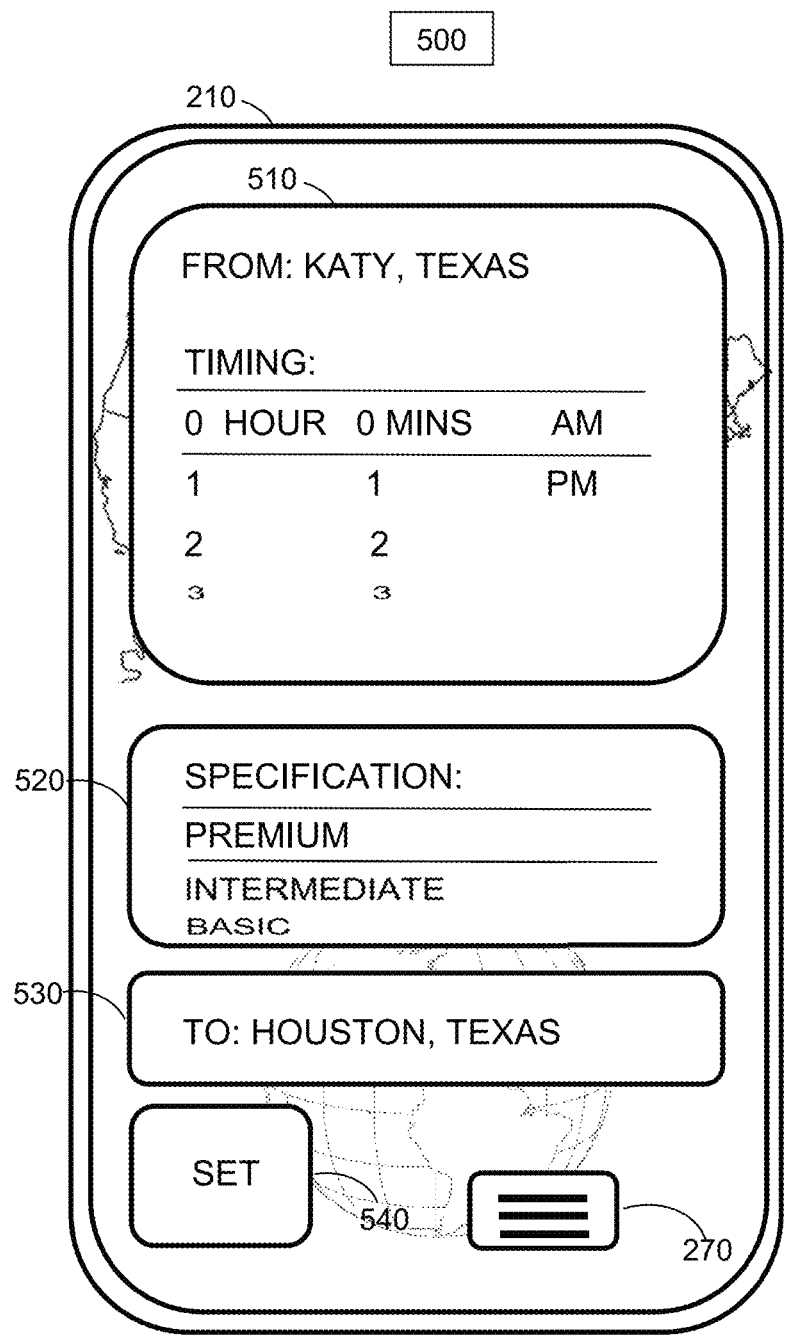
FIG. 5 illustrates an exemplary user interface to select a specification grade of transportation or freight capacity with various timing specifications in accordance with some embodiments.

FIG. 5 illustrates an exemplary user interface 210 for listing timing specifications 510 on a portable multifunction device in accordance with some embodiments. In some embodiments, user interface 210 includes the following elements, or a subset or superset thereof:

Origin/From virtual hub timing 510;
Specification of quality of transportation capacity 520;
Destination/To virtual hub 530;
Setting button 540 to transmit the timings 510 and quality specification grade 520;
Hamburger button 270 to instruct the GUI 210 to take the user 110 to the menu screen.

In some embodiments, the user 110 may select a plurality of timing options in the timing selection specification 510. The timing specification constraint may be the time at which the transportation or freight capacity unit departs from the origin/from virtual hub 410. As in any commodity market, if a user 110 is late and they have purchased the transportation capacity unit, the user must still pay for the transportation or freight capacity unit regardless if the user 110 is present at the time of departure or not. The user has the option if they know they will be late to sell back the transportation or freight capacity unit to the market at the then current price. Accordingly, for the purpose of example, but not limiting by example, if a user 110 bought a transportation capacity unit for £9.90 421 and the user 110 realized they would be late for the 8 am departure specification 427, then the user 110 may either pay for the transportation unit even though the user 110 was present and did not take delivery of the transportation unit, or the user 110 may preemptively sell back the transportation capacity unit to the market at the then current bid price 418. The user 110 would then have offset their obligation in a timely manner and another user 110 on the network 140, 160 may then purchase the available transportation or freight capacity unit. In some embodiments, virtual transportation or freight hub combination units may or may not have the available liquidity if the user 110 were to wait too long before delivery of the transportation capacity unit to make an adjustment and therefore may need to take delivery even if they are not present. In some embodiments, the user 110 may select a grade specification 520. For the purpose of example, but not limiting by example, a plurality of specification grades may exist such as "premium" which may be defined by certain classes of transportation capacity units and/or certain quality levels. Similarly, for the purpose of example, but not limiting by example, a plurality of specification grades may exist such as "intermediate" or "basic" which may be defined by certain classes of transportation or freight capacity units and/or certain quality levels. In some embodiments, the user 110 may select the destination/to virtual hub 530 to change the virtual hub combination. In some embodiments, the user 110, may contact the "set" button 540 to transmit the transportation capacity unit specification data by using the GUI 210 which may instantiate instructions in the memory of the mobile computing device 111 which then transmits transportation capacity data through the network 140 or wireless GPS network 150 to call upon instruction routines and instruction sub-routines on the transportation forward market database server 130, virtual hub database server 120, network member database server 160, no arbitrage condition database server 180 and/or instructions in the memory of the cloud and local CPUs 190 which all interface together to make one system which may deliver transportation capacity units to users 110 from and to a plurality of virtual hubs 410, 422 with a plurality of specifications at specific market prices.

Figure 6:
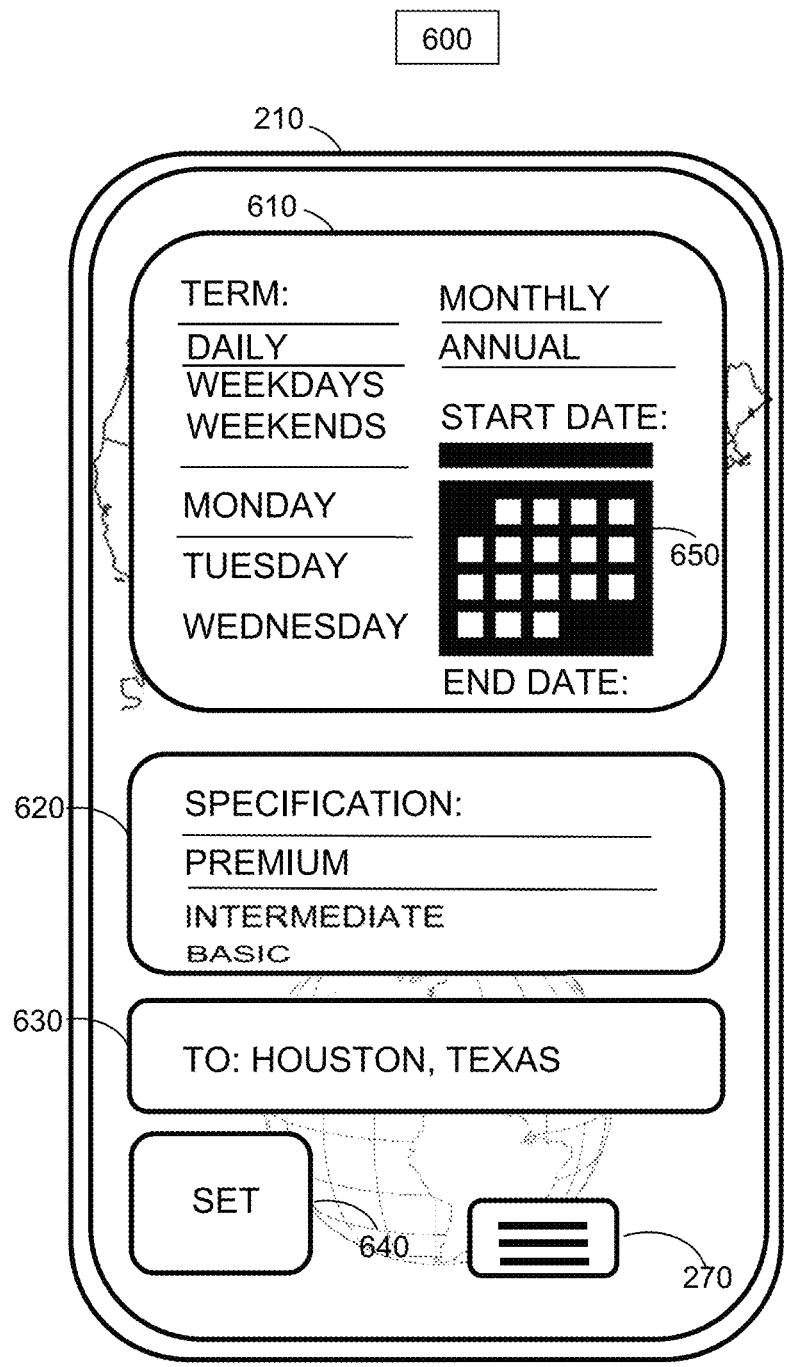
FIG. 6 illustrates an exemplary user interface with various term specifications for transportation or freight capacity in accordance with some embodiments.

FIG. 6 illustrates an exemplary user interface 210 for selecting the term specification 610 on a portable multifunction device in accordance with some embodiments. In some embodiments, user interface 210 includes the following elements, or a subset or superset thereof:

Term specification options 610;
Specification of quality of transportation or freight capacity 620;
Destination/To virtual hub 630;
Setting button 640 to transmit the term 610 and quality specification grade 620;
Calendar button 650 to select specification start dates and end dates for a plurality of virtual transportation or freight hub combinations;
Hamburger button 270 to instruct the GUI 210 to take the user 110 to the menu screen.

In some embodiments, the term specification 610 may be used to participate, transact and/or trade in a specific virtual hub combination for a specific time period specification. Users 110 may set the term to daily, weekly, monthly, annual, weekdays, weekends, specific days such as Monday, Tuesday, Wednesday, Thursday, Friday, Saturday, Sunday or any combination of term selections the user 110 sets as relevant for participating, transacting or trading in the transportation or freight capacity unit market. Not limiting by example, but for use of illustrating a possible subset of term selections, the user 110 may select "weekdays" 610 during a specific calendar time period 650 of a given year. In some embodiments, specific time start dates and end dates may be set by the user with the calendar button 650. In some embodiments a user 110 may select "Mondays" 610 within a specification date window 650. In some embodiments, the user 110 may select "weekends" 610 during a specification calendar window of dates 650. In some embodiments, the user 110, may contact the "set" button 640 to transmit the transportation or freight capacity unit specification data by using the GUI 210 which may instantiate instructions in the memory of the mobile computing device 111 which then transmits transportation capacity data through the network 140 or wireless GPS network 150 to call upon instruction routines and instruction sub-routines on the transportation forward market database server 130, virtual hub database server 120, network member database server 160, no arbitrage condition database server 180 and/or instructions in the memory of the cloud and local CPUs 190 which all interface together to make one system which may deliver transportation capacity units to users 110 from and to a plurality of virtual hubs 410, 422 with a plurality of specifications at specific market prices.

Figure 7:
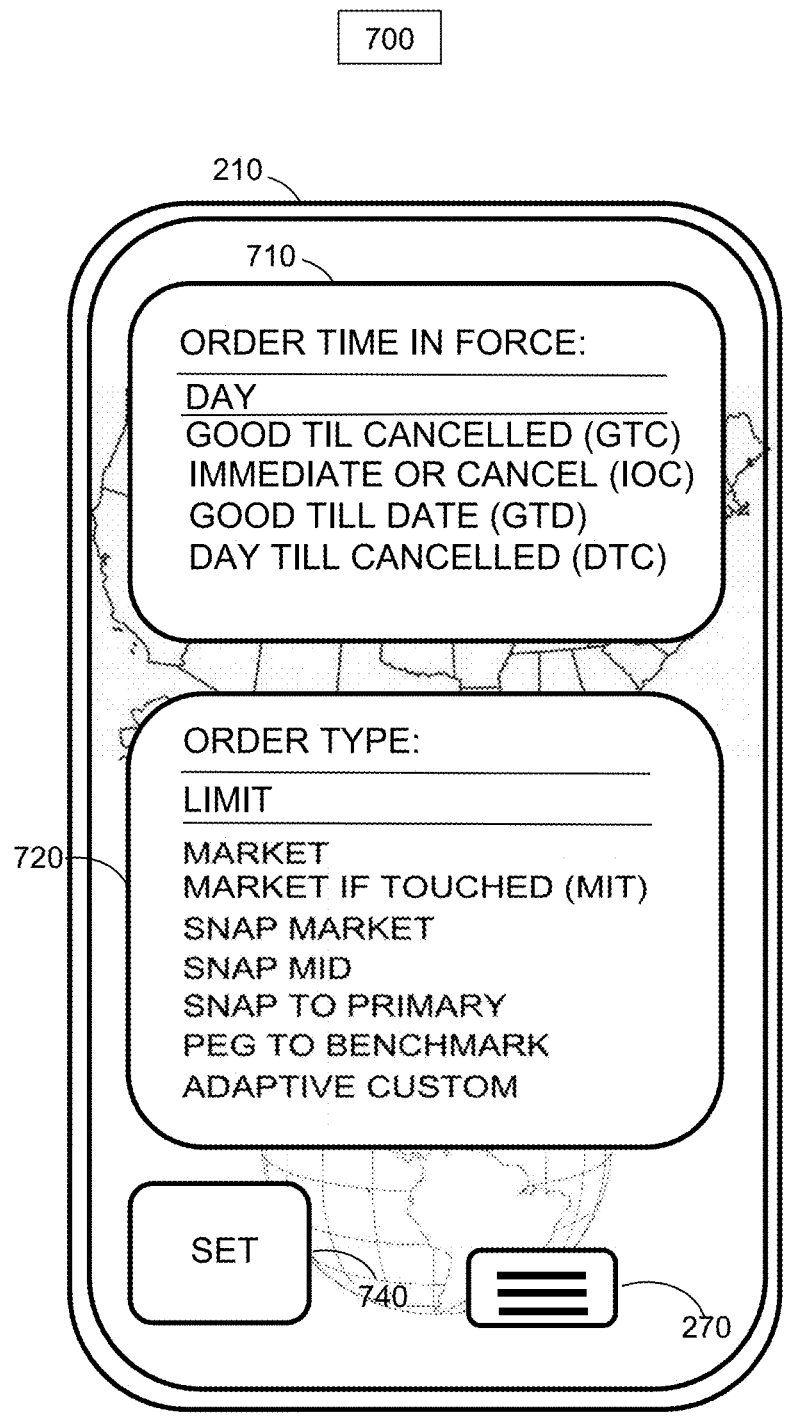
FIG. 7 illustrates an exemplary user interface with various order types and order time in force designations for transportation or freight capacity in accordance with some embodiments.

FIG. 7 illustrates an exemplary user interface 210 for selecting order time in force order types 710 as well as order types 720 on a portable multifunction device in accordance with some embodiments. In some embodiments, user interface 210 includes the following elements, or a subset or superset thereof:

Order time in force specification options 710;
Order type specification options 720;
Setting button 740 to transmit the order time in force specification 710 and Order type specification option 720;
Hamburger button 270 to instruct the GUI 210 to take the user 110 to the menu screen.

In some embodiments, user interface 210 may be used by the user 110 to select a plurality of order time in force 710 specifications. In some embodiments, order time in force selections 710 may include a subset or superset thereof: day (DAY) order 710; good till cancelled order (GTC) 710; immediate or cancel order (IOC) 710; good till date order (GTD) 710; day till cancelled order (DTC) 710. Order time in force 710 specifications may be used to designate how long a user 110 order may be valid. In some embodiments, the GUI 210 may display the definitions of a plurality of order time in force 710 characteristics so that the user 110 may select the appropriate order time in force 710 specification for the transportation or freight capacity unit that the user 110 may participate, transact and/or trade. In some embodiments, the user interface 210 may be used to select the order type 720 specifications. In some embodiments, order type selections 720 may include a subset or superset thereof: Limit 720, Market 720, Market if Touched (MIT) 720; Snap to Market 720; Snap to Mid 720; Snap to primary 720; Peg to benchmark 720; adaptive custom 720. In some embodiments, the GUI 210 may display the definitions of a plurality of order types 720 characteristics so that the user 110 may select the appropriate order type 720 specification for the transportation or freight capacity unit that the user 110 may participate, transact and/or trade. In some embodiments, the user 110, may contact the "set" button 740 to transmit the transportation or freight capacity unit specification data by using the GUI 210 which may instantiate instructions in the memory of the mobile computing device 111 which then transmits transportation or freight capacity data through the network 140 or wireless GPS network 150 to call upon instruction routines and instruction sub-routines on the transportation forward market database server 130, virtual hub database server 120, network member database server 160, no arbitrage condition database server 180 and/or instructions in the memory of the cloud and local CPUs 190 which all interface together to make one system which may deliver transportation capacity units to users 110 from and to a plurality of virtual hubs 410, 422 with a plurality of specifications at specific market prices.

Figure 8:
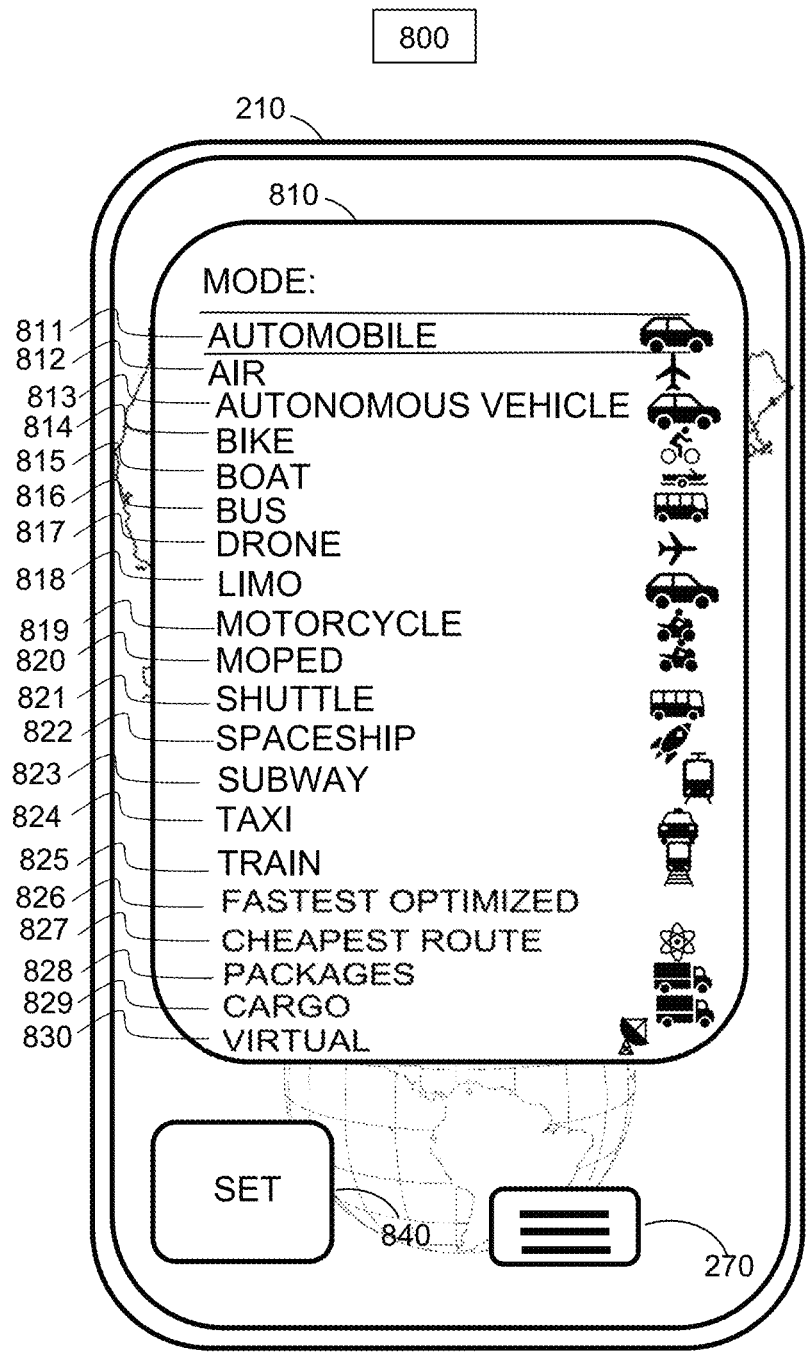
FIG. 8 illustrates an exemplary user interface with various modes of transportation or freight capacity in accordance with some embodiments.

FIG. 8 illustrates an exemplary user interface 210 for selecting virtual hub transportation capacity unit modes 810 on a portable multifunction device in accordance with some embodiments. In some embodiments, user interface 210 includes the following elements, or a subset or superset thereof:

Virtual hub transportation capacity unit modes 810;
Setting button 840 to transmit the virtual hub transportation capacity unit modes 810;
Hamburger button 270 to instruct the GUI 210 to take the user 110 to the menu screen.

In some embodiments, user interface 210 may be used by the user 110 to select a plurality of virtual hub transportation capacity unit modes 810 specifications. In some embodiments, virtual hub transportation capacity unit mode selections 810 may include a subset or superset thereof: Automobile 811; air 812; autonomous vehicle 813; bike 814; boat 815; bus 816; drone 817; limo 818; motorcycle 819; moped 820; shuttle 821; space 822; subway 823; taxi 824; train 825; fastest optimized 826; cheapest route 827; packages 828; cargo 829; virtual 830. In some embodiments, virtual hub transportation capacity unit modes are simply that a user 110 would have a virtual transportation or freight capacity unit seat in an automobile or an airplane as examples, but not limiting by example. In some embodiments, the user 110 may bid on cargo 829 or package capacity 828 in any mode of transportation or freight capacity between a combination of virtual transportation hub locations. In some embodiments, the user 110 may use one or multiple modes of transportation between a combination of virtual transportation hub capacity points. In some embodiments, the user 110, may contact the "set" button 840 to transmit the transportation or freight capacity unit specification mode data by using the GUI 210 which may instantiate instructions in the memory of the mobile computing device 111 which then transmits transportation capacity data through the network 140 or wireless GPS network 150 to call upon instruction routines and instruction sub-routines on the transportation forward market database server 130, virtual hub database server 120, network member database server 160, no arbitrage condition database server 180 and/or instructions in the memory of the cloud and local CPUs 190 which all interface together to make one system which may deliver transportation or freight capacity units to users 110 from and to a plurality of virtual hubs 410, 422 with a plurality of specifications at specific market prices.

Figure 9:
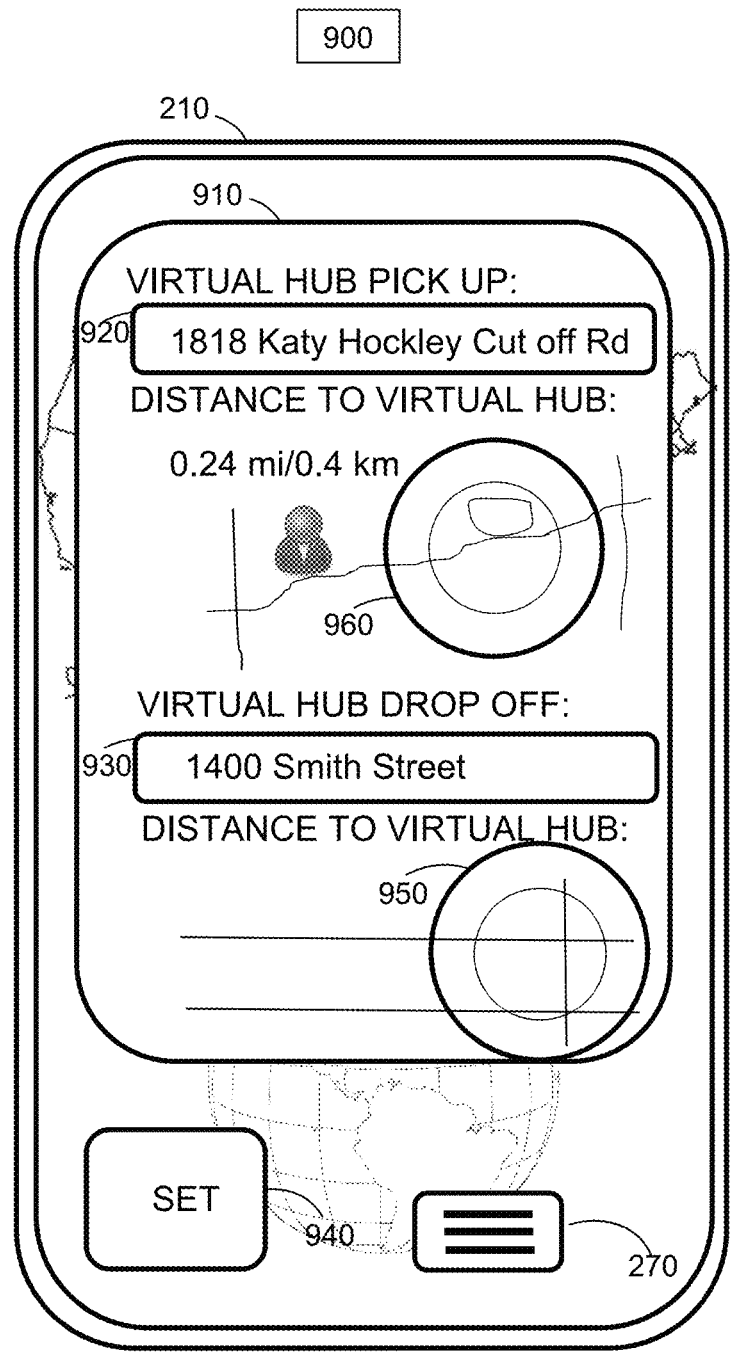
FIG. 9 illustrates an exemplary user interface with the distance between the user and a virtual hub pick up point for transportation or freight capacity as well as the distance between a user and a virtual drop off point for transportation or freight capacity in accordance with some embodiments.

FIG. 9 illustrates an exemplary user interface 210 for identifying the distance the user 110 is from the virtual hub from a map and distance perspective on a portable multifunction device in accordance with some embodiments. In some embodiments, user interface 210 includes the following elements, or a subset or superset thereof:
- Virtual hub transportation capacity unit pick up display 910;
- Virtual hub transportation capacity unit pick up address 920;
- Virtual hub transportation capacity unit drop off address 930;
- Virtual hub transportation capacity pick-up target zone 960;
- Virtual hub transportation capacity drop-off target zone 950;
- Setting button 940 to transmit the virtual hub transportation capacity unit addresses 920, 930;
- Hamburger button 270 to instruct the GUI 210 to take the user 110 to the menu screen.

In some embodiments, user interface 210 may be used by the user 110 to select a plurality of virtual hub transportation capacity unit address 910 specifications. In some embodiments, virtual hub transportation or freight capacity unit address selections 910 may include a subset or superset thereof: virtual hub pick up address 920; virtual hub drop off address 930. In some embodiments, virtual hub transportation capacity unit addresses 920 and 930 may be changed before delivery of a virtual transportation capacity unit. The user interface map and address tool 910 displays the users 110 distance from the address of the virtual transportation or freight hub as well as a map to assist the user 110 in finding the location of the virtual transportation hub. In some embodiments, user interface 210 displays the virtual hub pick up zone 960 on a map in context to the user's 110 location. In some embodiments, user interface 210 displays the virtual hub drop off zone 950 on a map in context to the user's 110 location. In some embodiments, the user 110, may contact the "set" button 940 to transmit the transportation capacity unit specification address data by using the GUI 210 which may instantiate instructions in the memory of the mobile computing device 111 which then transmits transportation or freight capacity data through the network 140 or wireless GPS network 150 to call upon instruction routines and instruction sub-routines on the transportation forward market database server 130, virtual hub database server 120, network member database server 160, no arbitrage condition database server 180 and/or instructions in the memory of the cloud and local CPUs 190 which all interface together to make one system which may deliver transportation or freight capacity units to users 110 from and to a plurality of virtual hubs 410, 422 with a plurality of specifications at specific market prices.

Figure 10:
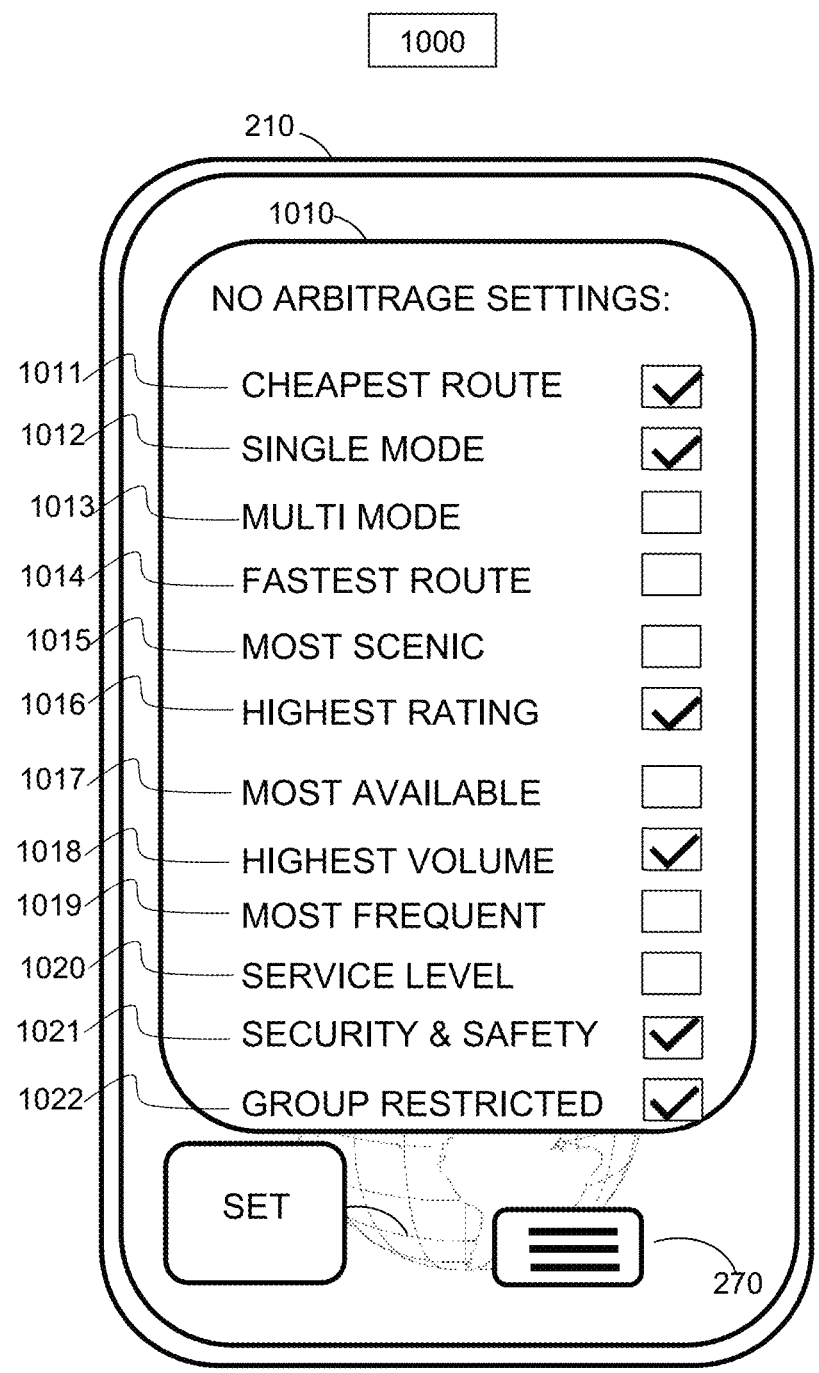
FIG. 10 illustrates an exemplary user interface for settings and constraints of the transportation or freight capacity trading method and system in accordance with some embodiments.

FIG. 10 illustrates an exemplary user interface 210 for identifying the constraints and no arbitrage settings 1010 the user 110 selects on a portable multifunction device in accordance with some embodiments. In some embodiments, user interface 210 includes the following elements, or a subset or superset thereof:
- Constraint and no arbitrage settings 1010;
- Setting button 1040 to transmit the virtual hub transportation capacity constraints and no arbitrage settings;
- Hamburger button 270 to instruct the GUI 210 to take the user 110 to the menu screen.

In some embodiments, user interface 210 may be used by the user 110 to select a plurality of virtual hub transportation capacity constraint and no arbitrage settings 1010. In some embodiments, virtual hub transportation capacity unit constraint and no arbitrage selections 1010 may include a subset or superset thereof: cheapest route 1011; single mode 1012; multi-mode 1013; fastest route 1014; most scenic 1015; highest rating 1016; most available 1017; highest volume 1018; most frequent 1019; service level 1020; security and safety 1021. In some embodiments, the "cheapest route setting" 1011 instantiates instructions in the memory of the CPU 190 to complete a standard cost minimization linear program to assist the user 110 to complete the transportation capacity unit between two virtual hubs with the lowest cost. In some embodiments, the "single mode" 1012 instantiates instructions in the memory of the CPU 190 to set a constraint for the user 110 to complete the transportation capacity unit between two virtual hubs with the only one mode of transportation. In some embodiments, the "multi mode" 1013 instantiates instructions in the memory of the CPU 190 to set a constraint for the user 110 to complete the transportation capacity unit between two virtual hubs with more than one mode of transportation. In some embodiments, the "fastest route" 1014 instantiates instructions in the memory of the CPU 190 to complete standard linear programming equation to minimize travel time for the user 110 to complete the transportation capacity unit between two virtual hubs with the shortest time. In some embodiments, the "most scenic" 1015 instantiates instructions in the memory of the CPU 190 to complete an algorithm with the highest ratings for scenery to assist the user 110 to complete the transportation capacity unit between two virtual hubs with highest scenery rating. In some embodiments, the "highest rating" 1016 instantiates instructions in the memory of the CPU 190 to complete a rating algorithm to assist the user 110 to complete the transportation capacity unit between two virtual hubs with the highest rating. In some embodiments, the "most available" 1017 instantiates instructions in the memory of the CPU 190 to complete a algorithm to search for the route with the most open transportation capacity units to assist the user 110 to complete the transportation capacity unit between two virtual hubs with the most available open seats or open transportation capacity units. In some embodiments, the "highest volume" 1018 instantiates instructions in the memory of the CPU 190 to complete an algorithm to select the route with the highest volume of participants to assist the user 110 to complete the transportation capacity unit between two virtual hubs with the largest number of users 110. In some embodiments, the "most frequent" 1019 instantiates instructions in the memory of the CPU 190 to complete most frequent route analysis from a timing constraint perspective to assist the user 110 to complete the transportation capacity unit between two virtual hubs with the most frequent departures. In some embodiments, the "service level" 1020 instantiates instructions in the memory of the CPU 190 to align the constraint to select the service level to assist the user 110 to complete the transportation capacity unit between two virtual hubs with the correct level of service. In some embodiments, the "security and safety" 1021 instantiates instructions in the memory of the CPU 190 to run safety and security algorithms on the user's 110 based on block chain performance of drivers and riders to assist the user 110 to complete the transportation capacity unit between two virtual hubs with the highest level of safety and security. In some embodiments, the "group restricted" 1022 instantiates instructions in the memory of the CPU 190 to run grouping limitation algorithms on the user's 110 market auction based on limiting the pool of drivers and riders or freight providers and shippers to assist the user 110 to complete the transportation or freight capacity unit between two virtual hubs with a limit on the pool of available users. A user 110 pool for group restricted 1022 settings may limit the user pool displayed by email, security, sex, rating or a plurality of other restrictions. In some embodiments, the user 110, may contact the "set" button 1040 to transmit the transportation or freight capacity unit specification constraint and arbitrage data by using the GUI 210 which may instantiate instructions in the memory of the mobile computing device 111 which then transmits transportation capacity security and safety data through the network 140 or wireless GPS network 150 to call upon instruction routines and instruction sub-routines on the transportation forward market database server 130, virtual hub database server 120, network member database server 160, no arbitrage condition database server 180 and/or instructions in the memory of the cloud and local CPUs 190 which all interface together to make one system which may deliver transportation or freight capacity units to users 110 from and to a plurality of virtual hubs 410, 422 with a plurality of specifications at specific market prices in an auction format.

Figure 11:
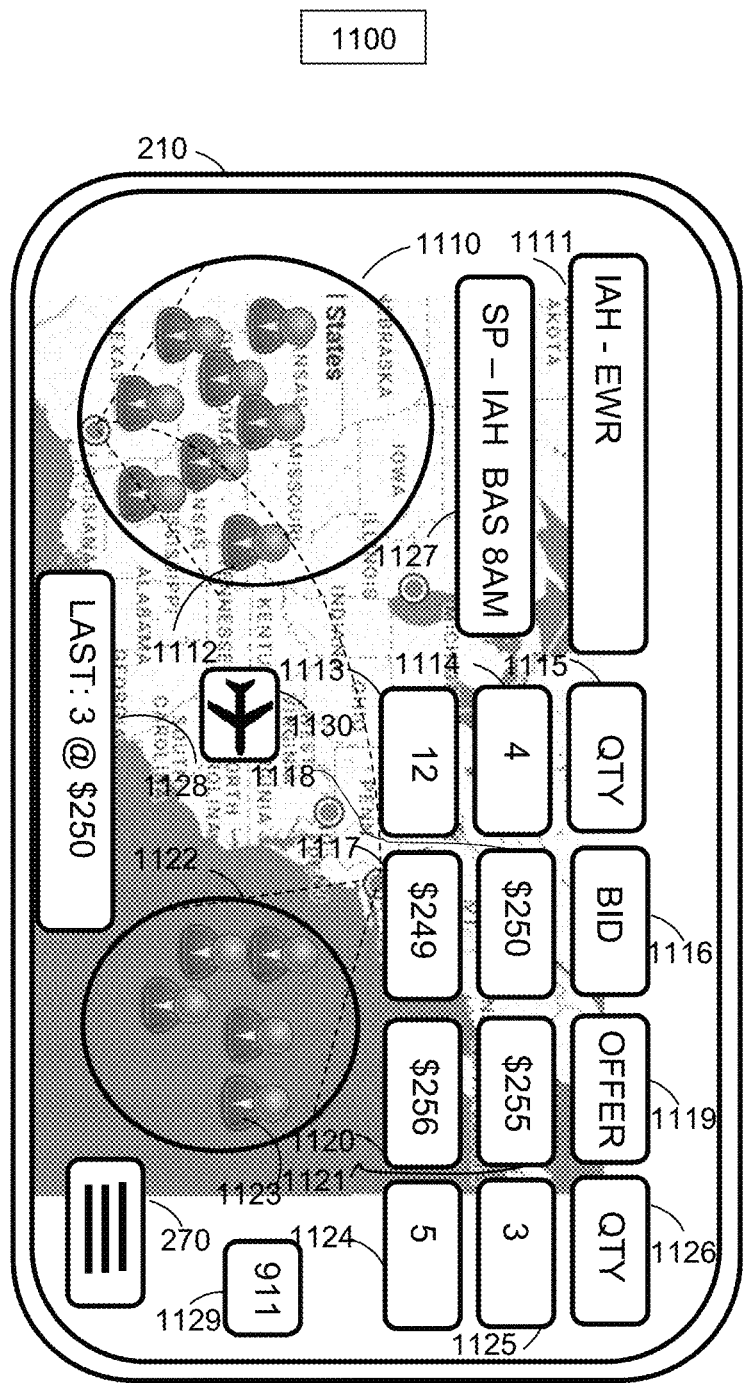
FIG. 11 illustrates an exemplary user interface for transacting and trading domestic air travel transportation or air freight capacity in accordance with some embodiments.

FIG. 11 illustrates exemplary user interfaces 210 for participating, transacting and/or trading transportation or freight as a physical forward commodity between combinations of virtual hubs over various transportation modes. In some embodiments, user interface 210 includes the following elements, or a subset or superset thereof:

Exemplary virtual hub combination 1111;
Exemplary virtual hub origin/from location 1110 with users 1112 within the virtual hub location 1110;
Exemplary specification summary of the market, level of service and time of delivery commencement 1127;
Exemplary mode of air transportation or freight capacity type 1130;
Exemplary transaction summary of the last trades quantity and price 1128;
Exemplary virtual hub destination/to location 1122 and user who is being delivered on the transportation capacity unit 1123;
Exemplary bid/buy quantity title header 1115 for an exemplary virtual transportation hub market;
Exemplary bid/buy price title header 1116 for an exemplary virtual transportation or freight hub market;
Exemplary offer/sell price title header 1119 for an exemplary virtual transportation or freight hub market;
Exemplary offer/sell quantity title header 1126 for an exemplary virtual transportation or freight hub market;
Exemplary bid/buy quantity 1114 for the best bid quantity from a plurality of users 110 for an exemplary respective transportation or freight capacity virtual hub combination 1111;
Exemplary bid/buy quantity 1113 for the second-best bid quantity from a plurality of users 110 for an exemplary respective transportation or freight capacity virtual hub combination 1111;
Exemplary bid/buy price 1118 for the best bid price from a plurality of users 110 for an exemplary respective transportation or freight capacity virtual hub combination 1111;
Exemplary bid/buy price 1117 for the second-best bid price from a plurality of users 110 for an exemplary respective transportation or freight capacity virtual hub combination 1111;
Exemplary offer/sell price 1121 for the best offer price from a plurality of users 110 for an exemplary respective transportation or freight capacity virtual hub combination 1111;
Exemplary offer/sell price 1120 for the second-best offer price from a plurality of users 110 for an exemplary respective transportation or freight capacity virtual hub combination 1111;
Exemplary offer/sell quantity 1125 for the best offer quantity from a plurality of users 110 for an exemplary respective transportation or freight capacity virtual hub combination 1111;
Exemplary offer/sell quantity 1124 for the second-best offer quantity from a plurality of users 110 for an exemplary respective transportation or freight capacity virtual hub combination 1111;
Exemplary safety dispatch "911" button 1129 to enact video and audio recording of the user 110 environment and dispatch of that information to authorities.

Exemplary hamburger menu button 270 to move back to menu options and settings away from the participation, transaction, trading auction GUI 210 embodiment.

In some embodiments the user 110 may enter a transaction quantity and price for transportation or freight capacity units to participate, transact and/or trade by the GUI 210 detecting user 110 contact or audio interface with a bid/buy price 1118 or offer/sell price 1121. The GUI 210 detects user 110 contact with any of the GUI 210 buttons which have been aforementioned. Upon user 110 contact or audio interface with buttons on the GUI 210, instructions are instantiated which allow the user 110 to change the specifications of the respective virtual hub combination 1111. A plurality of prices and markets may be presented based on a plurality of contract specifications. In some embodiments, the best bid/buy price 1118 may be moving up in price or down in price depending on the market conditions at any given time. In some embodiments the last trade or last transacted price for a given specification is listed to help the user 110 understand how the market is moving so that the user 110 may submit a competitive offer/selling price 1121 or bid/buying price 1118. In some embodiments, users 110 may adjust settings of the GUI 210 to show more bid/buying prices 1117 or more offer/selling prices 1120. In some embodiments the matrix of market quantities and prices 1113, 1114, 1115, 1116, 1117, 1118, 1119, 1120, 1121, 1124, 1125, 1126 may be referred to as market depth in the GUI 210 embodiment. In some embodiments the number of users 110 may be displayed as user icons 1112 or 1123 for the amount of people logged in which desire to transact, trade or participate in a given virtual hub 1110 to virtual hub 1122 combination. In some embodiments, users 110 may select the transportation mode 1130 such that the user allows a market for only one form of transportation capacity as a commodity or the user 110 may allow the system to show multiple forms of transportation capacity between two virtual transportation capacity hubs 1110, 1111, 1122. In some embodiments the GUI 210 may detect a user 110 selecting the 911 button 1129 which may activate voice and video recording functions on the mobile or stationary device 111 and transmit the data with a confirmation from the user 110 to the authorities to provide enhanced security while participating, transacting or trading forward transportation as a commodity. In some embodiments the user may toggle between the GUI 210 market view screen in FIG. 3 and other menu 270 options and settings by the user 110 selecting the hamburger button 270 and the GUI 210 detecting the user 110 input or contact or audio instruction. In some embodiments the GUI 210 may instantiate instructions in the memory of the mobile computing device 111 which then transmits transportation or freight capacity data through the network 140 or wireless GPS network 150 to call upon instruction routines and instruction sub-routines on the transportation forward market database server 130, virtual hub database server 120, network member database server 160, no arbitrage condition database server 180 and/or instructions in the memory of the cloud and local CPUs 190 which all interface together to make one system which may deliver transportation capacity units to users 110 from and to a plurality of virtual hubs 1110, 1122 with a plurality of specifications at specific market prices.

Figure 12:
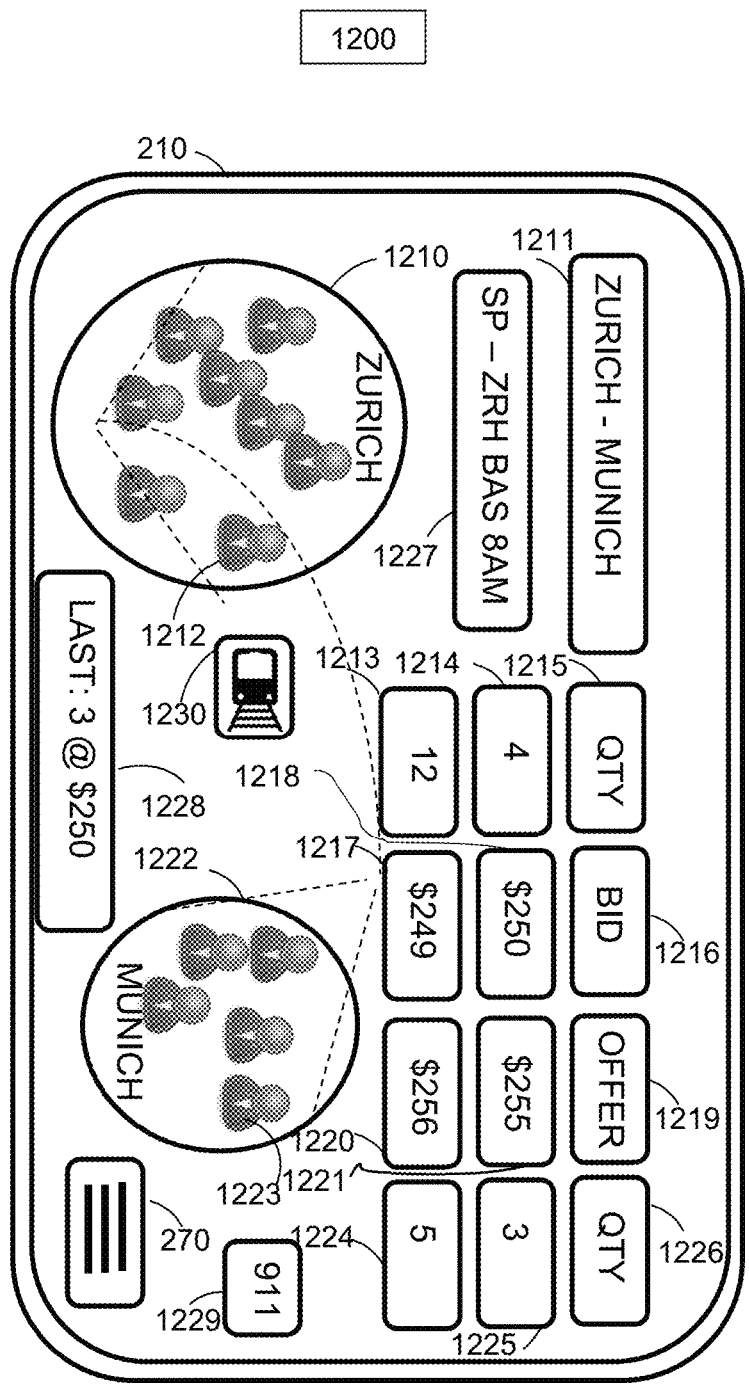
FIG. 12 illustrates an exemplary user interface for transacting and trading international train transportation or train freight capacity in accordance with some embodiments.

FIG. 12 illustrates exemplary user interfaces 210 for participating, transacting and/or trading transportation as a physical forward commodity between combinations of virtual hubs over various transportation modes. In some embodiments, user interface 210 includes the following elements, or a subset or superset thereof:

Exemplary virtual hub combination 1211;

Exemplary virtual hub origin/from location 1210 with users 1212 within the virtual hub location 1210;

Exemplary specification summary of the market, level of service and time of delivery commencement 1227;

Exemplary mode of train transportation capacity type 1230;

Exemplary transaction summary of the last trades quantity and price 1228;

Exemplary virtual hub destination/to location 1222 and user who is being delivered on the transportation or freight capacity unit 1223;

Exemplary bid/buy quantity title header 1215 for an exemplary virtual transportation or freight hub market;

Exemplary bid/buy price title header 1216 for an exemplary virtual transportation or freight hub market;

Exemplary offer/sell price title header 1219 for an exemplary virtual transportation or freight hub market;

Exemplary offer/sell quantity title header 1226 for an exemplary virtual transportation for freight hub market;

Exemplary bid/buy quantity 1214 for the best bid quantity from a plurality of users 110 for an exemplary respective transportation or freight capacity virtual hub combination 1211;

Exemplary bid/buy quantity 1213 for the second-best bid quantity from a plurality of users 110 for an exemplary respective transportation or freight capacity virtual hub combination 1211;

Exemplary bid/buy price 1218 for the best bid price from a plurality of users 110 for an exemplary respective transportation or freight capacity virtual hub combination 1211;

Exemplary bid/buy price 1217 for the second-best bid price from a plurality of users 110 for an exemplary respective transportation or freight capacity virtual hub combination 1211;

Exemplary offer/sell price 1221 for the best offer price from a plurality of users 110 for an exemplary respective transportation or freight capacity virtual hub combination 1211;

Exemplary offer/sell price 1220 for the second-best offer price from a plurality of users 110 for an exemplary respective transportation or freight capacity virtual hub combination 1211;

Exemplary offer/sell quantity 1225 for the best offer quantity from a plurality of users 110 for an exemplary respective transportation or freight capacity virtual hub combination 1211;

Exemplary offer/sell quantity 1224 for the second-best offer quantity from a plurality of users 110 for an exemplary respective transportation or freight capacity virtual hub combination 1211;

Exemplary safety dispatch "911" button 1229 to enact video and audio recording of the user 110 environment and dispatch of that information to authorities.

Exemplary hamburger menu button 270 to move back to menu options and settings away from the participation, transaction, trading GUI 210 embodiment.

In some embodiments the user 110 may enter a transaction quantity and price for transportation or freight capacity units to participate, transact and/or trade by the GUI 210 detecting user 110 contact with a bid/buy price 1218 or offer/sell price 1221. The GUI 210 detects user 110 contact with any of the GUI 210 buttons which have been aforementioned. Upon user 110 contact with buttons or audio interface on the GUI 210, instructions are instantiated which allows the user 110 to change the specifications of the respective virtual hub combination 1211. A plurality of prices and markets may be presented based on a plurality of contract specifications. In some embodiments, the best bid/buy price 1118 may be moving up in price or down in price depending on the market conditions at any given time. In some embodiments the last trade or last transacted price for a given specification is listed to help the user 110 understand how the market is moving so that the user 110 may submit a competitive offer/selling price 1221 or bid/buying price 1214. In some embodiments, users 110 may adjust settings of the GUI 210 to show more bid/buying prices 1217 or more offer/selling prices 1120. In some embodiments the matrix of market quantities and prices 1213, 1214, 1215, 1216, 1217, 1218, 1219, 1220, 1221, 1224, 1225, 1226 may be referred to as market depth in the GUI 210 embodiment. In some embodiments the number of users 110 may be displayed as user icons 1212 or 1223 for the amount of people logged in which desire to transact, trade or participate in a given virtual hub 1210 to virtual hub 1222 combination. In some embodiments, users 110 may select the transportation mode 1230 such that the user allows a market for only one form of transportation capacity as a commodity or the user 110 may allow the system to show multiple forms of transportation capacity between two virtual transportation capacity hubs 1210, 1211, 1222. In some embodiments the GUI 210 may detect a user 110 selecting the 911 button 1229 which may activate voice and video recording functions on the mobile or stationary device 111 and transmit the data with a confirmation from the user 110 to the authorities to provide enhanced security while participating, transacting or trading forward transportation or freight units as a commodity. In some embodiments the user may toggle between the GUI 210 market view screen in FIG. 3 and other menu 270 options and settings by the user 110 selecting the hamburger button 270 and the GUI 210 detecting the user 110 input or contact or audio instructions. In some embodiments the GUI 210 may instantiate instructions in the memory of the mobile computing device 111 which then transmits transportation or freight capacity data through the network 140 or wireless GPS network 150 to call upon instruction routines and instruction sub-routines on the transportation forward market database server 130, virtual hub database server 120, network member database server 160, no arbitrage condition database server 180 and/or instructions in the memory of the cloud and local CPUs 190 which all interface together to make one system which may deliver transportation or freight capacity units to users 110 from and to a plurality of virtual hubs 1210, 1222 with a plurality of specifications at specific market prices.

Figure 13:
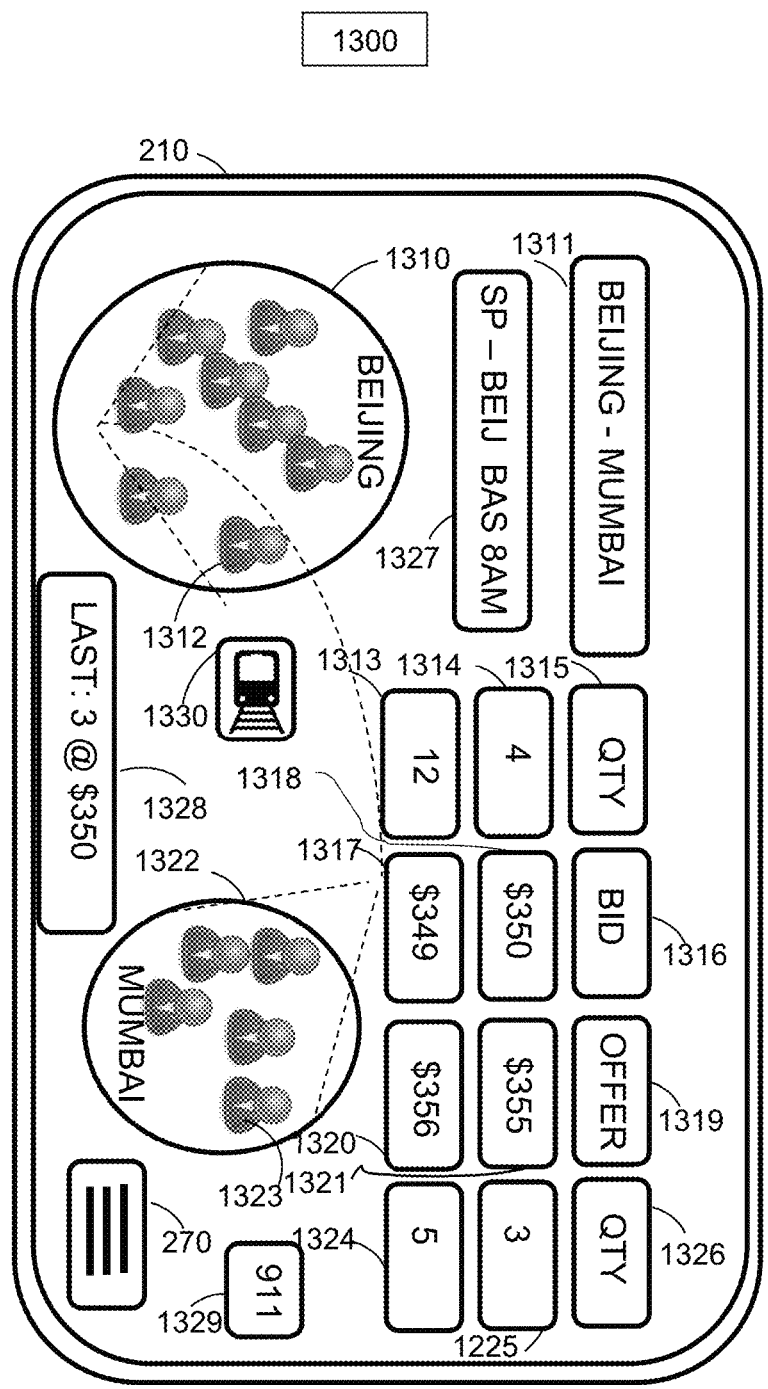
FIG. 13 illustrates an exemplary user interface for transacting and trading international train transportation or train freight capacity in accordance with some embodiments.

FIG. 13 illustrates exemplary user interfaces 210 for participating, transacting and/or trading transportation as a physical forward commodity between combinations of virtual hubs over various transportation modes. In some embodiments, user interface 210 includes the following elements, or a subset or superset thereof:

Exemplary virtual hub combination 1311;
Exemplary virtual hub origin/from location 1310 with users 1312 within the virtual hub location 1310;
Exemplary specification summary of the market, level of service and time of delivery commencement 1327;
Exemplary mode of train transportation capacity type 1330;
Exemplary transaction summary of the last trades quantity and price 1328;
Exemplary virtual hub destination/to location 1322 and user who is being delivered on the transportation or freight capacity unit 1323;
Exemplary bid/buy quantity title header 1315 for an exemplary virtual transportation or freight hub market;
Exemplary bid/buy price title header 1316 for an exemplary virtual transportation or freight hub market;
Exemplary offer/sell price title header 1319 for an exemplary virtual transportation or freight hub market;
Exemplary offer/sell quantity title header 1326 for an exemplary virtual transportation or freight hub market;
Exemplary bid/buy quantity 1314 for the best bid quantity from a plurality of users 110 for an exemplary respective transportation or freight capacity virtual hub combination 1311;
Exemplary bid/buy quantity 1313 for the second-best bid quantity from a plurality of users 110 for an exemplary respective transportation or freight capacity virtual hub combination 1311;
Exemplary bid/buy price 1318 for the best bid price from a plurality of users 110 for an exemplary respective transportation or freight capacity virtual hub combination 1311;
Exemplary bid/buy price 1317 for the second-best bid price from a plurality of users 110 for an exemplary respective transportation or freight capacity virtual hub combination 1311;
Exemplary offer/sell price 1321 for the best offer price from a plurality of users 110 for an exemplary respective transportation or freight capacity virtual hub combination 1311;
Exemplary offer/sell price 1320 for the second-best offer price from a plurality of users 110 for an exemplary respective transportation or freight capacity virtual hub combination 1311;
Exemplary offer/sell quantity 1325 for the best offer quantity from a plurality of users 110 for an exemplary respective transportation or freight capacity virtual hub combination 1311;
Exemplary offer/sell quantity 1324 for the second-best offer quantity from a plurality of users 110 for an exemplary respective transportation or freight capacity virtual hub combination 1311;
Exemplary safety dispatch "911" button 1329 to enact video and audio recording of the user 110 environment and dispatch of that information to authorities.
Exemplary hamburger menu button 270 to move back to menu options and settings away from the participation, transaction, trading GUI 210 embodiment.

In some embodiments the user 110 may enter a transaction quantity and price for transportation or freight capacity units to participate, transact and/or trade by the GUI 210 detecting user 110 contact or audio instructions with a bid/buy price 1318 or offer/sell price 1321. The GUI 210 detects user 110 contact with any of the GUI 210 buttons which have been aforementioned. Upon user 110 contact or audio interface with buttons or audio instructions on the GUI 210, instructions are instantiated which allows the user 110 to change the specifications of the respective virtual hub combination 1311. A plurality of prices and markets may be presented based on a plurality of contract specifications. In some embodiments, the best bid/buy price 1318 may be moving up in price or down in price depending on the market conditions at any given time. In some embodiments the last trade or last transacted price for a given specification is listed to help the user 110 understand how the market is moving so that the user 110 may submit a competitive offer/selling price 1321 or bid/buying price 1314. In some embodiments, users 110 may adjust settings of the GUI 210 to show more bid/buying prices 1317 or more offer/selling prices 1320. In some embodiments the matrix of market quantities and prices 1313, 1314, 1315, 1316, 1317, 1318, 1319, 1320, 1321, 1324, 1325, 1326 may be referred to as market depth in the GUI 210 embodiment. In some embodiments the number of users 110 may be displayed as user icons 1312 or 1323 for the amount of people logged in which desire to transact, trade or participate in a given virtual hub 1310 to virtual hub 1322 combination. In some embodiments, users 110 may select the transportation mode 1330 such that the user allows a market for only one form of transportation capacity as a commodity or the user 110 may allow the system to show multiple forms of transportation or freight capacity between two virtual transportation capacity hubs 1310, 1311, 1322. In some embodiments the GUI 210 may detect a user 110 selecting the 911 button 1329 which may activate voice and video recording functions on the mobile or stationary device 111 and transmit the data with a confirmation from the user 110 to the authorities to provide enhanced security while participating, transacting or trading forward transportation or freight as a commodity. In some embodiments the user may toggle between the GUI 210 market view screen in FIG. 3 and other menu 270 options and settings by the user 110 selecting the hamburger button 270 and the GUI 210 detecting the user 110 input or contact. In some embodiments the GUI 210 may instantiate instructions in the memory of the mobile computing device 111 which then transmits transportation or freight capacity data through the network 140 or wireless GPS network 150 to call upon instruction routines and instruction sub-routines on the transportation forward market database server 130, virtual hub database server 120, network member database server 160, no arbitrage condition database server 180 and/or instructions in the memory of the cloud and local CPUs 190 which all interface together to make one system which may deliver transportation or freight capacity units to users 110 from and to a plurality of virtual hubs 1310, 1322 with a plurality of specifications at specific market prices.

Figure 14:
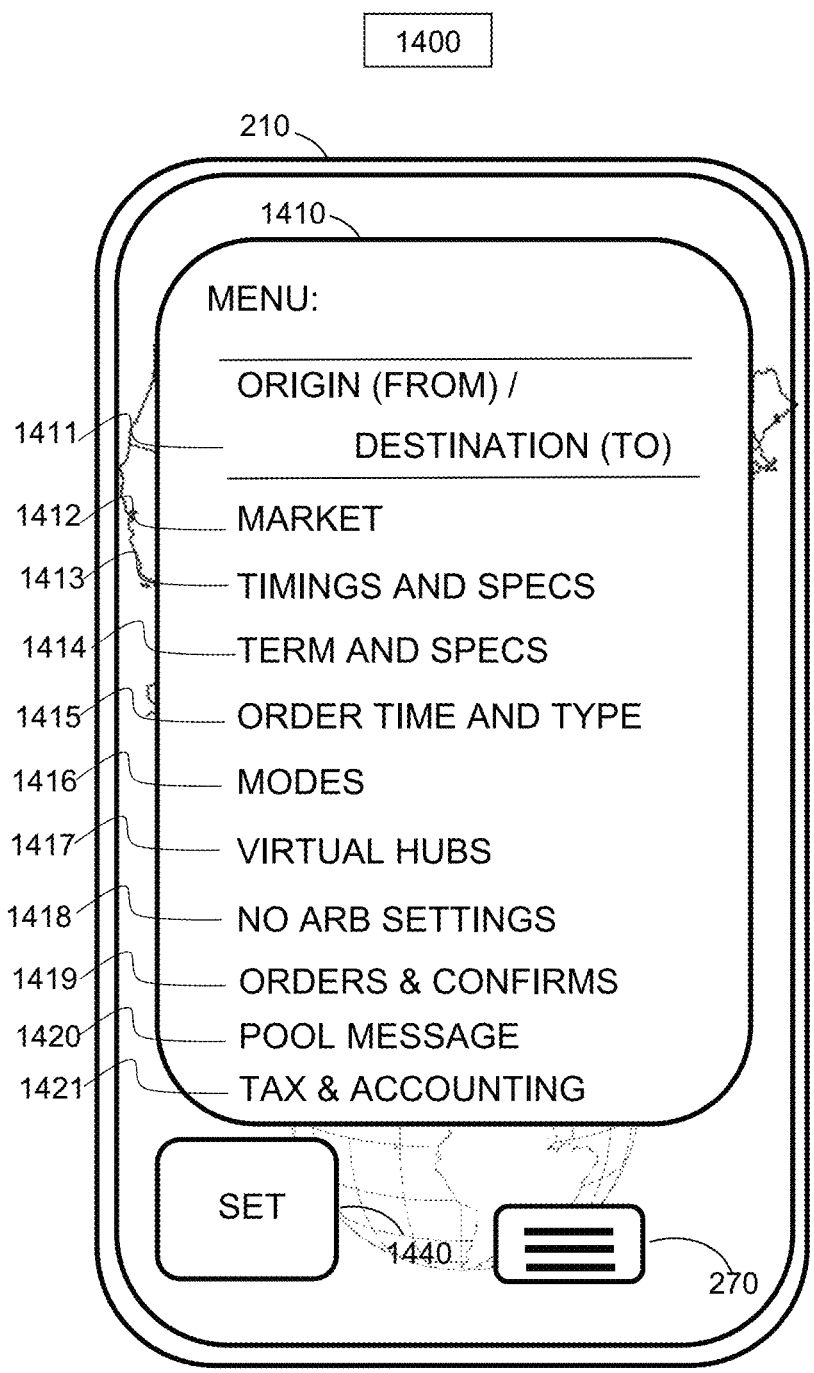
FIG. 14 illustrates an exemplary user interface for transacting and trading various menu options within the system and method in accordance with some embodiments.

FIG. 14 illustrates an exemplary user interface 210 for selecting menu options 1410 on a portable multifunction device in accordance with some embodiments. In some embodiments, user interface 210 includes the following elements, or a subset or superset thereof:

Menu options 1410;
Origin (From)/Destination (to) menu option 1411;
Market menu option 1412;
Timings and Specs menu option 1413;
Term and Specs menu option 1414;
Order time and type menu option 1415;
Modes menu option 1416;
Virtual Hubs menu option 1417;
No arb settings menu option 1418;
Orders and Confirms menu option 1419;
Pool Message menu option 1420;
Tax and Accounting menu option 1421;
Setting button 1440 to transmit the menu option;

Hamburger button 270 to instruct the GUI 210 to take the user 110 to the menu screen.

In some embodiments, user interface 210 may be used by the user 110 to select a plurality of menu options 1410. In some embodiments, the user 110 may select the origin (from)/destination (to) menu option 1411 which may instruct the GUI 210 to go to an address input rendering 910 and/or FIG. 2. In some embodiments, the user 110, may contact the "market" menu option 1412 which my instruct the GUI 210 to render a market participation, transaction and/or trading screen such as 300, 400, 1100, 1200, or 1300. In some embodiments the user may toggle between the GUI 210 market view screen in FIG. 3 and other menu 270 options and settings by the user 110 selecting the hamburger button 270 and the GUI 210 detecting the user 110 input or contact. In some embodiments, the user 110, may contact the "timings and specs" menu option 1413 which may instruct the GUI 210 to render a timings and specs screen such as 500. In some embodiments, the user 110, may contact the "term and specs" menu option 1414 which may instruct the GUI 210 to render a term and specs screen such as 600. In some embodiments, the user 110, may contact the "order time and type" menu option 1415 which may instruct the GUI 210 to render an order time and type screen such as 700. In some embodiments, the user 110, may contact the "modes" menu option 1416 which may instruct the GUI 210 to render a mode screen such as 800. In some embodiments, the user 110, may contact the "Virtual Hubs" menu option 1417 which may instruct the GUI 210 to render a virtual hubs screen such as 900. In some embodiments, the user 110, may contact the "no arb settings" menu option 1418 which may instruct the GUI 210 to render a no arbitrage constraint screen such as 1000. In some embodiments, the user 110, may contact the "orders and confirms" menu option 1419 which may instruct the GUI 210 to render the market orders and transaction confirmations for the user 110. In some embodiments, the user 110, may contact the "pool message" menu option 1420 which may instruct the GUI 210 to message either the actual transportation capacity unit 170 or the opposite seller user 110 or buyer user 110 depending on if the user 110 was an opposite buyer or seller of the transportation capacity unit. In some embodiments, the user 110, may contact the "tax and accounting" menu option 1421 which may instruct the GUI 210 to render tax and accounting information for the respective user 110. In some embodiments the GUI 210 menu option selection 1410 may instantiate instructions in the memory of the mobile computing device 111 which then transmits transportation capacity data through the network 140 or wireless GPS network 150 to call upon instruction routines and instruction subroutines on the transportation forward market database server 130, virtual hub database server 120, network member database server 160, no arbitrage condition database server 180 and/or instructions in the memory of the cloud and local CPUs 190 which all interface together to make one system which may deliver transportation or freight capacity units to users 110 from and to a plurality of virtual hubs 410, 422 with a plurality of specifications at specific market prices.

Figure 15:
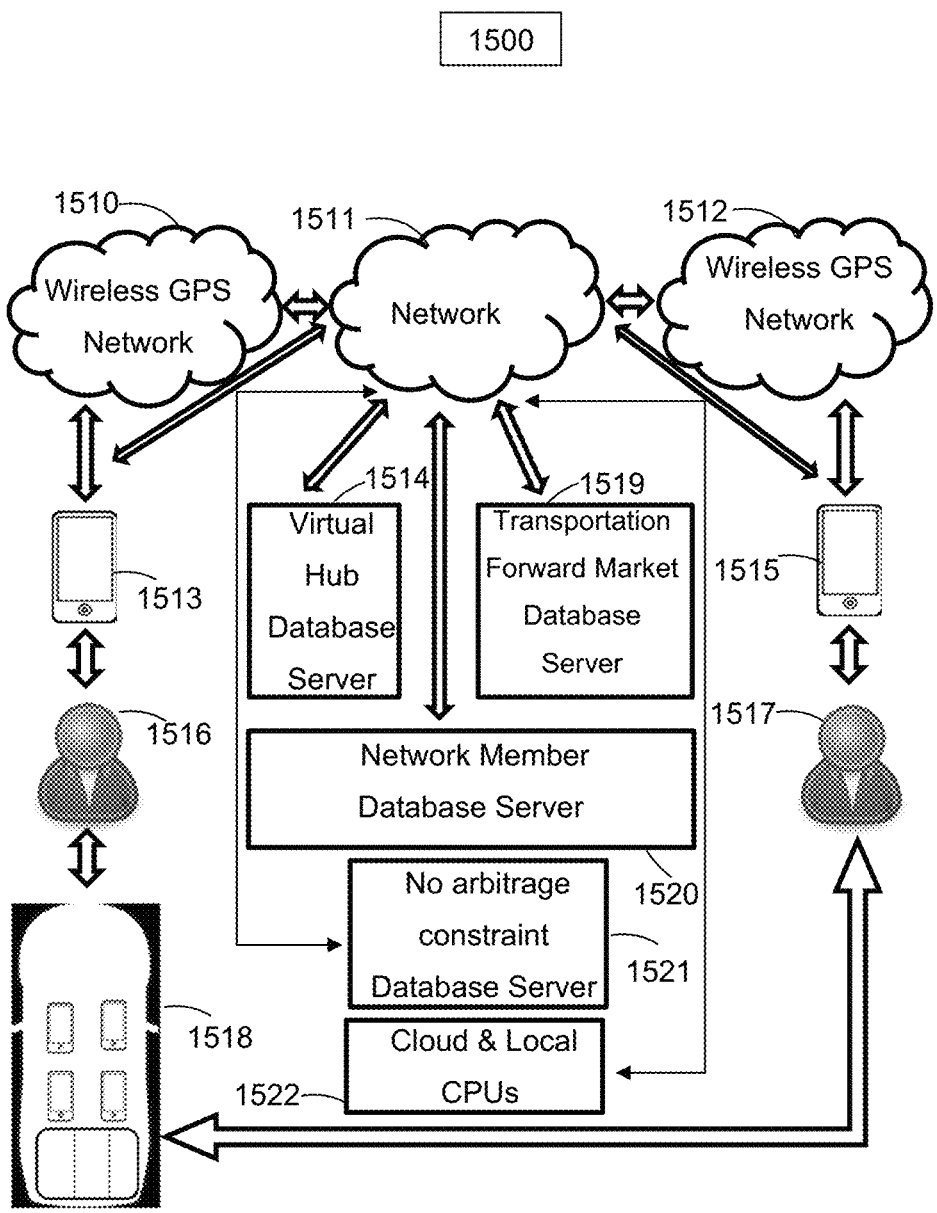
FIG. 15 illustrates a schematic diagram of a network configuration and implementations of methods which support the method and system of trading transportation capacity in accordance with some embodiments.

FIG. 15 illustrates an exemplary network configuration 1500 in one exemplary implementation of participating, transacting and/or trading transportation or freight capacity units in accordance with some embodiments. In some embodiments, network configuration 1500 includes the following elements, or a subset or superset thereof:

Wireless global positioning system (GPS) network 1510;
Network/s 1511;
Additional global positioning system (GPS) network 1512;
User member portable multifunction device 1513;
Virtual hub database server 1514;
Transportation forward market database server 1519;
Additional user member portable multifunction device 1515;
Network member database server 1520;
Network member user 1516;
Additional network member user 1517;
No arbitrage constraint database server 1521;
Cloud and Local CPUs 1522;
Transportation or freight capacity unit mode 1518.

In some embodiments, the software and/or instructions stored in memory of the cloud & local CPUs 1522 and portable multifunction devices 1513, 1515 may include additional instructions to instantiate specification requirements, participation, transactions, and/or trading on the transportation or freight capacity unit network 1511. In some embodiments, instructions may include standard database web services with the database as service provider (i.e. calling from the outside in, which lets the client GUI 210 or 1513 call each of the virtual hub database server 1514 and/or transportation forward market database server 1519 and/or network member database server 1520 and/or no arbitrage constraint database server 1521 and/or cloud & local CPUs 1522 through the wireless GPS network 1510 or network 1511. In some embodiments, each of the virtual hub database server 1514 and/or transportation forward market database server 1519 and/or network member database server 1520 and/or no arbitrage constraint database server 1521 and/or cloud & local CPUs 1522 may instruct the network to instantiate the database servers 1514, 1519, 1520, 1521, 1522 as service consumers (i.e. calling from the inside out, which lets a SQL query or application module in the database session consume an external web service. In some embodiments, users 1516 and/or 1517 may use portable multifunction devices 1513 and/or 1515 to access the transportation or freight capacity unit market GUI 210 so that the users 1516 and/or 1517 may participate, transact and/or trade transportation or freight capacity units. In some embodiments, the virtual hub database server 1514 stores map tile data in addition to user location data which is utilized by the GUI 210 to display or render location of virtual hubs and user 1516 proximity to those virtual hubs 200, 300, 400, 900, 1100, 1200, 1300. In some embodiments, the transportation forward market database server 1519 stores bid and offer data for respective quantities of users as well as transaction data and a plurality of market data for each virtual hub combination. In some embodiments, the network member database server 1520 stores user profile, user transaction, user trade, user settings, user specifications, user rating, user criminal history or background check data or facial recognition data or fingerprint recognition data or photo scan recognition data or ride history data, user track record, user bank data, user credit card data, user history data, user tax data and a plurality of other data. In some embodiments, the no arbitrage constraint database server 1521 stores data and algorithms to identify user 110 constraints 1000 and run algorithm calculations for users on specific constraints to check for compliance with constraints. In some embodiments, network servers and CPUs 1514, 1519, 1520, 1521, 1522, 1513, 1515 my interface through the network 1511 and/or wireless GPS networks 1510, 1512 such that transportation or freight capacity units may be participated in, transacted and/or traded efficiently in the context of a market for transportation capacity units.

Included aforementioned data elements may be a subset or superset of data used for any specific calculation to participate, transact or trade transportation or freight capacity units.

Figure 16:
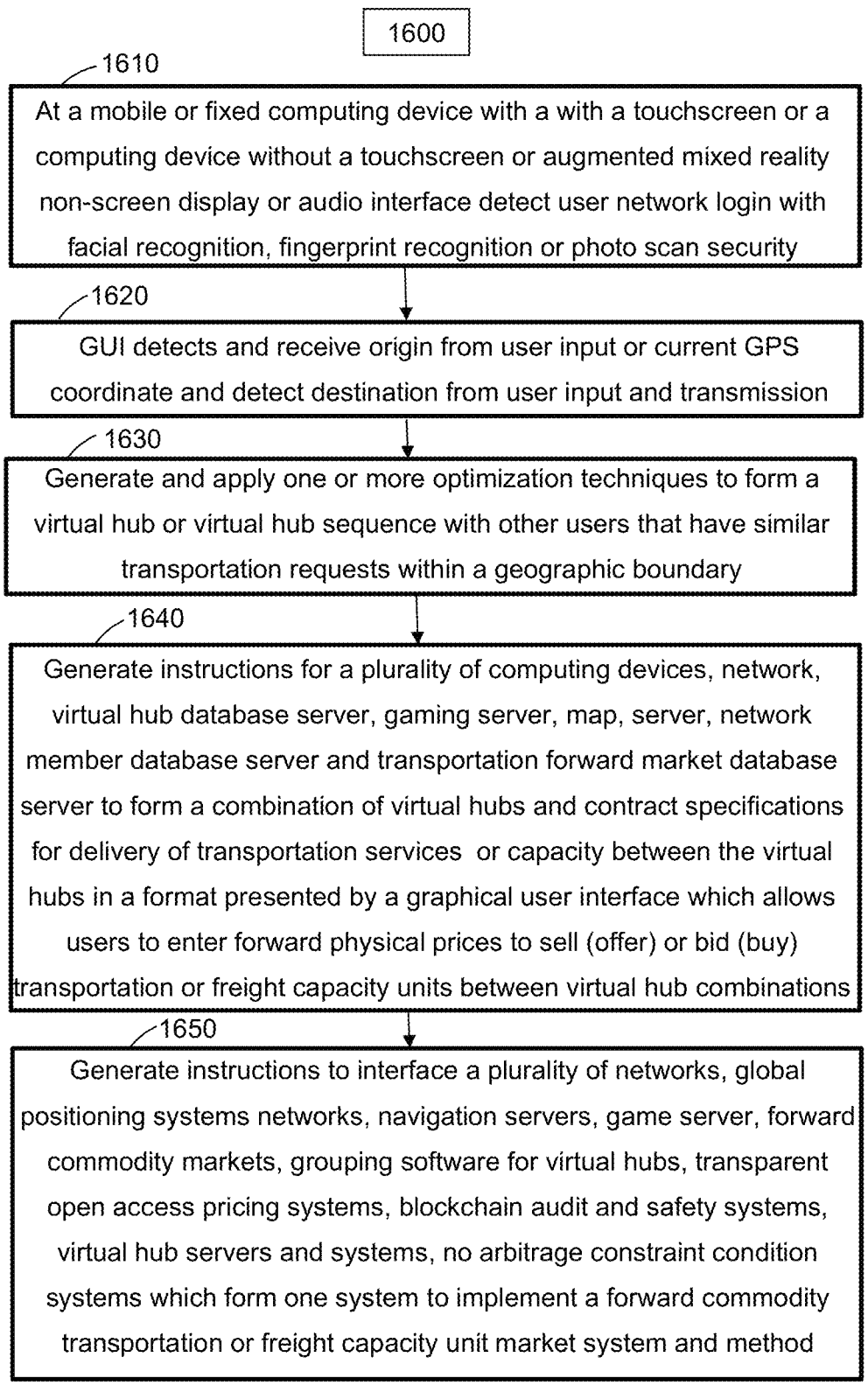
FIG. 16 is a flow diagram illustrating methods exemplary users move through while participating, transacting and trading transportation or freight capacity in accordance with some embodiments.

FIG. 16 illustrates a flowchart embodiment of steps a user may perform to participate, transact and/or trade transportation capacity units between virtual hub combinations. In some embodiments a user at a mobile or portable multifunction device and/or fixed computing device with a touchscreen or a computing device without a touchscreen or augmented, audio interface computing device, mixed reality non-screen display may detect user login to the transportation capacity unit network 1610. In some embodiments, the GUI of the transportation capacity unit network may detect and receive origin location from user input or current GPS coordinate information and detect destination address from user input and transmission of data 1620. In some embodiments, the GUI and/or CPUs and/or databases may generate and apply one or more optimization techniques to form a virtual hub with other users that have similar transportation requests within a geographic boundary 1630. In some embodiments, the GUI and/or CPUs and or databases may generate instructions for a plurality of computing devices, network, virtual hub database server, network member database server and transportation forward market database server 130 to form a combination of virtual hubs and contract specifications for delivery of transportation services or transportation or freight capacity between the virtual hubs in a format presented by a graphical user interface which allows users to enter forward physical prices to sell (offer) or bid (buy) transportation capacity units between virtual hub combinations 1640 in an open market auction format. In some embodiments, the GUI and/or CPUs and or databases may generate instructions to interface a plurality of networks, global positioning systems networks, servers, forward commodity market auctions, grouping instruction software for virtual hubs, navigation servers, transparent open access pricing systems, game servers, blockchain audit and safety systems, virtual hub servers and systems, no arbitrage constraint condition systems which form one system to implement a forward commodity transportation or freight capacity unit forward market system and method 1650.

Figure 17:
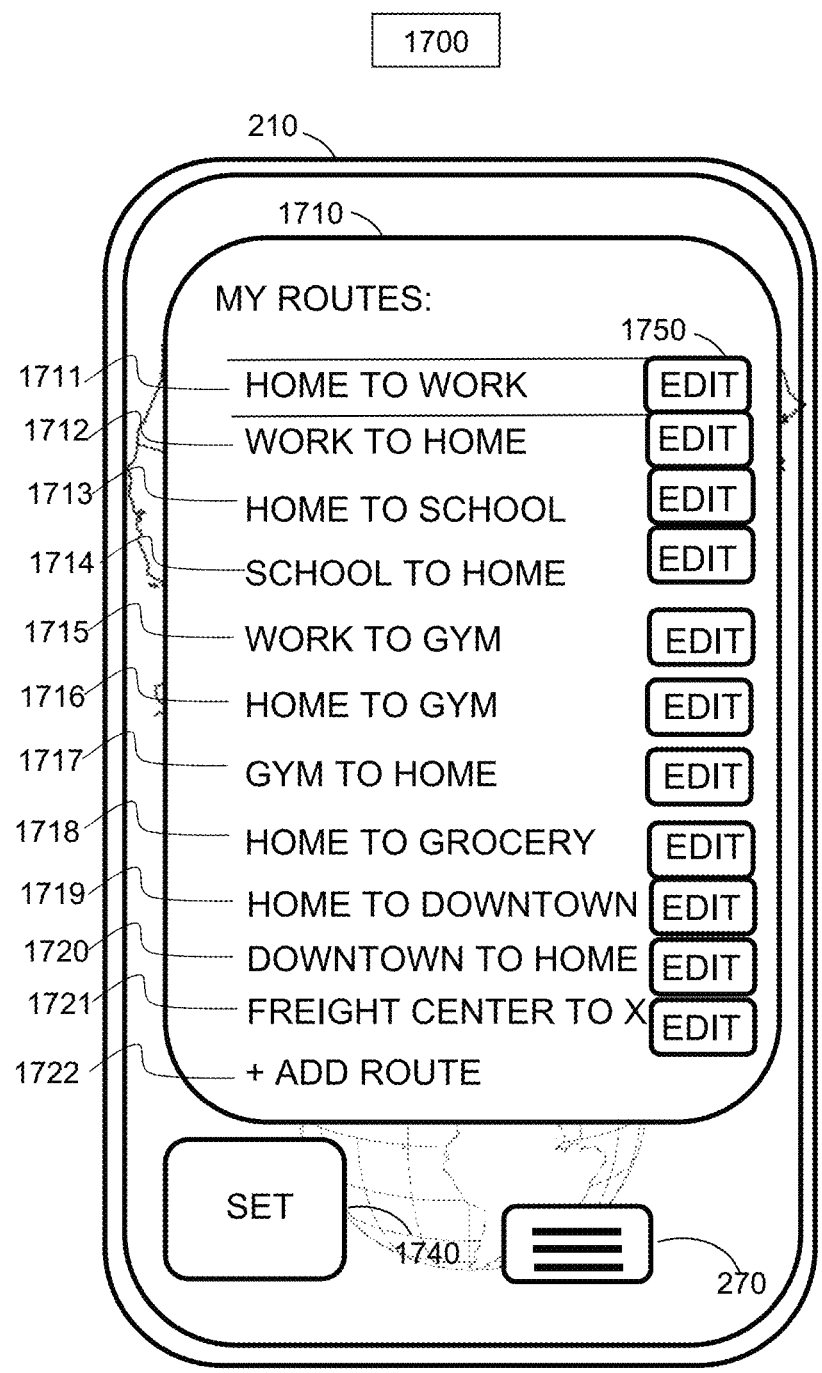
FIG. 17 illustrates an exemplary user interface for displaying most frequent routes in accordance with some embodiments.

FIG. 17 illustrates an exemplary embodiment of a user 110 most frequent transportation or freight unit routes 1710 in one exemplary implementation of participating, transacting and/or trading transportation or freight capacity units in accordance with some embodiments. In some embodiments, most frequent my routes include the following elements, or a subset or superset thereof:

Home to Work 1711;
Work to Home 1712;
Home to School 1713;
School to Home 1714;
Work to Gym 1715;
Home to Gym 1716;
Gym to Home 1717;
Home to Grocery 1718;
Home to Downtown 1719;
Downtown to Home 1720;
Freight Center to X where X is a delivery route or multi virtual hub combination 1721;
+Add Route 1722;
Edit 1723;
Setting button 1740 to transmit the My Routes data;
Hamburger button 270 to instruct the GUI 210 to take the user 110 to the menu screen.

In some embodiments, the GUI 210 may be used to select, store and/or edit user 110 frequent or preferred routes ("MY ROUTES") 1710 for more efficient access to transportation capacity unit markets over various modes and specifications of transportation capacity. In some embodiments, the user 110 may select, store and/or edit address and specification data for "Home to Work" 1711 and/or "Work to Home" 1712 and/or "Home to School" 1713 and/or "School to Home" 1714 and/or "Work to Gym" 1715 and/or "Home to Gym" 1716 and/or "Gym to Home" 1717 and/or "Home to Grocery" 1718 and/or "Home to Downtown" 1719 and/or "Downtown to Home" 1720 and/or "Freight Center to X" 1721 and/or "+Add Route" 1722. In some embodiments, the My Routes 1710 module may include any route a user 110 may request on any transportation or freight capacity unit mode and/or specification. In some embodiments the user may toggle between the GUI 210 market view screen in FIG. 3 and other menu 270 options and settings by the user 110 selecting the hamburger button 270 and the GUI 210 detecting the user 110 input or contact. In some embodiments, the user 110 is notified via SMS text, in application, email or a plurality of other well-known communication methods when market activity occurs on a given route or virtual hub combination. In other words, the "my routes" 1710 feature not only allows for one touch access to a saved route, but also performs notification features between users. Lastly, in some embodiments, the EDIT 1750 button allows a user 110 to modify a plurality of notification settings such as email, SMS text, in application, voice, messaging or other notification methods.

Figure 18:
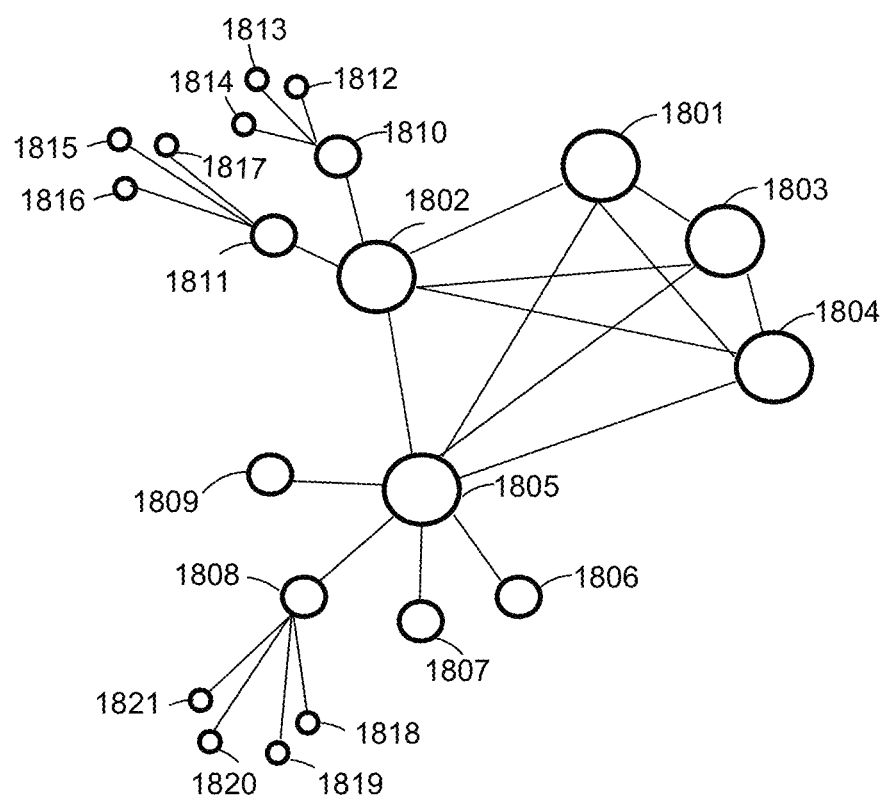
FIG. 18 illustrates an exemplary network topology of a virtual hub combination or series of multiple virtual hub combinations for use in the market auction platform for forward transportation or freight capacity method in accordance with some embodiments.

FIG. 18 illustrates an exemplary network topology configuration 1800 in one exemplary implementation of participating, transacting and/or trading transportation or freight capacity units in accordance with some embodiments. In some embodiments, network configuration 1800 includes the following elements, or a subset or superset thereof:

Large Virtual Hub nodes such as 1801, 1802, 1803, 1804, 1805;
Medium Virtual Hub nodes such as 1810, 1811, 1809, 1808, 1807, 1806;
Small Virtual Hub nodes such as 1812, 1813, 1814, 1815, 1816, 1816, 1817, 1818, 1819, 1820, 1821;

In some embodiments, the overall network node topology 1800 is comprised of large virtual hub nodes 1801, 1802, 1803, 1804, 1805 and medium virtual hub nodes 1810, 1811, 1809, 1808, 1807, 1806 and small virtual hub nodes 1812, 1813, 1814, 1815, 1816, 1816, 1817, 1818, 1819, 1820, 1821, or a subset or superset thereof. In some embodiments a user may input a starting point of 1815 and an ending point of 1818 which represent specific geographic virtual hub locations in a city, multiple cities or even countries or multiple countries. In some embodiments, forward transportation market auctions may occur directly between two exemplary points such as 1815 and 1818 or the method and system may combine a series of smaller auctions to comprise a larger auction between two endpoints on the system. In some embodiments, a series of smaller auctions may be combined between 1815 and 1811 as well as 1811 and 1802 as well as 1802 and 1805 as well as 1805 and 1808 as well as 1808 and 1818 which would be added together to make a combined virtual hub auction. A combined series of smaller auctions may be constrained by instructions which form auctions based on cheapest transportation or freight route 1011, single mode transport or freight auctions 1012, multi-mode transport or freight 1013, fastest transport or freight constraints 1014, most scenic auctions 1015, highest rating auctions 1016, most available or liquid auctions 1017, highest volume auctions 1018, most frequent auctions 1019, service level auctions 1020, security and safety level auctions 1021, group restricted auctions by sex, email, organization, gender or other 1022. In some embodiments, the constraints allow for many types of auctions which are unique and novel for transportation and freight capacity units in a forward transportation and freight market. In some embodiments, the user 110 may specify instructions that set forward market auction constraints based on one or a plurality of constraints. In some embodiments, the constrained auctions may have fungible units which allow many participants to transact in the auctions. In some embodiments, the disclosed creation of a forward market of transportation units between virtual hubs 1801 and 1804 or other combinations along map routes has the attributes of a fungible forward contract which allows for one transportation unit to be substitutable for another transportation unit because the unit has been transformed and defined as a commodity contract. In other words, if user A bought a transportation unit from user B between 1801 virtual hub and 1804 virtual hub, but then user A was not able to perform the obligation to purchase the transportation unit between 1801 virtual hub and 1804 virtual hub from user B, user A could resell the transportation unit contract between virtual hub 1801 and virtual hub 1804 to a third party user C on the forward transportation unit auction market between virtual hub 1804 and virtual hub 1801 to retrieve the financial payment made for their original purchase from user B and then user C would replace user A and be matched with user B for the transportation unit transformation between virtual hub 1804 and virtual hub 1801. No other prior art system or method performs the aforementioned data transformation combination. In some embodiments, the transportation or freight unit auction substitutability dynamic creates a unique and novel invention that does not exist in the world today. In some embodiments, user 110 input 220, 230 instructions use constrained optimization to form one auction between two points or a series of multiple auctions that form one larger auction.

In some embodiments, the forward transportation and freight unit auctions subject to various constraints may be presented as a linear programming cost minimization problem in the exemplary case where the user 110 selects the cheapest route 1011 constraint. In such exemplary case, the series of auctions may be combined that utilize the lowest cost path between the start point 1815 and the ending point 1818. In such exemplary case, the linear programming cost minimization function may select the following path of 1815 to 1811 to 1802 to 1804 to 1805 to 1808 to 1818 if that combination is the lowest cost auction path. In another such exemplary case, the user 110 may select instructions for the auction to minimize both cost and shortest route. In such exemplary case the linear programming function may minimize cost subject to a constraint that time is the shortest along the path and the resulting auction may combine a different and unique series of auctions between the starting point of 1815 and ending point 1818. Accordingly, the path may be optimized to minimize cost subject to the shortest path that yields a path of 1815 to 1811 to 1802 to 1805 to 1808 to 1818. The plurality of combinations of linear programming sequences of auctions for transportation or freight units between two points may consider an infinite set of combinations and permutations.

In some embodiments, the forward transportation and freight unit auctions may be held side by side between two competing routes. By way of example but not limiting by example a user may input instructions for the method and system to route between 1801 virtual hub and 1805 virtual hub. One route may be directly between 1801 virtual hub and 1805 virtual hub. Another route may be between virtual hub 1801 and virtual hub 1805 by way of virtual hub 1802. The time between the routes may vary due to traffic, construction, road conditions, accidents or a plurality of other exogenous factors, however, the data transformation of the disclosed method allows for two auctions to form side by side. The first transportation unit auction may be between virtual hub 1805 and virtual hub 1801 directly as one auction. A second auction may be by combining two smaller auctions between virtual hub 1805 and virtual hub 1802 with the auction between 1802 virtual hub and 1801 virtual hub which could be expressed independently or as a combined auction. The plurality of route auctions for the transportation unit (auction one directly between 1801 virtual hub and 1805 virtual hub) (auction two between 1801 virtual hub and 1805 virtual hub by way of 1802 virtual hub) may allow for the user to have transparent price auction information for the value of various proposed routes which have different price values.

Figure 19:
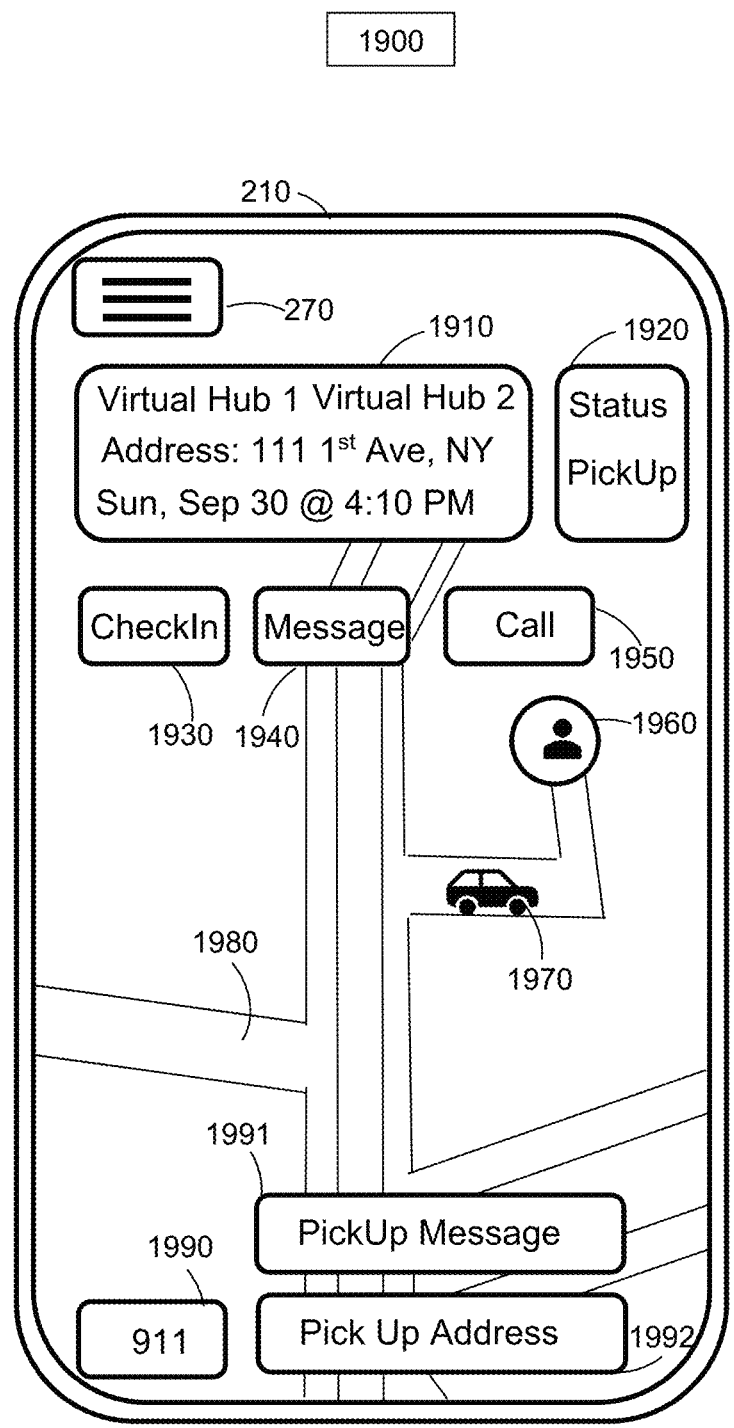
FIG. 19 illustrates an exemplary user interface to display the map of the virtual hub to virtual hub route of a given transaction for forward transportation or freight capacity units in accordance with some embodiments.

FIG. 19 illustrates an exemplary delivery and pick up status configuration 1900 in one exemplary implementation of participating, transacting and/or trading transportation or freight capacity units in accordance with some embodiments. In some embodiments, the delivery and pick up status configuration 1900 includes the following elements, or a subset or superset thereof:

Computing device unit GUI 210 to display method of multi layered network node topology for forward market of transportation and freight units.

Hamburger menu toggle 270 to move between different application configurations;

Virtual Hub 1 pickup address and Virtual Hub 2 destination address at a contract specification with regards to quality, day, date and time 1910;

Trip status for PickUp of transportation or freight unit 1920;

CheckIn passenger or freight status for transportation unit 1930;

Messaging texts and instructions between users to make pick up and delivery of transportation or freight capacity units 1940;

Call between users with number masking for privacy security 1950;

GPS map location of user 110 who is a rider or if freight cargo location 1960;

GPS map location of user 110 who is a driver or if freight, cargo carrier unit location 1970;

GPS map of transportation or freight unit delivery and pickup 1980;

Texting message window for freight or transportation unit communication between users 1991;

PickUp address data window during PickUp status 1992;

Security button to report security issues to 911 and system database 1990;

In some embodiments, the GUI 210 transmits delivery instructions to the users 110 to help the user have a rendering or map of their GPS location 1960 relative to the selling user 1970 of freight or transportation units. In some embodiments, the GUI 210 displays the trips status such as PickUp 1920 status, the trip status may include subsets or supersets of various status conditions such as PickUp, start, leaving, on-going, in-progress, arriving, arrived or a plurality of other trip status conditions. In some embodiments, the trip view of the GUI 210 may include a CheckIn 1930 button to confirm a passenger or freight transportation unit has been moved into the transportation unit object which could be a car, airplane, autonomous vehicle, bike, boat, ship, bus, drone, limo, motorcycle, moped, shuttle, spaceship, subway, taxi, train, cargo or other type of transportation mode. In some embodiments, the user 110 may transmit a message using the message 1940 button which may transmit audio, visual or text messages between users 110, 1970, 1960. In some embodiments, the users 110, 1960, 1970 may call each other using the call 1950 button to communicate pickup or delivery instructions. In some embodiments, a user 110, 1960, 1970 may message another user 110, 1960, 1970 to communicate using the PickUp Message window 1991 which may utilize visual, audio or text communication modes as well as log a message history between users. In some embodiments the users 110, 1960, 1970 may toggle to other modes of the application using the menu hamburger button 270. In some embodiments the GPS display of a map with the relative position of a transportation or freight unit seller 1970 and a transportation or freight unit buyer 1960 are displayed to help users 110 understand each others relative position and location on a map 1980. In some embodiments the GPS location of the transportation and freight unit seller 1970 and transportation or freight unit buyer 1960 are tracked in real time with location updates on the map 1980.

Figure 20:
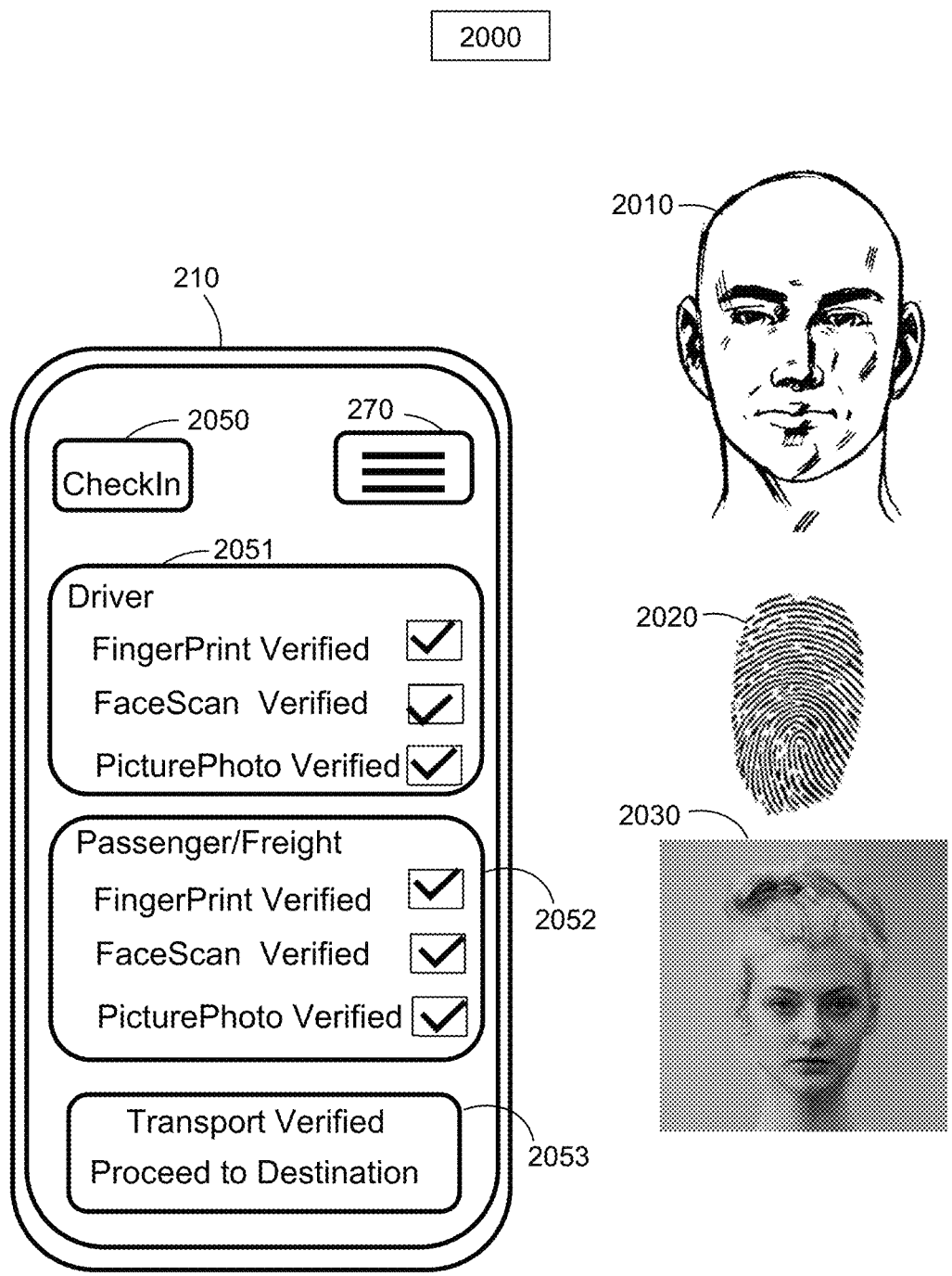
FIG. 20 illustrates an exemplary user interface to display the results of a security check and verification of users identity for forward transportation or freight capacity units in accordance with some embodiments.

FIG. 20 illustrates an exemplary CheckIn configuration 2000 in one exemplary implementation of participating, transacting and/or trading transportation or freight capacity units in accordance with some embodiments. In some embodiments, the CheckIn 2050 for a buyer or seller of a transportation or freight unit includes the following elements, or a subset or superset thereof:

Computing device unit GUI 210 to display method of multi layered network node topology for forward market of transportation and freight units with security CheckIn.

Hamburger menu toggle 270 to move between different application configurations;

Driver or Seller of transportation or freight unit scan check for finger print, face scan or picture photo scan to verify identity of user 2051;

Passenger or freight and transportation unit buyer unit scan check for finger print, face scan or picture photo scan to verify identity of user 2052;

Transport Verification confirmation window to confirm identities of users in the system at the application system level 2053;

Buyer and Seller of transportation or freight unit facial recognition confirmation 2010;

Buyer and Seller of transportation or freight unit finger print recognition confirmation 2020;

Buyer and Seller of transportation or freight unit photo recognition confirmation 2030;

In some embodiments, the GUI 210 of a computing device transmits and confirms the identity of users against identity records in the Network Member Database Server 160 which also confirms security checks for criminal records or other activity that would suspend a user from the platform environment. In some embodiments, the driver verification window 2051 may fail an identity verification due to a user not being the registered user 2010 on the Network Member Database Server 160. In some embodiments, the passenger or freight verification window 2052 may fail an identity verification due to a user 2010 not being the registered user on the network member database server 160. In some embodiments, the transport verification window 2053 may instruct the user 2010 to proceed to destination if verification is successful. In some embodiments, the transport verification window 2053 may instruct the user not to proceed to the destination if the verification is not successful. The identity verification system is unique and novel and dependent on a novel and unique auction forward market for transportation or freight over multiple nodes or virtual hubs topologies.

Figure 21:
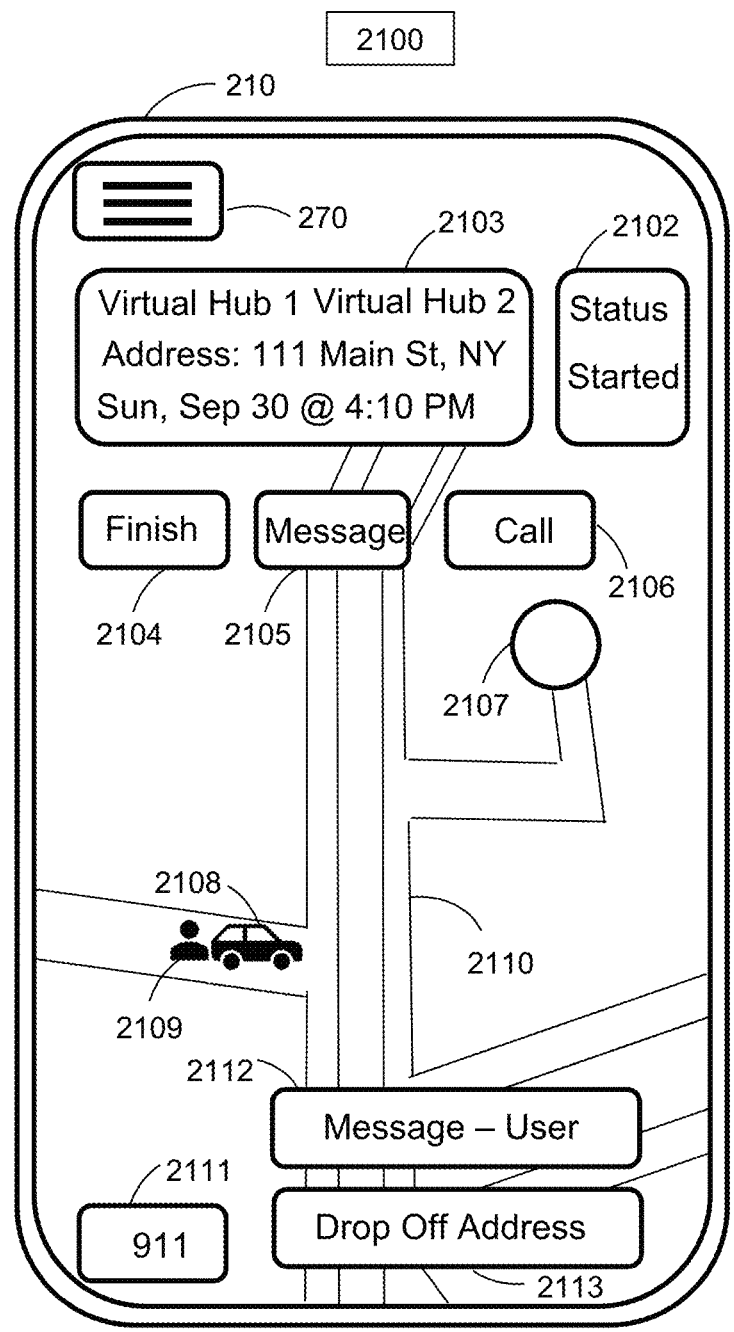
FIG. 21 illustrates an exemplary user interface to display the status of the virtual hub to virtual hub route of a given transaction for forward transportation or freight capacity units in accordance with some embodiments.

FIG. 21 illustrates an exemplary delivery and pick up status configuration 2100 once a transportation or freight unit delivery has started in one exemplary implementation of participating, transacting and/or trading transportation or freight capacity units in accordance with some embodiments. In some embodiments, the delivery and pick up status configuration 2100 includes the following elements, or a subset or superset thereof:

Computing device unit GUI 210 to display method of multi layered network node topology for forward market of transportation and freight units.

Hamburger menu toggle 270 to move between different application configurations;

Virtual Hub 1 pickup address and Virtual Hub 2 destination address at a contract specification with regards to quality, day, date and time 2103 of delivery of a transportation or freight unit;

Trip status of started of transportation or freight unit 2102;

Finish trip passenger or freight status for transportation unit 2104 once a transportation or freight unit has been delivered;

Messaging texts and instructions between users to make pick-up, on-going route status and delivery complete of transportation or freight capacity units 2105;

Call between system users with number masking for privacy security 2106;

GPS map location of user 2109 who is a rider or if freight, cargo location 2109;

GPS map location of user 2108 who is a driver or if freight, cargo carrier unit location 2108;

GPS map of transportation or freight unit delivery and pickup 2110;

Texting message window for freight or transportation unit communication between users 2112;

Starting point of virtual hub for forward transportation or freight units 2107;

Security button to report security issues to 911 and system database 2111;

Drop off address for delivery of passenger or freight for transportation or freight unit 2111.

In some embodiments, the GUI 210 transmits delivery instructions to the users 110 to help the user have a rendering or map of their GPS location 2109 relative to the selling user 2108 of freight or transportation units. In some embodiments, the GUI 210 displays the trips status such as Started 2102 status, the trip status may include subsets or supersets of various status conditions such as PickUp, Started, leaving, on-going, in-progress, arriving, arrived or a plurality of other trip status conditions. In some embodiments, the trip view of the GUI 210 may include a Finish 2104 button to confirm a passenger or freight transportation unit has been delivered or completed by the transportation unit object which could be a car, airplane, autonomous vehicle, bike, boat, ship, bus, drone, limo, motorcycle, moped, shuttle, spaceship, subway, taxi, train, cargo or other types of transportation modes. In some embodiments, the user 110 may transmit a message using the message 2105 button which may transmit audio, visual or text messages between users 110, 2109, 2108. In some embodiments, the users 110, 2109, 2109 may call each other using the call 2106 button to communicate pickup or delivery instructions or other necessary communication. In some embodiments, a user 110, 2109, 2108 may message another user 110, 2109, 2108 to communicate using the Message-User window 2112 which may utilize visual, audio or text communication modes as well as log a message history between users. In some embodiments the users 110, 2109, 2108 may toggle to other modes of the application using the menu hamburger button 270. In some embodiments the GPS display of a map with the relative position of a transportation or freight unit seller 2108 and a transportation or freight unit buyer 2109 are displayed to help users 110 understand each others relative position and location on a map 2110. In some embodiments the GPS location of the transportation and freight unit seller 2108 and transportation or freight unit buyer 2109 are tracked in real time with location updates on the map 2110.

Figure 22:
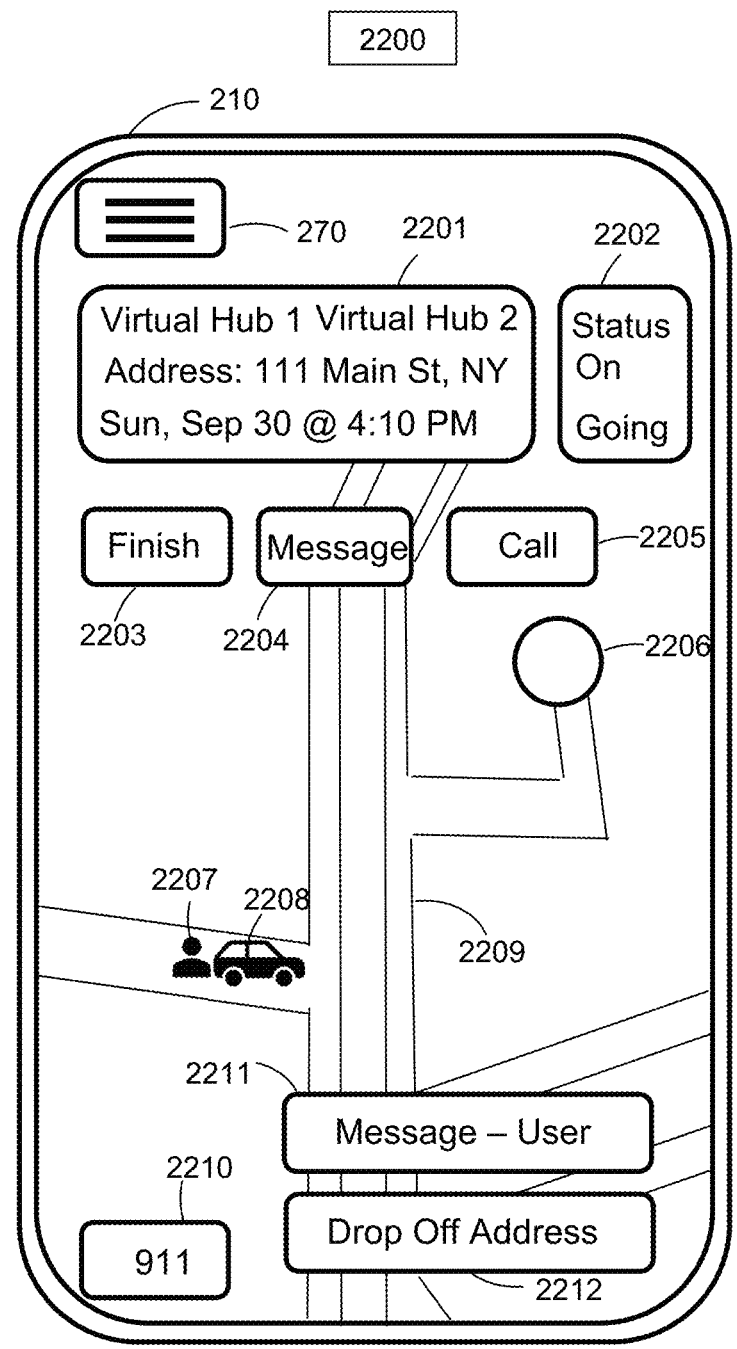
FIG. 22 illustrates an exemplary user interface to display the status of the virtual hub to virtual hub route of a given transaction for forward transportation or freight capacity units in accordance with some embodiments.

FIG. 22 illustrates an exemplary delivery and pick up status configuration 2200 once a transportation or freight unit delivery is ongoing in one exemplary implementation of participating, transacting and/or trading transportation or freight capacity units in accordance with some embodiments. In some embodiments, the delivery and pick up status configuration 2200 includes the following elements, or a subset or superset thereof:

- Computing device unit GUI 210 to display method of multi layered network node topology for forward market of transportation and freight units.
- Hamburger menu toggle 270 to move between different application configurations;
- Virtual Hub 1 pickup address and Virtual Hub 2 destination address at a contract specification with regards to quality, day, date and time 2201 of delivery of a transportation or freight unit;
- Trip status of ongoing for transportation or freight unit 2202;
- Finish trip passenger or freight status button for transportation unit 2203 once a transportation or freight unit has been delivered;
- Messaging texts and instructions between users to make pick-up, on-going route status and delivery complete of transportation or freight capacity units 2204;
- Call between system users with number masking for privacy security 2205;
- GPS map location of user 2209 who is a rider or if freight, cargo location 2209;
- GPS map location of user 2208 who is a driver or if freight, cargo carrier unit location 2207;
- GPS map of transportation or freight unit delivery and pickup 2206;
- Texting message window for freight or transportation unit communication between users 2211;
- Starting point of virtual hub for forward transportation or freight units 2206;
- Security button to report and record security issues to 911 and system database 2210;
- Drop off address for delivery of passenger or freight for transportation or freight unit 2212.

In some embodiments, the GUI 210 transmits delivery instructions to the users 110 to help the user 110 have a rendering or map of their GPS location 2207 relative to the selling user 2208 of freight or transportation units. In some embodiments, the GUI 210 displays the trips status such as On-Going 2202 status, the trip status may include subsets or supersets of various status conditions such as PickUp, Started, leaving, on-going, in-progress, arriving, arrived or a plurality of other trip status conditions. In some embodiments, the trip view of the GUI 210 may include a Finish 2203 button to confirm a passenger or freight transportation unit has been delivered or completed by the transportation unit object which could be a car, airplane, autonomous vehicle, bike, boat, ship, bus, drone, limo, motorcycle, moped, shuttle, spaceship, subway, taxi, train, cargo or other types of transportation modes. In some embodiments, the user 110 may transmit a message using the message 2204 button which may transmit audio, visual or text messages between users 110, 2207, 2208. In some embodiments, the users 110, 2207, 2208 may call each other using the call 2205 button to communicate pickup or delivery instructions or other necessary communication. In some embodiments, a user 110, 2207, 2208 may message another user 110, 2207, 2208 to communicate using the Message-User window 2211 which may utilize visual, audio or text communication modes as well as log a message history between users 110, 2207, 2208. In some embodiments the users 110, 2207, 2208 may toggle to other modes of the application using the menu hamburger button 270. In some embodiments the GPS display of a map with the relative position of a transportation or freight unit seller 2208 and a transportation or freight unit buyer 2207 are displayed to help users 110 understand each others relative position and location on a map 2209. In some embodiments the GPS location of the transportation and freight unit seller 2208 and transportation or freight unit buyer 2207 are tracked in real time with location updates on the map 2209. In some embodiments, the GUI 210 may display the Drop Off Address 2212 of the transportation or freight unit. In some embodiments a user 110, 2207, 2208 may use a 911 button 2210 to submit a recording to the system servers and to authorities who are connected to the system if anything has occurred that may compromise the security of any user or transportation unit.

Figure 23:
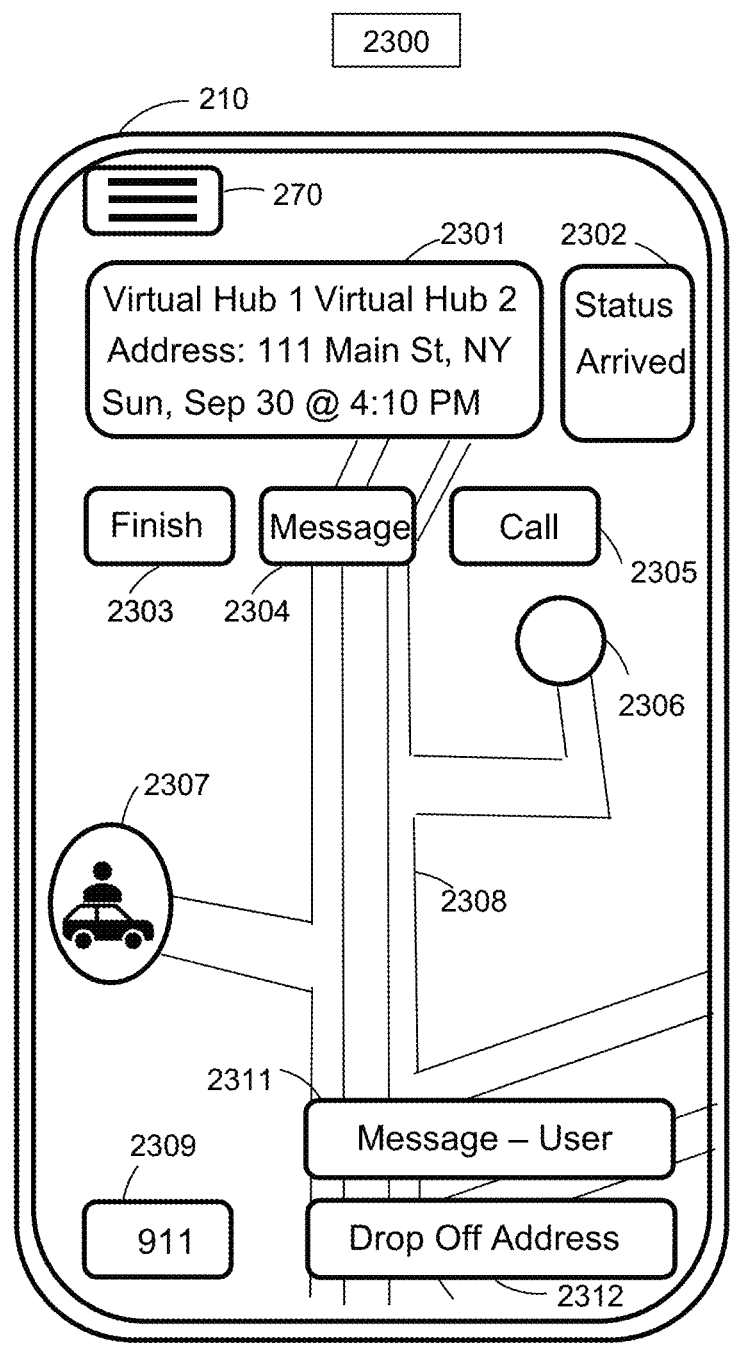
FIG. 23 illustrates an exemplary user interface to display the status of the virtual hub to virtual hub route of a given transaction for forward transportation or freight capacity units in accordance with some embodiments.

FIG. 23 illustrates an exemplary delivery and pick up status configuration 2300 once a transportation or freight unit delivery has arrived in one exemplary implementation of participating, transacting and/or trading transportation or freight capacity units in accordance with some embodiments. In some embodiments, the delivery and pick up status configuration 2300 includes the following elements, or a subset or superset thereof:

- Computing device unit GUI 210 to display method of multi layered network node topology for forward market of transportation and freight units.
- Hamburger menu toggle 270 to move between different application configurations;
- Virtual Hub 1 pickup address and Virtual Hub 2 destination address at a contract specification with regards to quality, day, date and time 2301 of delivery of a transportation or freight unit;
- Trip status of arrived for transportation or freight unit 2302;
- Finish trip passenger or freight status button for transportation unit 2303 once a transportation or freight unit has been delivered;
- Messaging texts and instructions between users to make pick-up, on-going route status and delivery complete of transportation or freight capacity units 2304;
- Call between system users with number masking for privacy security 2305;
- GPS map location of user 2307 who is a rider or if freight, cargo location 2307;
- GPS map location of user 2307 who is a driver or if freight, cargo carrier unit location 2307;
- GPS map of transportation or freight unit delivery and pickup 2308;

Texting message window for freight or transportation unit communication between users 2311;

Starting point of virtual hub for forward transportation or freight units 2306;

Ending point of virtual hub for forward transportation or freight units 2307;

Security button to report and record security issues to 911 and system database 2309;

Drop off address for delivery of passenger or freight for transportation or freight unit 2312;

In some embodiments, the GUI 210 transmits delivery instructions to the users 110 to help the user 110 have a rendering or map of their GPS location 2307 relative to the selling user 2307 of freight or transportation units. In some embodiments, the GUI 210 displays the trips status such as Arrived 2302 status, the trip status may include subsets or supersets of various status conditions such as PickUp, Started, leaving, on-going, in-progress, arriving, arrived or a plurality of other trip status conditions. In some embodiments, the trip view of the GUI 210 may include a Finish 2303 button to confirm a passenger or freight transportation unit has been delivered or completed by the transportation unit object which could be a car, airplane, autonomous vehicle, bike, boat, ship, bus, drone, limo, motorcycle, moped, shuttle, spaceship, subway, taxi, train, cargo or other types of transportation modes. In some embodiments, the user 110 may transmit a message using the message 2304 button which may transmit audio, visual or text messages between users 110, 2307. In some embodiments, the users 110, 2307 may call each other using the call 2305 button to communicate pickup or delivery instructions or other necessary communication. In some embodiments, a user 110, 2307 may message another user 110, 2307 to communicate using the Message-User window 2311 which may utilize visual, audio or text communication modes as well as log a message history between users 110, 2307. In some embodiments the users 110, 2307 may toggle to other modes of the application using the menu hamburger button 270. In some embodiments the GPS display of a map with the relative position of a transportation or freight unit seller 2307 and a transportation or freight unit buyer 2307 are displayed to help users 110 understand each others relative position and location on a map 2308. In some embodiments the GPS location of the transportation and freight unit seller 2307 and transportation or freight unit buyer 2307 are tracked in real time with location updates on the map 2308. In some embodiments, the GUI 210 may display the Drop Off Address 2312 of the transportation or freight unit. In some embodiments a user 110, 2307 may use a 911 button 2309 to submit a recording to the system servers and to authorities who are connected to the system if anything has occurred that may compromise the security of any user or transportation unit.

Figure 24:
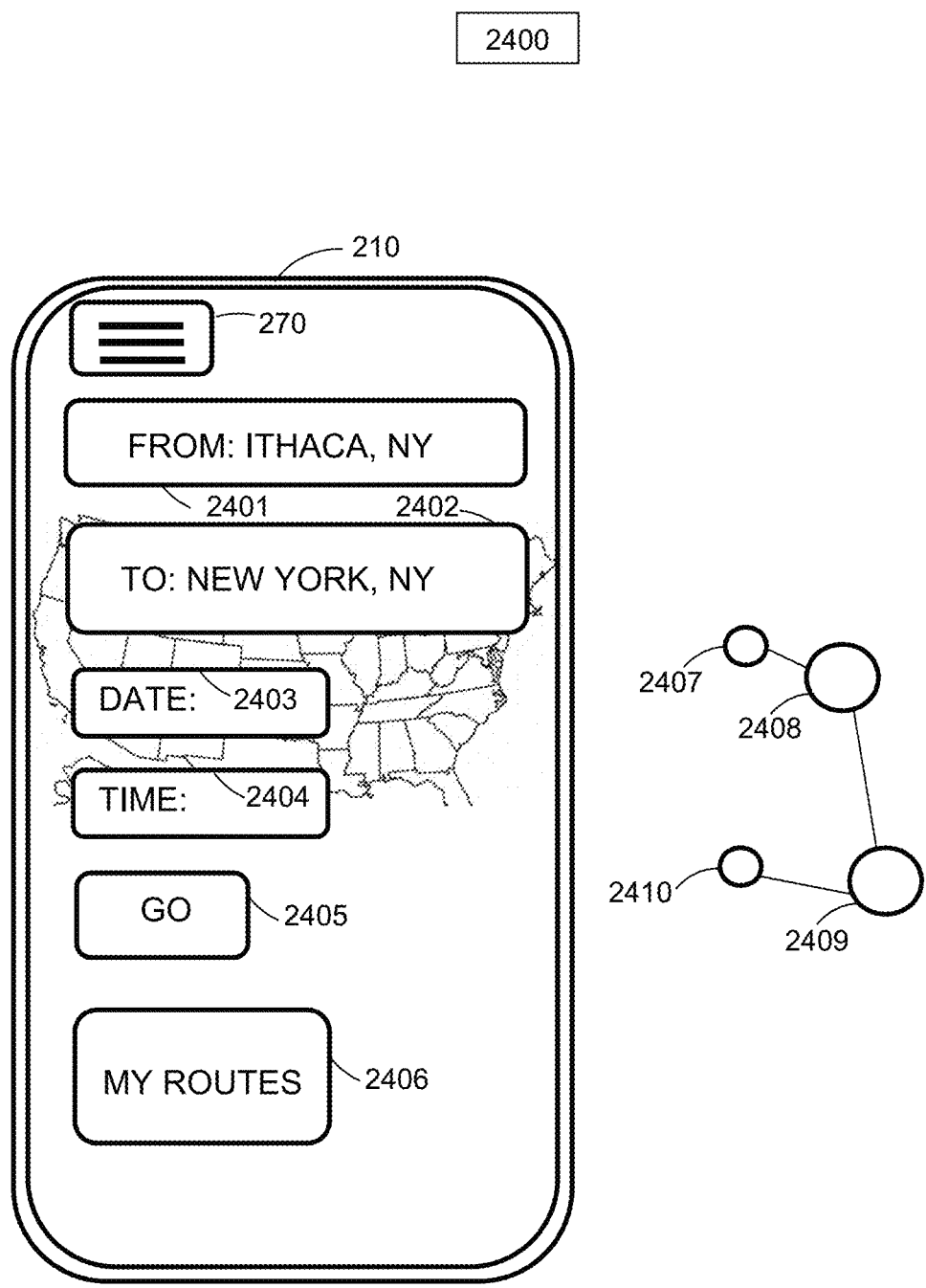
FIG. 24 illustrates an exemplary user interface to display a multi-hub, virtual-hub sequence given a start and end point for a transaction auction for forward transportation or freight capacity units in accordance with some embodiments.

FIG. 24 illustrates an exemplary delivery and pick up configuration 2400 for a transportation or freight unit multi layered network node topology in one exemplary implementation of participating, transacting and/or trading transportation or freight capacity units in accordance with some embodiments. In some embodiments, the multi layered network node topology of participating, transacting and/or trading transportation or freight capacity configuration 2400 includes the following elements, or a subset or superset thereof:

Computing device unit GUI 210 to display method of multi layered network node topology for forward market of transportation and freight units;

Hamburger menu toggle 270 to move between different application configurations;

From node starting point 2401 of a multi layered network node topology for forward market of transportation and freight units;

To or destination node ending point 2402 of a multi layered network node topology for forward market of transportation and freight units;

Date module 2403 in GUI 210 of an auction for a multi layered network node topology for forward market of transportation and freight units;

Time module 2404 in GUI 210 of pickup and delivery of an auction for a multi layered network node topology for forward market of transportation and freight units;

Go button 2405 to form an auction for a multi layered network node topology for forward market of transportation and freight units;

My Routes button 2406 to quickly obtain common From 2401 or To 2402 points in an auction for a multi layered network node topology for forward market of transportation and freight units for a user on the system;

Multi-Hub network 2407, 2408, 2409, 2410 which may form a single dual node auction 2407 to 2408 or 2407 to 2410 or any possible node combination or a multi-node auction series for a multi layered network node topology for forward market of transportation and freight units for a user on the system.

In some embodiments, the GUI 210 transmits a From node 2401 and To node 2402 with instructions to the users 110 with a specific date 2403 and time 2404 of a multi layered network node topology for forward market of transportation and freight units for a user on the system to perform an auction by pressing the Go button 2405. The system may use a plurality of constraints such as but not limited by cheapest route 1011, single mode of transportation 1012, multi method mode of transportation 1013, fastest route 1014, most scenic route 1015, highest rated route or highest rated driver 1016, most available route 1017, highest volume route 1018, most frequent route 1019, service level route 1020, security and safety of route 1021, group restricted email or group criteria 1022 to use any two node points 2407, 2408, 2409, 2410 or any combination of points 2407, 2408, 2409, 2410. In some embodiments the system may use no constraint, one constraint or a plurality of constraints to allow the user 110 to participate, transact or trade in a multi layered network node topology for forward market of transportation and freight units in an auction. In some embodiments the auction for forward market transportation or freight units may be comprised of an auction between only two points or a plurality of points subject to a plurality of constraints. In some embodiments the from or starting point or starting virtual hub may be 2407, but the system selects an auction between 2408 and 2409 rather than starting at 2407 because one or more constraints were selected to frame the auction for forward market transportation or freight units. In some embodiments, an auction may be comprised of multiple modes of transportation comprising a car ride transportation or freight unit auction between 2407 and 2408 points, followed by an airplane transportation or freight unit auction between 2408 and 2409, followed by a ship auction between 2410 and 2409 for transportation or freight units. In some embodiments the various plurality of auctions may be displayed as one auction or a series of auctions. In some embodiments, auctions for a multi layered network node topology for a forward market of transportation and freight units may consist of any subset or superset of the aforementioned possibilities including any constraints 1000 or any plurality of modes 800.

Figure 25:
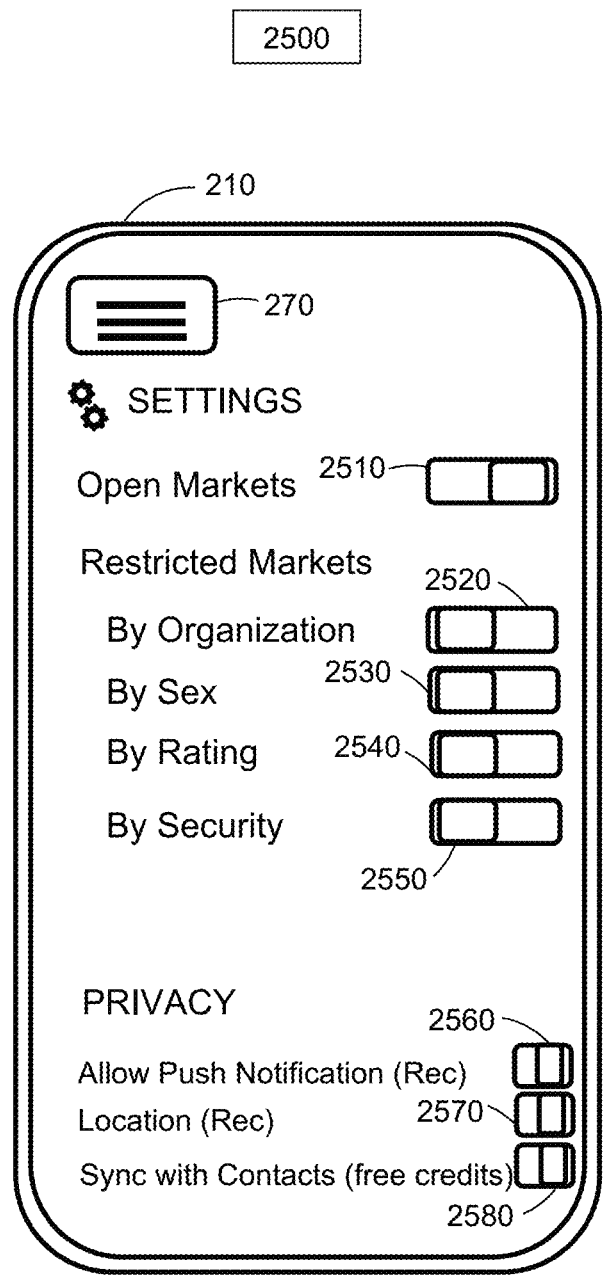
FIG. 25 illustrates an exemplary user interface to display open or restriction settings for auctions of the transportation or freight forward market system and method in accordance with some embodiments.

FIG. 25 illustrates an exemplary setting configuration 2500 for a transportation or freight unit multi layered network node topology in one exemplary implementation of participating, transacting and/or trading transportation or freight capacity units in accordance with some embodiments. In some embodiments, the multi layered network node topology of participating, transacting and/or trading transportation or freight capacity configuration 2500 includes the following setting elements, or a subset or superset thereof:

Computing device unit GUI 210 to display method of multi layered network node topology for forward market of transportation and freight units.

Hamburger menu toggle 270 to move between different application configurations;

Open markets setting toggle 2510 which allows a user to see all market participants of a given auction on a multi layered network node topology for a forward market of transportation and freight units;

Restricted markets setting By Organization 2520, By Sex 2530, By Rating 2540, By Security 2550 or by any other restriction the user 110 defines which limit the auction participants for the user;

Privacy settings which restrict push notifications 2560, location information 2570; Sync with contacts 2580, or other privacy settings;

In some embodiments, a user 110 may select open markets 2510 which show every participant in a given auction for a multi layered network node topology for a forward market of transportation and freight units. In some embodiments, participants or users 110 may select to restrict the market view of the GUI such as 400 by organization email 2520 or by sex 2530 or by rating of driver 2540 or rating of user 2540 or by security 2550 or by a plurality of other restrictions but not limited to those restrictions. In some embodiments, users 110 may change privacy settings which restrict push notifications 2560, location settings 2570, Sync with Contacts settings 2580 or a plurality of other settings. In some embodiments, the toggle switches 2510, 2520, 2530, 2540, 2550, 2560, 2570, 2580 may be set to off or on depending on if they hold a right or left toggle switch position. The restricted market settings 2520, 2530, 2540, 2550 may be a subset or superset of the aforementioned in the formation of an open market auction for a multi layered network node topology for a forward market of transportation and freight units.

Figure 26:
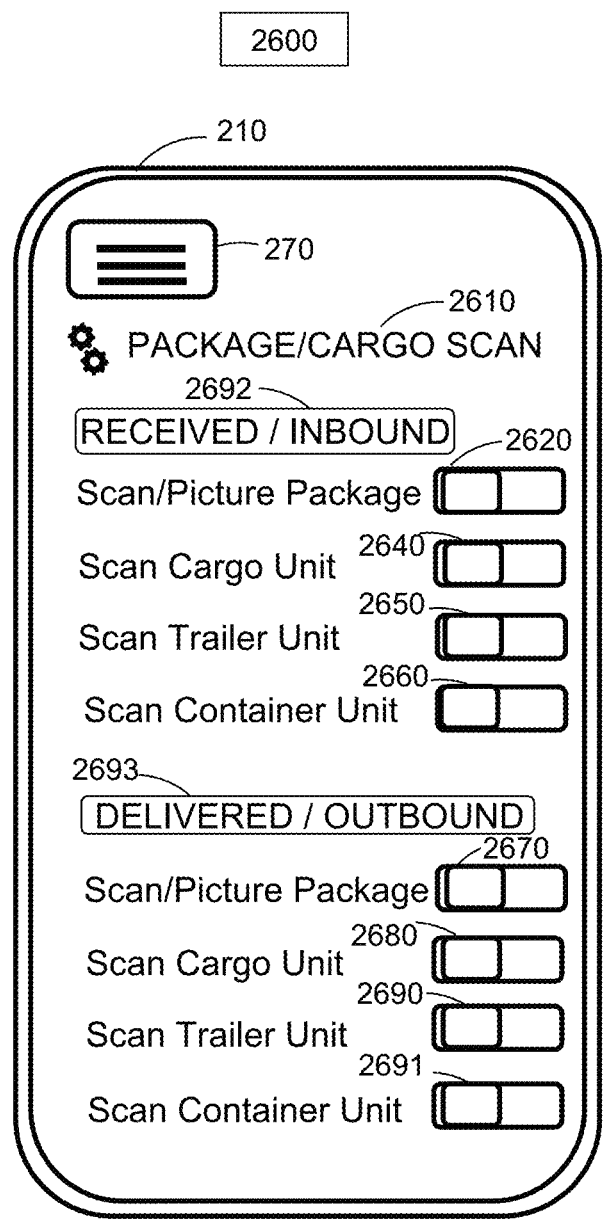
FIG. 26 illustrates an exemplary user interface to display inbound and outbound package, cargo or freight QR scans or UPC scans or pictures to document freight units in which are delivered against the forward market auction for two or more virtual hubs in accordance with some embodiments.

FIG. 26 illustrates an exemplary setting for a package or cargo scan configuration 2600 for a transportation or freight unit multi layered network node topology in one exemplary implementation of participating, transacting and/or trading transportation or freight capacity units in accordance with some embodiments. In some embodiments, the multi layered network node topology of participating, transacting and/or trading transportation or freight capacity configuration 2600 includes the following setting for a package or cargo scan elements, or a subset or superset thereof:

Computing device unit GUI 210 to display method of multi layered network node topology for forward market of transportation and freight units.

Hamburger menu toggle 270 to move between different application configurations;

Package or Cargo Scan module 2610 to document the status and position of forward market freight or transportation units;

Package or Cargo Inbound or received module 2692 to scan a picture, universal product code barcode, QR code, or other transportation or freight unit identifier;

Package or Cargo Inbound scan toggle switch 2620 to scan a picture, universal product code barcode, QR code, or other transportation or freight unit identifier;

Cargo unit Inbound scan toggle switch 2640 to scan a picture, universal product code barcode, QR code, or other transportation or freight unit identifier;

Trailer unit Inbound scan toggle switch 2650 to scan a picture, universal product code barcode, QR code, or other transportation or freight unit identifier;

Container unit Inbound scan toggle switch 2660 to scan a picture, universal product code barcode, QR code, or other transportation or freight unit identifier;

Package or Cargo Outbound or delivered module 2693 to scan a picture, universal product code barcode, QR code, or other transportation or freight unit identifier;

Package or Cargo Outbound or delivered scan toggle 2670 to scan a picture, universal product code barcode, QR code, or other transportation or freight unit identifier;

Cargo Outbound or delivered scan toggle 2680 to scan a picture, universal product code barcode, QR code, or other transportation or freight unit identifier;

Trailer Outbound or delivered scan toggle 2690 to scan a picture, universal product code barcode, QR code, or other transportation or freight unit identifier;

Container Unit Outbound or delivered scan toggle 2691 to scan a picture, universal product code barcode, QR code, or other transportation or freight unit identifier;

In some embodiments, a user 110 may select the package or cargo unit scan module 2610 to scan or take a picture of a package or cargo identification code such as a QR code, Uniform Product code or other identifying package or cargo characteristic. In some embodiments, the user 110 may select the inbound Scan/Picture Package toggle 2620 which captures the identification characteristic which may include QR Codes, Uniform Product Codes, Serial Numbers or other cargo identification characteristics of a package or cargo transportation or freight unit. In some embodiments, inbound cargo may include a larger unit structure than a package such as a crate or large movable unit with identification characteristics which may include QR Codes, Uniform Product Codes, Serial Numbers or other cargo identification characteristics, for such larger units a user 110 may use the Scan Cargo Unit toggle 2640 to capture the cargo identification characteristic for inbound receipt of the transportation or freight unit. In some embodiments, an inbound Scan Trailer Unit toggle 2650 option may be used by a user 110 to instruct the system configuration that receipt of a large trailer unit such as an eighteen wheel trailer unit or smaller trailer, may be scanned to identify the transportation or freight unit. In some embodiments, an inbound Scan Container Unit 2660 toggle may be utilized to track the receipt or location of a shipping container. In some embodiments, a user 110 may select the outbound package or cargo unit scan module 2693 to scan or take a picture of a package or cargo identification code such as a QR code, Uniform Product code or other identifying package or cargo characteristic to confirm delivery to a delivery address of the transportation or freight unit. In some embodiments, the user 110 may select the outbound Scan/Picture Package toggle 2670 which captures the identification characteristic of a package or cargo transportation or freight unit once the unit is delivered to the delivery address. In some embodiments, cargo may include a larger unit structure than a package such as a crate or large movable unit with identification characteristics which may include QR Codes, Uniform Product Codes, Serial Numbers or other cargo identification characteristics, for such larger units a user 110 may use the outbound Scan Cargo Unit toggle 2680 to capture the cargo identification characteristic for outbound receipt of the transportation or freight unit. In some embodiments, an outbound Scan Trailer Unit toggle 2690 option may be used by a user 110 to instruct the system configuration that delivery of a large trailer unit such as an eighteen wheel trailer unit or smaller trailer, may be scanned to identify the transportation or freight unit and confirm delivery. In some embodiments, an outbound Scan Container Unit 2691 toggle may be utilized to track the delivery or location of a shipping container which has been delivered. In some embodiments, transportation or freight units may be a subset or superset of the aforementioned in the formation of an open forward market auction for a multi layered network node topology for a forward market of transportation and freight units.

Figure 27:
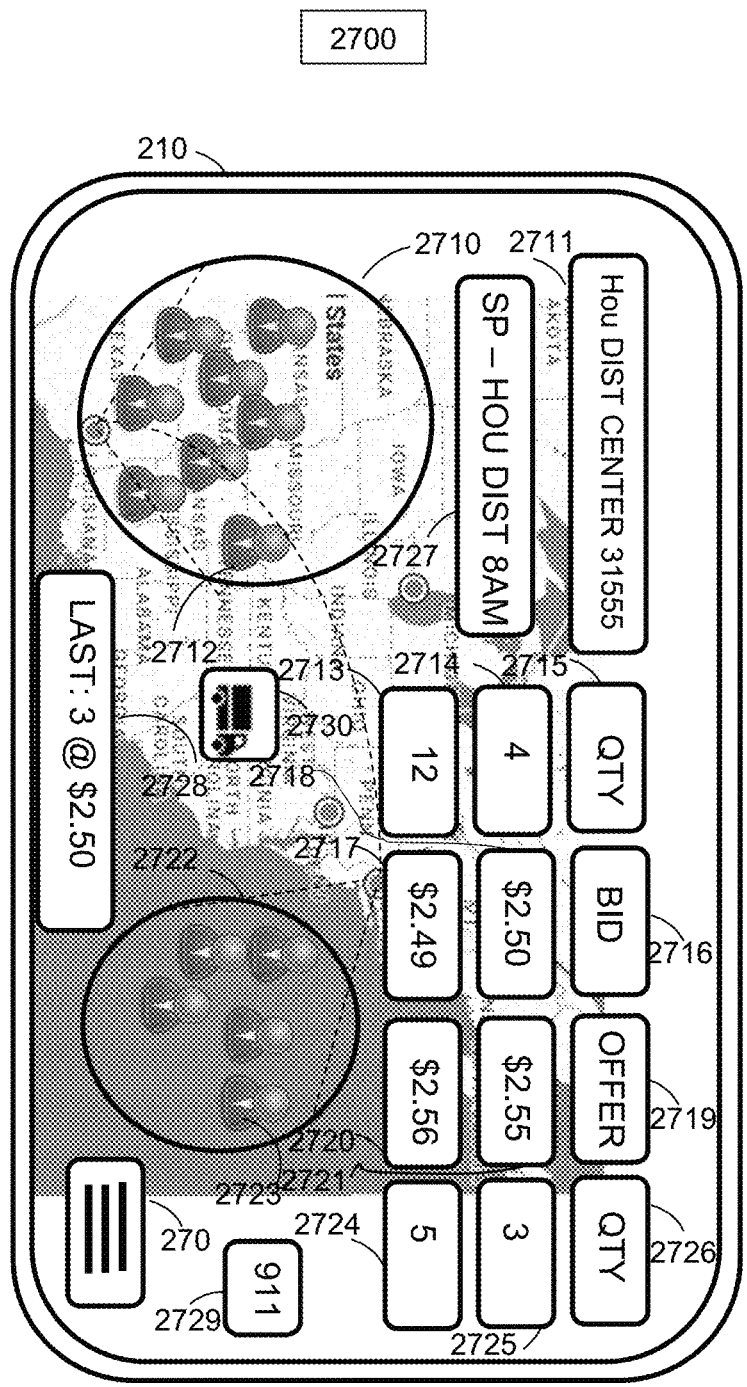
FIG. 27 illustrates an exemplary user interface to display a forward freight auction for a transportation unit a given hub or multi-hub combination in accordance with some embodiments.

FIG. 27 illustrates an exemplary setting for a package or cargo market configuration 2700 for a transportation or freight unit multi layered network node topology in one exemplary implementation of participating, transacting and/or trading transportation or freight capacity units in accordance with some embodiments. In some embodiments, user interface 210 includes the following elements, or a subset or superset thereof:

Exemplary virtual hub combination from a shipping center location 2711;

Exemplary virtual hub origin/from location 2710 with users or freight originators 2712 within the virtual hub location 2710;

Exemplary specification summary of the market, level of service and time of delivery commencement 2727;

Exemplary mode of ground transportation or freight capacity type 2730;

Exemplary transaction summary of the last trades quantity and price 2728;

Exemplary virtual hub destination/to location 2722 and user who is being delivered on the transportation or freight capacity unit 2723;

Exemplary bid/buy quantity title header 2715 for an exemplary virtual transportation or freight unit hub market;

Exemplary bid/buy price title header 2716 for an exemplary virtual transportation or freight hub market;

Exemplary offer/sell price title header 2719 for an exemplary virtual transportation or freight hub market;

Exemplary offer/sell quantity title header 2726 for an exemplary virtual transportation or freight hub market;

Exemplary bid/buy quantity 2414 for the best bid quantity from a plurality of users 110 for an exemplary respective transportation or freight capacity virtual hub combination 2711;

Exemplary bid/buy quantity 2713 for the second-best bid quantity from a plurality of users 110 for an exemplary respective transportation or freight capacity virtual hub combination 2711;

Exemplary bid/buy price 2718 for the best bid price from a plurality of users 110 for an exemplary respective transportation or freight capacity virtual hub combination 2711;

Exemplary bid/buy price 2717 for the second-best bid price from a plurality of users 110 for an exemplary respective transportation or freight capacity virtual hub combination 2711;

Exemplary offer/sell price 2721 for the best offer price from a plurality of users 110 for an exemplary respective transportation or freight capacity virtual hub combination 2711;

Exemplary offer/sell price 2720 for the second-best offer price from a plurality of users 110 for an exemplary respective transportation or freight capacity virtual hub combination 2711;

Exemplary offer/sell quantity 2725 for the best offer quantity from a plurality of users 110 for an exemplary respective transportation or freight capacity virtual hub combination 2711;

Exemplary offer/sell quantity 2724 for the second-best offer quantity from a plurality of users 110 for an exemplary respective transportation or freight capacity virtual hub combination 2711;

Exemplary safety dispatch "911" button 2729 to enact video and audio recording of the user 110 environment and dispatch of that information to authorities and system servers.

Exemplary hamburger menu button 270 to move back to menu options and settings away from the participation, transaction, trading auction GUI 210 embodiment.

In some embodiments, the user 110 may enter a transaction quantity and price for transportation or freight capacity units to participate, transact and/or trade by the GUI 210 detecting user 110 contact or audio interface with a bid/buy price 2718 or offer/sell price 2721. The GUI 210 detects user 110 contact with any of the GUI 210 buttons which have been aforementioned. Upon user 110 contact or audio interface with buttons on the GUI 210, instructions are instantiated which allow the user 110 to change the specifications of the respective virtual hub combination 2711. A plurality of prices and markets may be presented based on a plurality of contract specifications. In some embodiments, the best bid/buy price 2718 may be moving up in price or down in price depending on the market conditions at any given time. In some embodiments the last trade or last transacted price for a given specification is listed to help the user 110 understand how the market is moving so that the user 110 may submit a competitive offer/selling price 2721 or bid/buying price 2718. In some embodiments, users 110 may adjust settings of the GUI 210 to show more bid/buying prices 2717 or more offer/selling prices 2720. In some embodiments the matrix of market quantities and prices 2713, 2714, 2715, 2716, 2717, 2718, 2719, 2720, 2721, 2724, 2725, 2726 may be referred to as market depth in the GUI 210 embodiment. In some embodiments the number of users 110 may be displayed as user icons 2712 or 2723 for the amount of people logged in which desire to transact, trade or participate in a given virtual hub 2710 to virtual hub 2722 combination for transportation or freight units. In some embodiments, users 110 may select the transportation mode 2730 such that the user allows a market for only one form of transportation or freight capacity as a commodity or the user 110 may allow the system to show multiple forms of transportation or freight capacity between two virtual transportation capacity hubs 2710, 2711, 2722. In some embodiments the GUI 210 may detect a user 110 selecting the 911 button 2729 which may activate voice and video recording functions on the mobile or stationary device 111 and transmit the data with a confirmation from the user 110 to the authorities and system servers to provide enhanced security while participating, transacting or trading forward transportation or freight as a commodity. In some embodiments the user may toggle between the GUI 210 market view screen in FIG. 3 and other menu 270 options and settings by the user 110 selecting the hamburger button 270 and the GUI 210 detecting the user 110 input or contact or audio instruction. In some embodiments the GUI 210 may instantiate instructions in the memory of the mobile computing device 111 which then transmits transportation or freight capacity data through the network 140 or wireless GPS network 150 to call upon instruction routines and instruction sub-routines on the transportation forward market database server 130, virtual hub database server 120, network member database server 160, no arbitrage condition database server 180 and/or instructions in the memory of the cloud and local CPUs 190 which all interface together to make one system which may deliver transportation capacity units to users 110 from and to a plurality of virtual hubs 2710, 2722 with a plurality of specifications at specific market prices.

Figure 28:
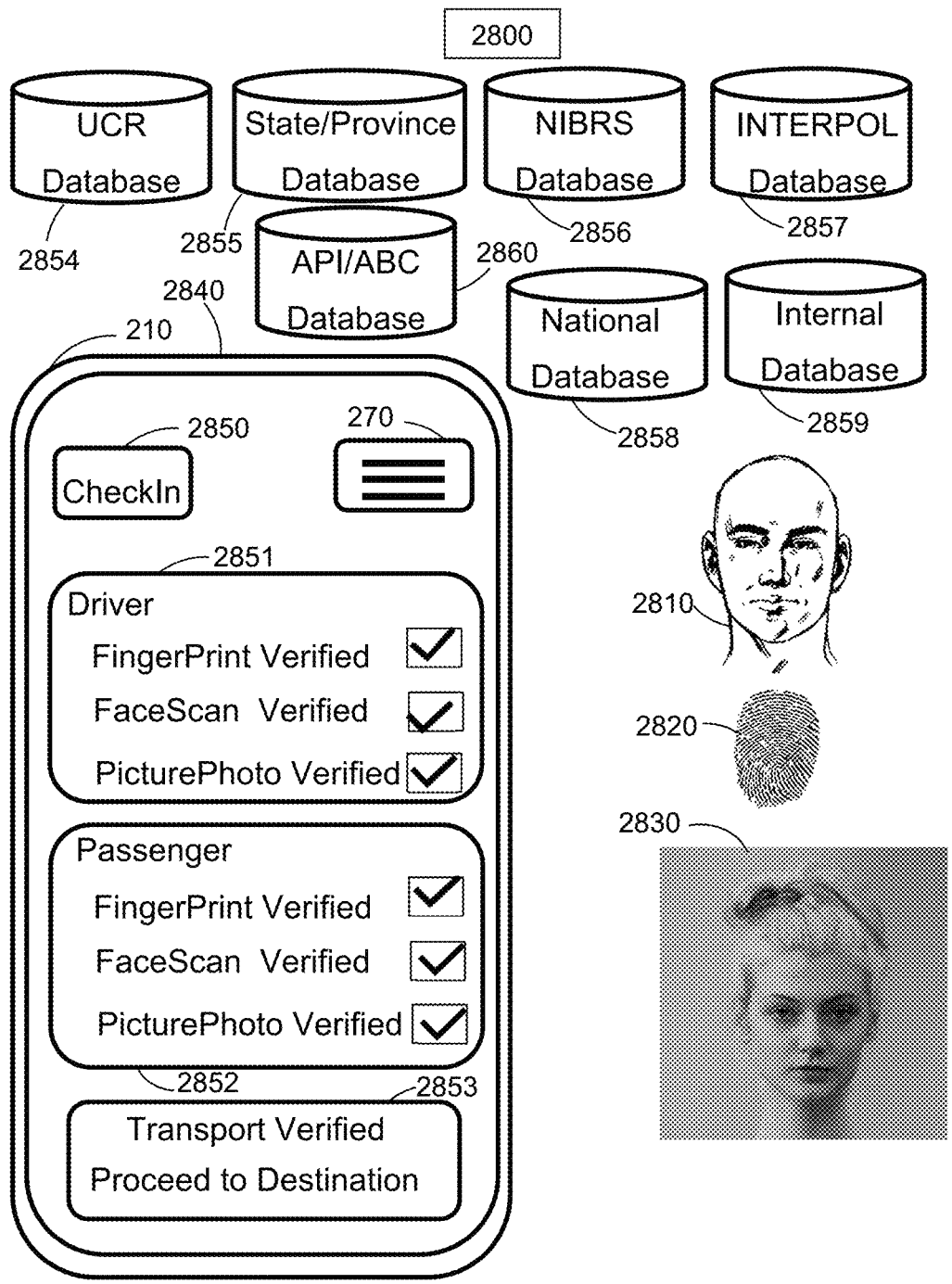
FIG. 28 illustrates an exemplary user interface and database configuration which allow user identity or criminal record or transaction history to be verified in accordance with some embodiments.

FIG. 28 illustrates an exemplary check in and security database configuration 2800 for a transportation or freight unit multi layered network node topology in one exemplary implementation of participating, transacting and/or trading transportation or freight capacity units in accordance with some embodiments. In some embodiments, the multi layered network node topology of participating, transacting and/or trading transportation or freight capacity configuration 2800 includes the following security configuration elements, or a subset or superset thereof:

Exemplary uniform crime reporting ("UCR") database 2854 from international agencies who report crime;
Exemplary International State or Provincial crime reporting database 2855 from international governments who report crime;
Exemplary International National Incident Based Reporting System ("NIBRS") crime reporting database 2856 from international governments who report crime;
Exemplary Interpol crime reporting database 2857 from international governments who report crime which connects National Central Bureaus ("NCBs");
Exemplary International application program interface and ABC ("API/ABC") crime reporting database 2860 from international governments who report crime;
Exemplary national crime reporting database 2858 from international governments who report crime;
Exemplary internal system crime reporting database 2859 from crimes which occurred on system;
Exemplary facial scan to identify user 2810 against a plurality of crime databases;
Exemplary fingerprint scan to identify user 2820 against a plurality of crime databases;
Exemplary photo or photo scan to identify user 2830 against a plurality of crime databases;
Exemplary voice scan to identify user 2810 against a plurality of crime databases;
Exemplary Computing device unit GUI 210 to display method of multi layered network node topology for forward market of transportation and freight units.
Hamburger menu toggle 270 to move between different application configurations;
Exemplary Driver or Freight transport or freight or transport seller unit user interface 2851 to confirm identity verification against a plurality of crime databases;
Exemplary passenger unit or freight unit user interface 2852 to confirm identity verification against a plurality of crime databases;
Exemplary handshake verification user interface 2853 to confirm both buyer and seller of transportation or freight units were correctly verified against crime databases;

In some embodiments, a plurality of crime databases UCR Database 2854, State and Province Database 2855, NIBRS database 2856, INTERPOL database 2857, API/ABC database 2860, National database 2858, Internal system database 2859 are used to confirm a user 110, has been confirmed not to have criminal history in accordance with instructions on the method and system. In some embodiments, transportation or freight unit security may be a subset or superset of the aforementioned in the formation of an open forward market auction for a multi layered network node topology for a forward market of transportation and freight units. Such security checks are standard in airports, but they are not automated and they are not utilized in other modes of transportation which degrades the overall safety of other transportation methods if they are not utilized. In some embodiments, the check in instructions may reject a user from confirmed verified transport if they fail the plurality of safety checks. In some embodiments, confirmed no crime history users 110 do not have activity reported in the plurality of crime databases UCR Database 2854, State and Province Database 2855, NIBRS database 2856, INTERPOL database 2857, API/ABC database 2860, National database 2858, Internal system database 2859 and are confirmed to transport verified status 2853 in the system.

Figure 29:
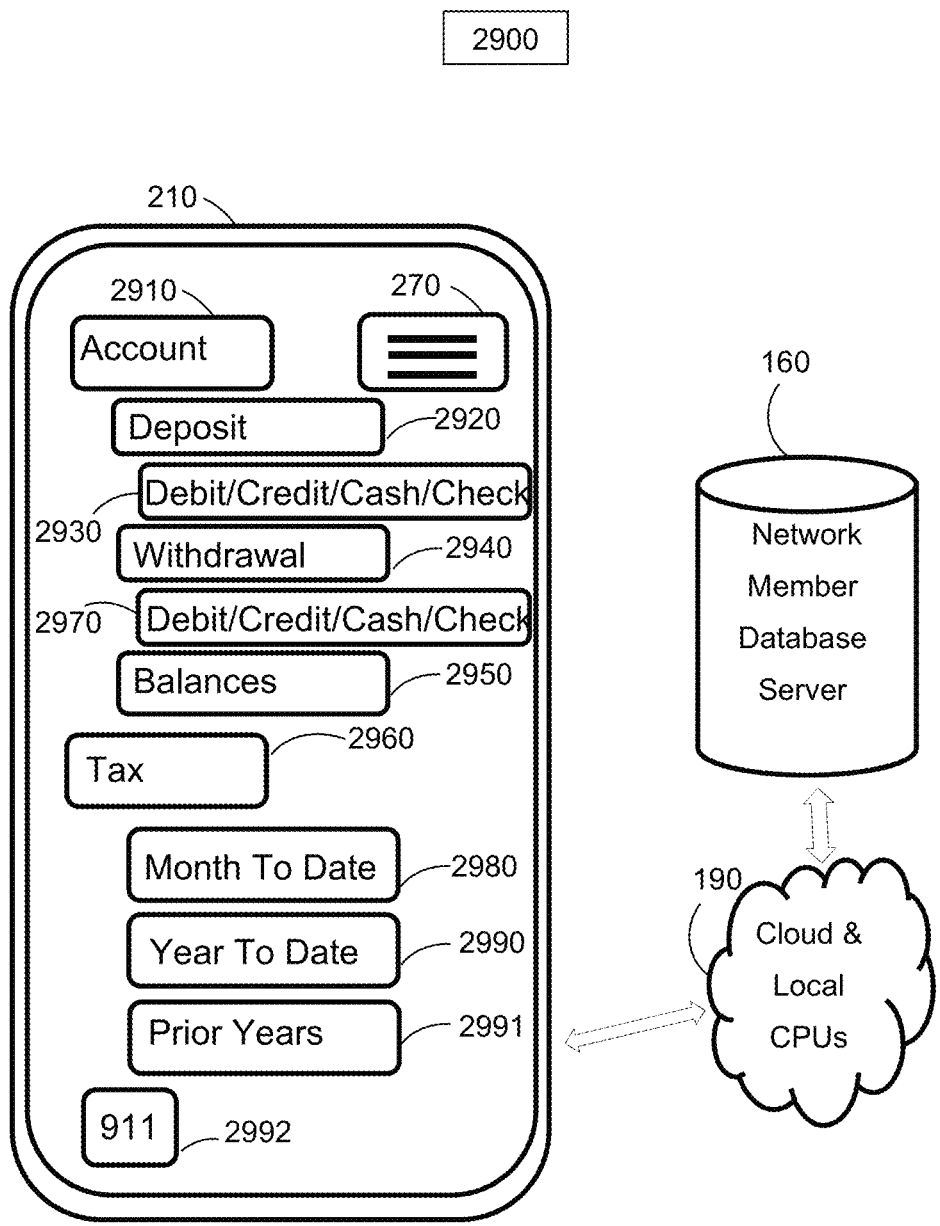
FIG. 29 illustrates an exemplary user interface and database configuration for account balances and payment for the forward market auctions of transportation and freight capacity between virtual hubs in accordance with some embodiments.

FIG. 29 illustrates an exemplary user accounting configuration 2900 for a transportation or freight unit multi layered network node topology in one exemplary implementation of participating, transacting and/or trading transportation or freight capacity unit auctions in accordance with some embodiments. In some embodiments, the multi layered network node topology of participating, transacting and/or trading transportation or freight capacity configuration 2900 includes the following accounting elements, or a subset or superset thereof:

Computing device unit GUI 210 to display method of multi layered network node topology for forward market of transportation and freight units.
Exemplary hamburger menu toggle 270 to move between different application configurations;
Exemplary account button 2910 to edit or confirm user account data;
Exemplary deposit button 2920 to add transaction funds or transaction currency or transaction balances to the user account;
Exemplary deposit method button 2930 to add transaction funds or transaction currency or transaction balances to the user account through Debit, Credit, Cash, Check, virtual currency, digital currency or a plurality of other payment methods;
Exemplary withdrawal button 2940 to send transaction funds or transaction currency or transaction balances to the user account in a different institution;
Exemplary withdrawal method button 2970 to send transaction funds or transaction currency or transaction balances to the user account at a different institution through Debit, Credit, Cash, Check, virtual currency, digital currency or a plurality of other payment methods;
Exemplary balances button 2950 to confirm user account balances;
Exemplary tax button 2960 to track user account activity for taxation reporting;
Exemplary month to date tax reporting button 2980;
Exemplary year to date tax reporting button 2990;
Exemplary prior year tax reporting button 2991;
Exemplary "911" security button 2991;
Exemplary Network Member Database Server 160;

Exemplary cloud and CPU and Network configuration 190 to send and receive Network Member account data;

In some embodiments, user account 2910 data may be displayed with voice or screen or non-screen computing devices with instructions from the GUI 210 in accordance with instructions on the method and system. In some embodiments, user deposit 2920 data may be displayed with voice or screen or non-screen computing devices with instructions from the GUI 210 in accordance with instructions on the method and system. In some embodiments, user deposit method 2930 data such as Debit, Credit, Cash, Check, virtual currency, digital currency or a plurality of other payment methods may be displayed with voice or screen or non-screen computing devices with instructions from the GUI 210 in accordance with instructions on the method and system. In some embodiments, user withdrawal 2940 data may be displayed with voice or screen or non-screen computing devices with instructions from the GUI 210 in accordance with instructions on the method and system. In some embodiments, user withdrawal method 2970 data such as Debit, Credit, Cash, Check, virtual currency, digital currency or a plurality of other payment methods may be displayed with voice or screen or non-screen computing devices with instructions from the GUI 210 in accordance with instructions on the method and system to place money in the system account into a different institution specified by the user 110. In some embodiments, user balances 2950 data may be displayed with voice or screen or non-screen computing devices with instructions from the GUI 210 in accordance with instructions on the method and system. In some embodiments, user tax button 2960 data may be displayed with voice or screen or non-screen computing devices with instructions from the GUI 210 in accordance with instructions on the method and system. In some embodiments, user month to date tax data button 2980, year to date tax data button 2990, prior year tax data button 2991 may be displayed with voice or screen or non-screen computing devices with instructions from the GUI 210 in accordance with instructions on the method and system. In some embodiments, the accounting and tax information may be stored in the Network Member Database Server 160 and transmitted through the cloud, network and CPUs 190 to the GUI computing device 210. In some embodiments, transportation or freight unit accounting and fund interfaces may be a subset or superset of the aforementioned in the formation of an open forward market auction for a multi layered network node topology for a forward market of transportation and freight units.

Figure 30:
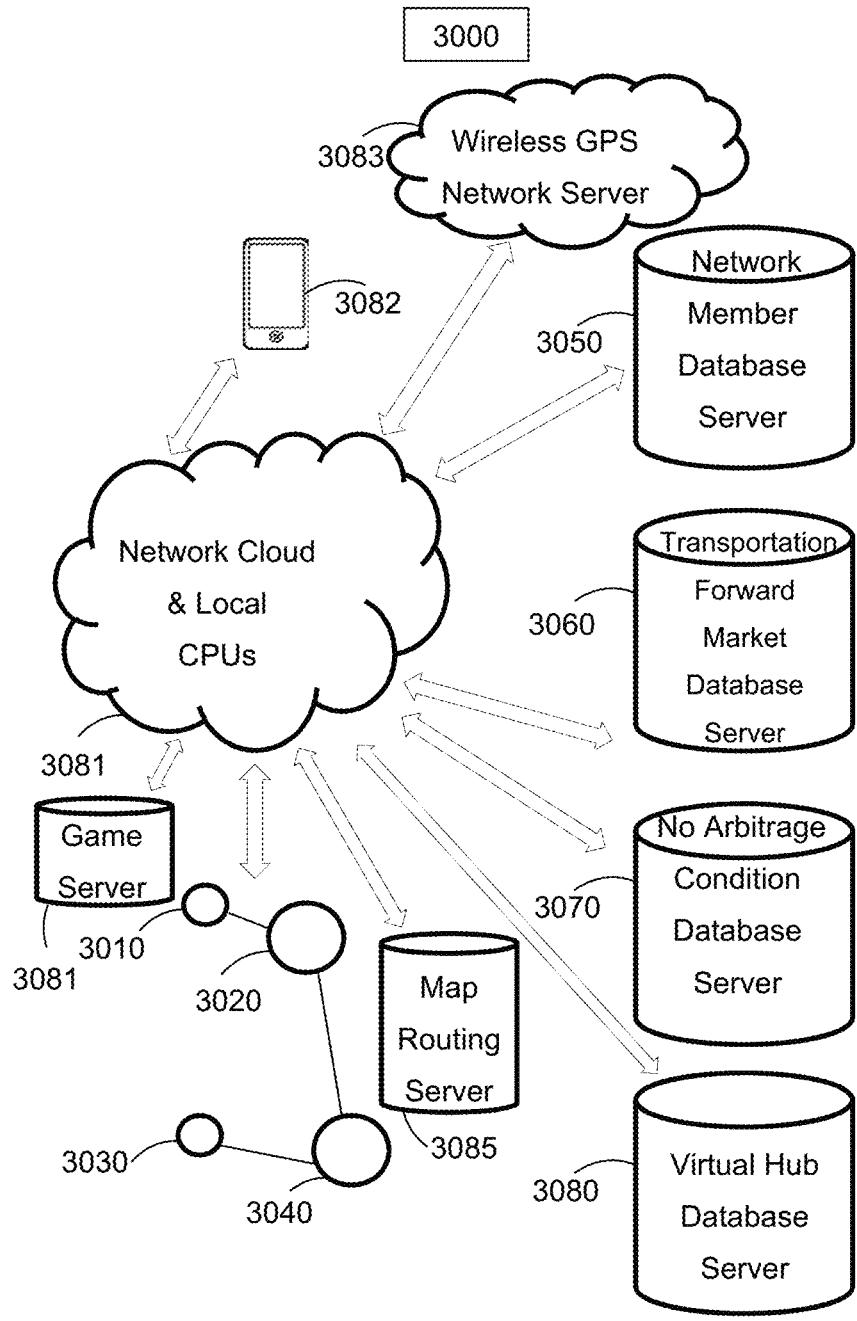
FIG. 30 illustrates an exemplary method and system configuration of multiple virtual hub topology auctions in accordance with some embodiments.

FIG. 30 illustrates an exemplary network configuration 3000 for a transportation or freight unit multi layered network node topology in one exemplary implementation of participating, transacting and/or trading transportation or freight capacity unit auctions in accordance with some embodiments. In some embodiments, the multi layered network node topology of participating, transacting and/or trading transportation or freight capacity configuration 3000 includes the following accounting elements, or a subset or superset thereof:

Exemplary Wireless GPS Network and Server 3083;
Exemplary Wireless computing device that is audio, video, screen or non-screen interfaced 3082;
Exemplary Network Member Database Server 3050;
Exemplary Transportation Forward Market Database Server 3060;
Exemplary Transportation Forward Market Database Server 3060;
Exemplary No Arbitrage Condition Database Server 3070;
Exemplary Virtual Hub Database Server 3080;
Exemplary Network, Network Cloud, and local CPUs 3081;
Exemplary Network Multi Layered Network Virtual Hub Node Topology for forward market transportation of freight unit auctions 3010, 3020, 3030, 3040.

In some embodiments, the network topology 3010 may utilize a voice or screen or non-screen computing device 3082 to interface with system and method instructions over a Network and Network Cloud and Networked CPUs 3081 to use instructions on CPUs to order a constrained or unconstrained virtual hub network topology auction over two or more virtual hub nodes 3010, 3020, 3030, 3040 over one or multiple modes of transportation or freight with instructions and data from the Virtual Hub Database Server 3080, the No Arbitrage Condition Database Server 3070, the Transportation Forward Market Database Server 3060, the Network Member Database Server 3050 and the Wireless GPS Network Server 3083. Network Data may be displayed with voice or screen or non-screen computing devices with instructions from the GUI 210 in accordance with instructions on the method and system.

Figure 31:
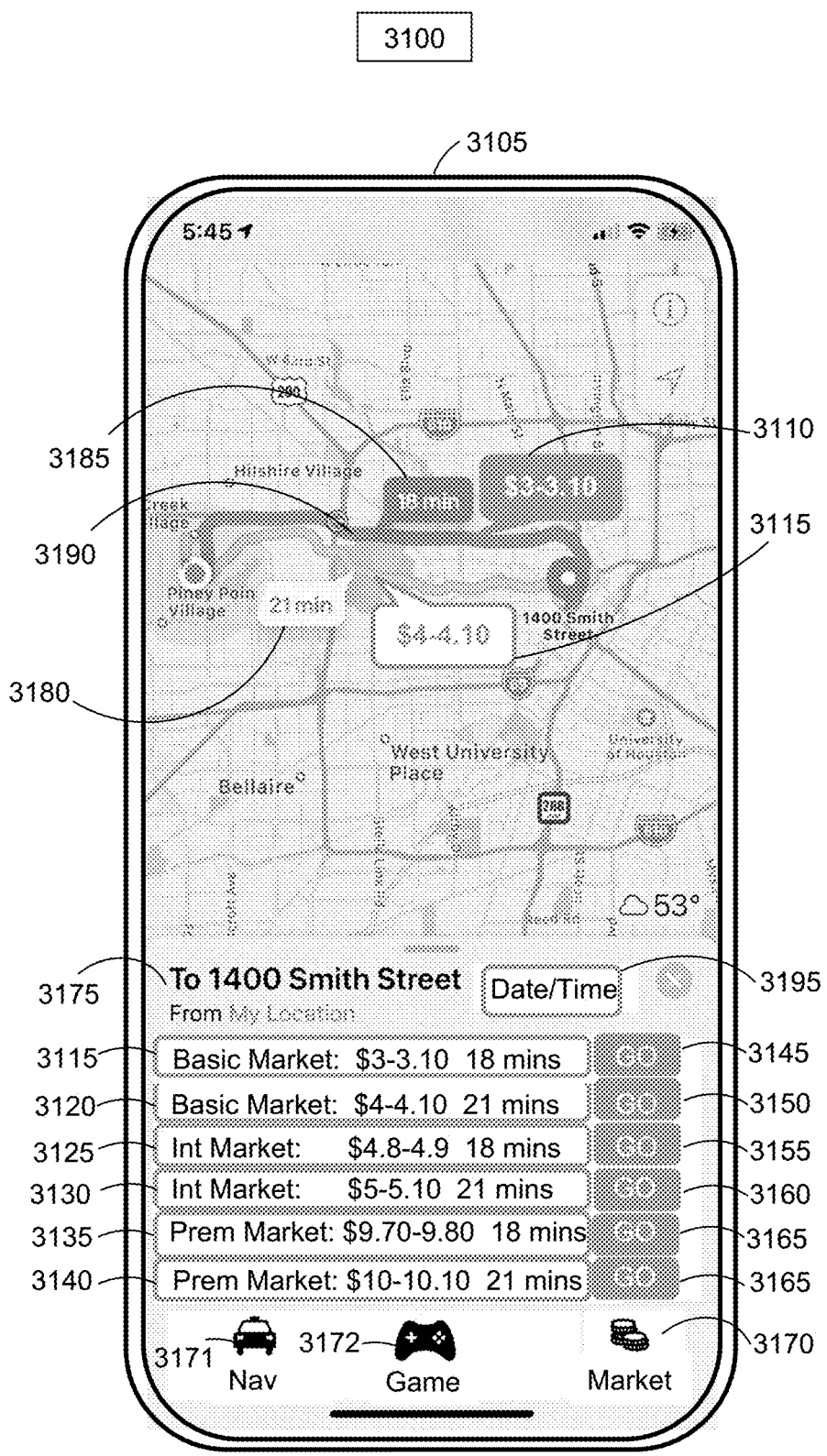
FIG. 31 illustrates an exemplary method and system configuration of the integration interface with GPS map routing such as TomTom or Apple Maps or other third party map routing software applications.

FIG. 31 illustrates an exemplary network configuration 3100 integrating the disclosed method and system as a layer on a traditional third party map software. In some embodiments, the multi layered network node topology of participating, transacting and/or trading transportation or freight capacity configuration 3100 includes the following accounting elements, or a subset or superset thereof:

exemplary computing device 3105;
exemplary route input by user 3175;
exemplary route node structure 3190 to satisfy user route request 3175;
exemplary alternative route node structure 3180 to satisfy user route request 3175 with associated time 3180;
exemplary time estimate 3185 for route 3190;
exemplary live auction price value 3110 for route 3190;
exemplary alternative live auction price value 3115 for route 3180;
exemplary navigation mode button 3171;
exemplary game mode button 3172;
exemplary date and time modification button 3195 for disclosed route 3175;
exemplary transformed forward transportation unit auction value and modification feed 3115 and selection GO 3145 button to transact the given route with a basic transportation unit feature and characteristic for one route 3190 that satisfies the user route request 3175;
exemplary alternative transformed forward transportation unit auction value and modification feed 3120 and selection GO 3150 button to transact the given route with a basic transportation unit feature and characteristic for one alternative route 3180 that satisfies the user route request 3175;
exemplary transformed forward transportation unit auction value and modification feed 3125 and selection GO 3155 button to transact the given route with an intermediate transportation unit feature and characteristic for one route 3190 that satisfies the user route request 3175;
exemplary alternative transformed forward transportation unit auction value and modification feed 3130 and selection GO 3160 button to transact the given route with an intermediate transportation unit feature and characteristic for one alternative route 3180 that satisfies the user route request 3175;

exemplary transformed forward transportation unit auction value and modification feed 3135 and selection GO 3165 button to transact the given route with a premium transportation unit feature and characteristic for one route 3190 that satisfies the user route request 3175;

exemplary alternative transformed forward transportation unit auction value and modification feed 3140 and selection GO 3165 button to transact the given route with a premium transportation unit feature and characteristic for one alternative route 3180 that satisfies the user route request 3175;

exemplary market display feature 3170 as an overlay onto map routing for user requests 3175;

In some embodiments, map routing interfaces 3105 such as Apple Maps or TomTom or another third party, may integrate the disclosed method and system to display the transformed forward transportation unit market auction price along a various route given various virtual hub topologies 1800 over the user 110 defined route request 3175. The computing device 3105 may disclose over visual, audio or other communication methods the forward transportation unit auction price 3110 on a given route 3190. In yet other embodiments, the disclosed transportation unit transformation may communicate the forward transportation unit auction price 3115 of an alternative route 3180 such that a user may select either route 3190 or 3180 based on the disclosed method and system price 3110 or 3115 which was generated by instructions from a plurality of users between two virtual hubs on the user defined route 3175. The disclosed forward market transportation unit auction may be communicated on an on demand basis representing the current time and day or on a forward basis by changing the Date/Time 3195 user interface button feature to represent the then current market pricing for future time intervals on a plurality of given routes 3190 and 3180 along the user requested virtual hub combination 3175. Virtual hubs may represent the end points of a route defined by the user 3175 or virtual hubs may represent points along a given route but not including the endpoints or virtual hubs may represent points not along the route the user defined 3175. Virtual hub combinations transform transportation capacity units into a forward market which allow users of the method and system to transact in the physical market by either delivering transportation units as a driver of a vehicle or capacity holder or by receiving them as a passenger or package if the unit is a package rather than a person. A transportation unit represents space which may be filled by a person or a package. Further the forward transportation unit market auction 3170 overlay may be a layer on traditional GPS map routing software or as an alternative to time based routing. The forward transportation unit market specification such as "Basic" 3115, 3120 or "Intermediate" 3125, 3130 or "Premium" 3135, 3140 may also have a plurality of other characteristics or levels which form the basis of a fungible contract or substitutable contract between users which is exchangeable with the same terms and conditions if one user is unable to fulfil their contract obligations for the transformed transportation unit. In some embodiments, the navigation mode 3171 may move the user to turn by turn directions along the price based navigation route 3190. In some embodiments, the game mode 3172 may move the user to a game based overlay on the price based navigation route 3190. In some embodiments, the market mode 3170 may move the user to a market based overlay on the priced based navigation route 3190.

The disclosed method and system of a transformed transportation capacity unit may be fully functional as a layer in map routing software 3100 or as a stand alone application 200, 300, etc.

In some embodiments, the disclosed method and system transportation unit auction price 3110 and 3115 has two prices or more in other embodiments. Two route prices 3110 are disclosed at $3 and $3.10. The former price of $3 is the price where a user is willing to buy or pay for a transportation unit along the given route 3190. The later price of $3.10 is the price at which a user is willing to sell a transportation unit along the given route 3190. The instructions of the auction may match the highest bidding price of $3 with the lowest selling price in the price queue when the prices match. In other words, in the exemplary embodiment, if a user wanted to sell a transportation unit at the current forward market auction queue 3110 on route 3190, the user would enter a price of $3 which is the current highest bidding price in the method and system queue 3110. By way of further example, another user may desire to buy a transportation unit on the forward transportation unit auction method and system on route 3190, to match, the user would enter a price of $3.10 which is the lowest selling price of a seller on the forward market transportation unit auction method and system.

Figure 32:
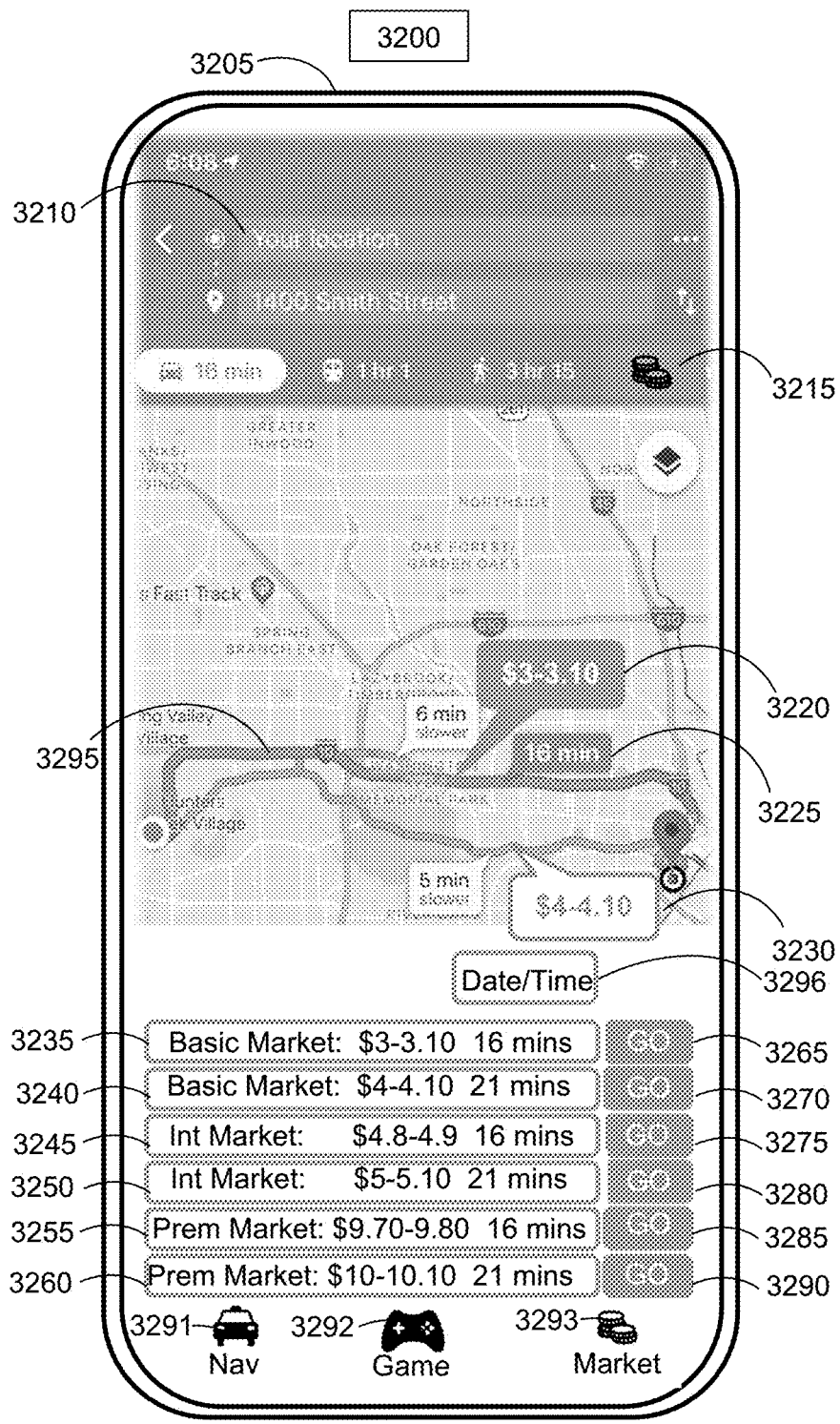
FIG. 32 illustrates an exemplary method and system configuration of the integration interface with GPS map routing such as Google Maps or other third party map routing software applications.

FIG. 32 illustrates another exemplary network configuration 3200 integrating the disclosed method and system as a layer on another traditional third party map software. In some embodiments, the multi layered network node topology of participating, transacting and/or trading transportation or freight capacity configuration 3200 includes the following accounting elements, or a subset or superset thereof:

exemplary computing device 3205;

exemplary route input by user 3210;

exemplary route node structure 3295 to satisfy user route request 3210;

exemplary alternative route node structure 3230 to satisfy user route request 3210 with associated time;

exemplary time estimate 3225 for route 3295;

exemplary navigation mode button 3291;

exemplary game mode button 3292;

exemplary market mode button 3293;

exemplary live auction price value 3220 for route 3295;

exemplary alternative live auction price value 3230 for route 3230;

exemplary date and time modification button 3296 for disclosed route 3210;

exemplary transformed forward transportation unit auction value and modification feed 3235 and selection GO 3265 button to transact the given route with a basic transportation unit feature and characteristic for one route 3295 that satisfies the user route request 3210;

exemplary alternative transformed forward transportation unit auction value and modification feed 3240 and selection GO 3270 button to transact the given route with a basic transportation unit feature and characteristic for one alternative route 3230 that satisfies the user route request 3210;

exemplary transformed forward transportation unit auction value and modification feed 3245 and selection GO 3275 button to transact the given route with an intermediate transportation unit feature and characteristic for one route 3295 that satisfies the user route request 3210;

exemplary alternative transformed forward transportation unit auction value and modification feed 3250 and selection GO 3280 button to transact the given route with an intermediate transportation unit feature and characteristic for one alternative route 3230 that satisfies the user route request 3210;

exemplary transformed forward transportation unit auction value and modification feed 3255 and selection GO 3285 button to transact the given route with a premium transportation unit feature and characteristic for one route 3295 that satisfies the user route request 3210;

exemplary alternative transformed forward transportation unit auction value and modification feed 3260 and selection GO 3290 button to transact the given route with a premium transportation unit feature and characteristic for one alternative route 3230 that satisfies the user route request 3210;

exemplary market display feature 3215 as an overlay onto map routing for user requests 3210;

In some embodiments, map routing interfaces 3205 such as Google Maps or Garmin or another third party, may integrate the disclosed method and system to display the transformed forward transportation unit market auction price along a various route given various virtual hub topologies 1800 over the user 110 defined route request 3210. The computing device 3205 may disclose over visual, audio or other communication methods the forward transportation unit auction price 3220 on a given route 3295. In yet other embodiments, the disclosed transportation unit transformation may communicate the forward transportation unit auction price 3230 of an alternative route 3230 such that a user may select either route 3295 or 3230 based on the disclosed method and system price 3230 or 3220 which was generated by instructions from a plurality of users between two virtual hubs on the user defined route 3210 and instructions to generate a price queue for buyers and sellers of transportation units long given routes. The disclosed forward market transportation unit auction may be communicated on an on demand basis representing the current time and day or on a forward basis by changing the Date/Time 3296 user interface button feature to represent the then current market pricing for future time intervals on a plurality of given routes 3295 and 3230 along the user requested virtual hub combination 3210. Virtual hubs may represent the end points of a route defined by the user 3210 or virtual hubs may represent points along a given route but not including the endpoints or virtual hubs may represent points not along the route the user defined 3210. Virtual hub combinations transform transportation capacity units into a forward market which allow users of the method and system to transact in the physical market by either delivering transportation units as a driver of a vehicle or capacity holder or by receiving them as a passenger or package if the unit is a package rather than a person. A transportation unit represents space which may be filled by a person or a package. Further the forward transportation unit market auction 3215 overlay may be a layer on traditional GPS map routing software as an alternative to time based routing. The forward transportation unit market specification such as "Basic" 3235, 3240 or "Intermediate" 3245, 3250 or "Premium" 3255, 3260 may also have a plurality of other characteristics or levels which form the basis of a fungible contract or substitutable contract between users which is exchangeable with the same terms and conditions if one user is unable to fulfil their contract obligations for the transformed transportation unit. In some embodiments, the navigation mode 3291 may move the user to turn by turn directions along the price based navigation route 3295. In some embodiments, the game mode 3292 may move the user to a game based overlay on the price based navigation route 3295. In some embodiments, the market mode 3293 may move the user to a market based overlay on the priced based navigation route 3295.

The disclosed method and system of a transformed transportation capacity unit may be fully functional as a layer in map routing software 3200 or as a stand alone application 200, 300, etc.

In some embodiments, the disclosed method and system transportation unit auction price 3220 and 3230 has two prices or more in other embodiments. Two route prices 3220 are disclosed at $3 and $3.10. The former price of $3 is the price where a user is willing to buy or pay for a transportation unit along the given route 3295. The later price of $3.10 is the price at which a user is willing to sell a transportation unit along the given route 3295. The instructions of the auction may match the highest bidding price of $3 with the lowest selling price in the price queue when the prices match. In other words, in the exemplary embodiment, if a user wanted to sell a transportation unit at the current forward market auction queue 3220 on route 3295, the user would enter a price of $3 which is the current highest bidding price in the method and system queue 3220. By way of further example, another user may desire to buy a transportation unit on the forward transportation unit auction method and system on route 3295, to match, the user would enter a price of $3.10 which is the lowest selling price of a seller on the forward market transportation unit auction method and system.

Figure 33:
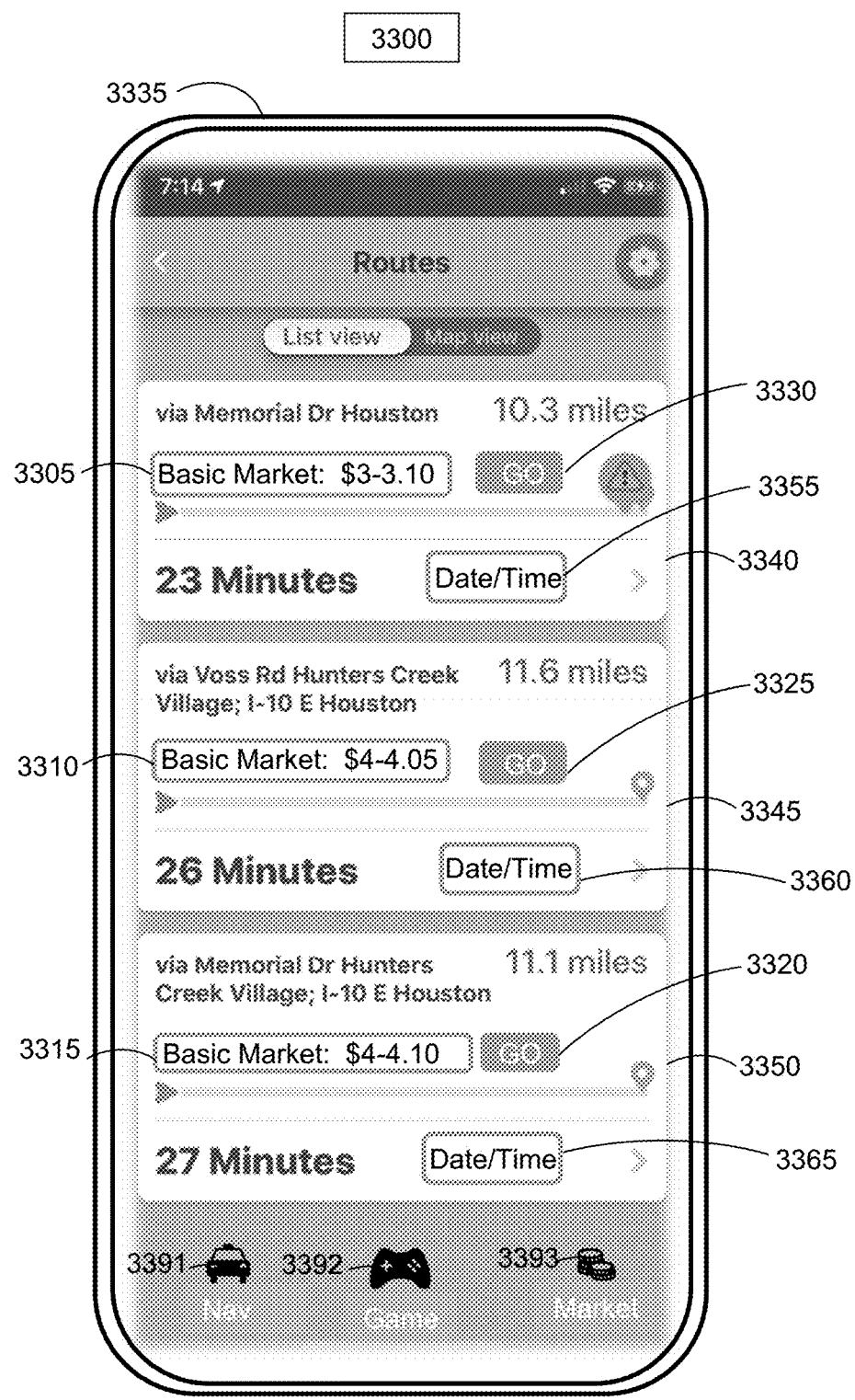
FIG. 33 illustrates an exemplary method and system configuration of the integration interface with GPS map routing such as Waze Maps or other third party map routing software applications.

FIG. 33 illustrates another exemplary network configuration 3300 integrating the disclosed method and system as a layer on another traditional third party map software. In some embodiments, the multi layered network node topology of participating, transacting and/or trading transportation or freight capacity configuration 3300 includes the following accounting elements, or a subset or superset thereof:

exemplary computing device 3335;

exemplary route node structure 3340 to satisfy user route requests with associated time and price;

exemplary alternative route node structure 3345 to satisfy user route request with associated time and price;

exemplary alternative route node structure 3350 to satisfy user route request with associated time and price;

exemplary live auction price value 3305 for price based route 3340;

exemplary navigation mode button 3391;

exemplary game mode button 3392;

exemplary market mode button 3393;

exemplary go 3330 button to transact or modify the price based routing;

exemplary go 3325 button to transact or modify the price based routing;

exemplary go 3320 button to transact or modify the price based routing;

exemplary alternative live auction price value 3310 for route 3345;

exemplary alternative live auction price value 3315 for route 3350;

exemplary date and time modification button 3355 for disclosed route 3340;

exemplary date and time modification button 3360 for disclosed route 3345;

exemplary date and time modification button 3365 for disclosed route 3350;

In some embodiments, map routing interfaces 3335 such as Waze Maps or another third party, may integrate the disclosed method and system to display the transformed forward transportation unit market auction price along a various route given various virtual hub topologies 1800 over the user 110 defined route requests. The computing device 3335 may disclose over visual, audio or other communication methods the forward transportation unit auction price 3305 on a given route 3340. In yet other embodiments, the disclosed transportation unit transformation may communicate the forward transportation unit auction price 3310 of an alternative route 3345 such that a user may select either route 3340 or 3345 or 3350 based on the disclosed method and system price 3305 or 3310 or 3315 which was generated by instructions from a plurality of users between two virtual hubs on the user defined route and instructions to generate a price queue for buyers and sellers of transportation units along given routes. The disclosed forward market transportation unit auction may be communicated on an on demand basis representing the current time and day or on a forward basis by changing the Date/Time 3340, 3360, 3365 user interface button feature to represent the then current market pricing for future time intervals on a plurality of given routes 3340 or 3345 or 3350 along the user requested virtual hub combination. Virtual hubs may represent the end points of a route defined by the user or virtual hubs may represent points along a given route but not including the endpoints or virtual hubs may represent points not along the route the user defined. Virtual hub combinations transform transportation capacity units into a forward market which allow users of the method and system to transact in the physical market by either delivering transportation units as a driver of a vehicle or capacity holder or by receiving them as a passenger or package if the unit is a package rather than a person. A transportation unit represents space which may be filled by a person or a package. Further the forward transportation unit market auction 3305 overlay may be a layer on traditional GPS map routing software or as an alternative to time based routing. The forward transportation unit market specification such as "Basic" 3305 may also have a plurality of other characteristics or levels which form the basis of a fungible contract or substitutable contract between users which is exchangeable with the same terms and conditions if one user is unable to fulfil their contract obligations for the transformed transportation unit. In some embodiments, the navigation mode 3391 may move the user to turn by turn directions along the price based navigation route 3350. In some embodiments, the game mode 3392 may move the user to a game based overlay on the price based navigation route 3340. In some embodiments, the market mode 3393 may move the user to a market based overlay on the priced based navigation route 3350.

The disclosed method and system of a transformed transportation capacity unit may be fully functional as a layer in map routing software 3300 or as a stand alone application 200, 300, etc.

In some embodiments, the disclosed method and system transportation unit auction price 3305 and 3310 and 3315 has two prices or more in other embodiments. Two route prices 3305 are disclosed at $3 and $3.10. The former price of $3 is the price where a user is willing to buy or pay for a transportation unit along the given route 3340. The later price of $3.10 is the price at which a user is willing to sell a transportation unit along the given route 3340. The instructions of the auction may match the highest bidding price of $3 with the lowest selling price in the price queue when the prices match. In other words, in the exemplary embodiment, if a user wanted to sell a transportation unit at the current forward market auction queue 3305 on route 3340, the user would enter a price of $3 which is the current highest bidding price in the method and system queue 3305. By way of further example, another user may desire to buy a transportation unit on the forward transportation unit auction method and system on route 3340, to match, the user would enter a price of $3.10 which is the lowest selling price of a seller on the forward market transportation unit auction method and system.

Figure 34:
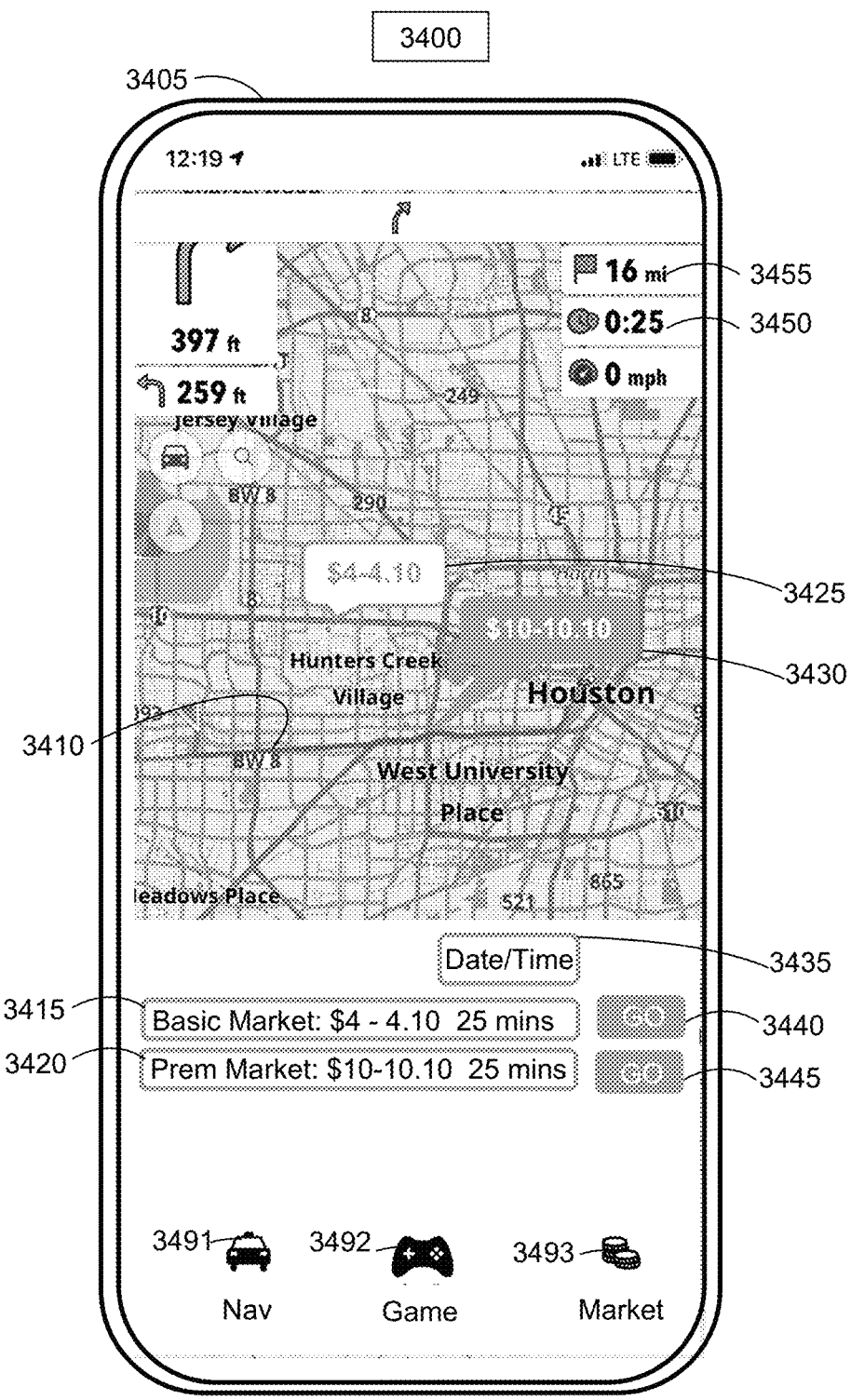
FIG. 34 illustrates an exemplary method and system configuration of the integration interface with GPS map routing such as Open Street Maps or other third party map routing software applications.

FIG. 34 illustrates another exemplary network configuration 3400 integrating the disclosed method and system as a layer on another traditional third party map software. In some embodiments, the multi layered network node topology of participating, transacting and/or trading transportation or freight capacity configuration 3400 includes the following accounting elements, or a subset or superset thereof:
 exemplary computing device 3405;
 exemplary route 3410;
 exemplary live auction price value 3430 for route 3410;
 exemplary alternative live auction price value 3425 for route 3425;
 exemplary navigation mode button 3491;
 exemplary game mode button 3492;
 exemplary market mode button 3493;
 exemplary date and time modification button 3435 for disclosed route 3410;
 exemplary mileage estimate 3455 for disclosed route 3410;
 exemplary route estimate 3450 for disclosed route 3410;
 exemplary transformed forward transportation unit auction value and modification feed 3415 and selection GO 3440 button to transact the given route with a basic transportation unit feature and characteristic for one route 3425 that satisfies the user route request;
 exemplary transformed forward transportation unit auction value and modification feed 3420 and selection GO 3445 button to transact the given route with a premium transportation unit feature and characteristic for one route 3410 that satisfies the user route request;

In some embodiments, the navigation mode 3491 may move the user to turn by turn directions along the price based navigation route 3410. In some embodiments, the game mode 3492 may move the user to a game based overlay on the price based navigation route 3410. In some embodiments, the market mode 3493 may move the user to a market based overlay on the priced based navigation route 3410.

Figure 35:
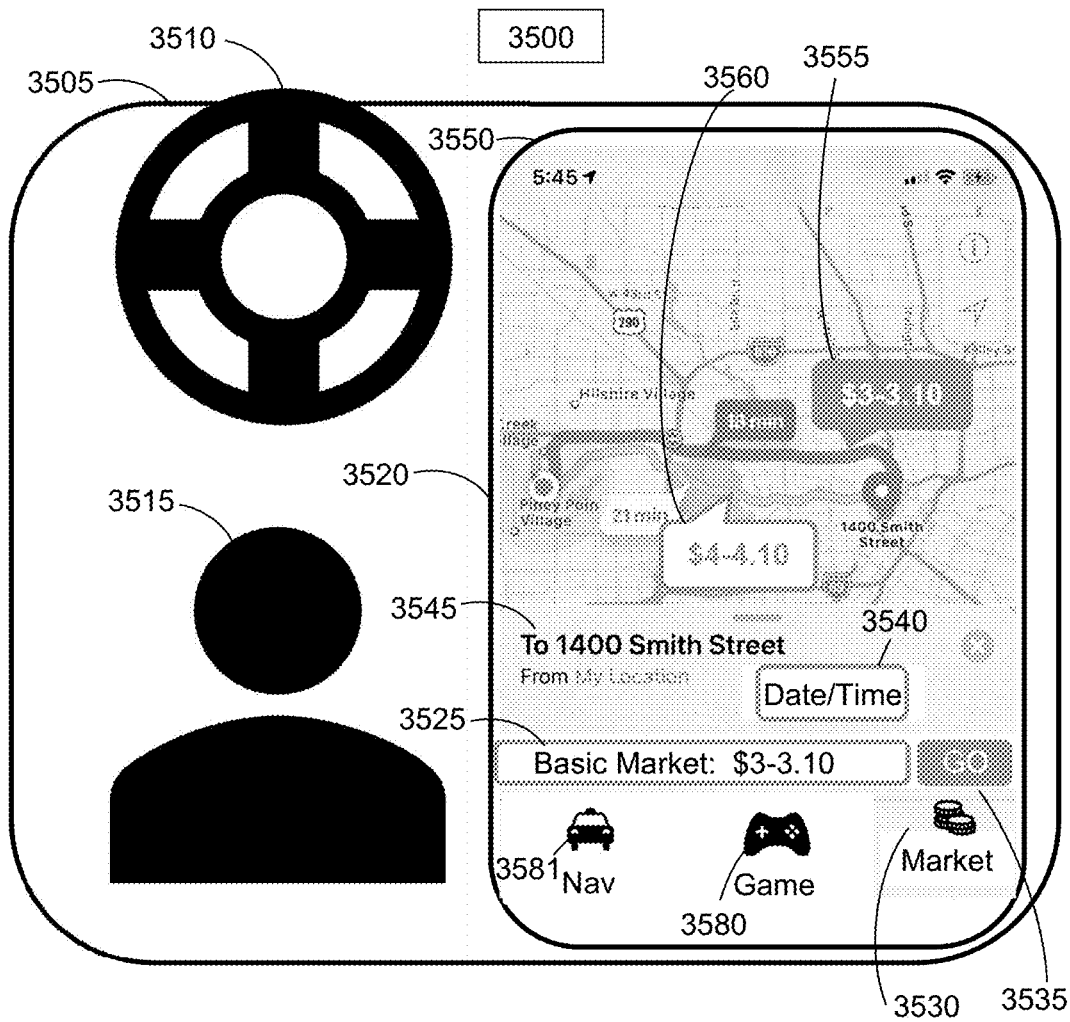
FIG. 35 illustrates an exemplary method and system configuration of the integration interface with GPS map routing in a vehicle such as Tesla, VW, Audi, Daimler, GM, Ford, Honda, Fiat, Nissan, Hyundai, Renault, Suzuki, BMW, Mazda, Dongfeng, Great Wall, Geely, BAIC, Tata, Toyota or any other third party map routing software applications inside a vehicle.

FIG. 35 illustrates another exemplary network configuration 3500 integrating the disclosed method and system as a layer on another traditional third party map software in the setting of a vehicle GPS navigation system. In some embodiments, the multi layered network node topology of participating, transacting and/or trading transportation or freight capacity configuration 3500 includes the following accounting elements, or a subset or superset thereof:
 exemplary computing device 3550;
 exemplary vehicle transportation unit carrier unit 3505;
 exemplary vehicle transportation unit steering wheel 3510;
 exemplary navigation mode button 3581;
 exemplary game mode button 3580;
 exemplary market mode button 3530;
 exemplary user of transportation unit as seller or driver 3515;
 exemplary user route request address information 3545;
 exemplary date and time modification button 3540 for disclosed route 3545;
 exemplary transformed forward transportation unit auction value and modification feed 3525 and selection GO

3535 button to transact the given route with a basic transportation unit feature and characteristic for one route 3545 that satisfies the user route request;

exemplary live auction price value 3555 for price based route 3555;

exemplary live auction price value 3560 for price based alternative route 3560;

exemplary market layer routing overlay 3530;

In some embodiments, the disclosed method and system transportation unit auction market layer may be in a vehicle unit GPS navigation system 3550. In some embodiments, the user 3515 may input driving address instructions 3545 that have an origin location and a destination location. In some embodiments, the user 3515 may communicate with the computing device 3550 through a touchscreen 3520 or and audio interface or another interface. In some embodiments the user 3515 may edit the date/time 3540 button to communicate the market auction price based route 3555 from on demand or current time to a forward time or date. Market auction based pricing 3555 may vary by date and time due to a plurality of market factors. In some embodiments the user 3515 may edit the market based auction price for the transportation units by selecting the market feature button 3525. In some embodiments the user 3515 may select a give transportation unit auction price to transact by selecting the go button 3535. In some embodiments, the navigation mode 3581 may move the user to turn by turn directions along the price based navigation route 3555. In some embodiments, the game mode 3580 may move the user to a game based overlay on the price based navigation route 3555. In some embodiments, the market mode 3530 may move the user to a market based overlay on the priced based navigation route 3555.

In some embodiments, the disclosed method and system transportation unit auction price 3555 and 3560 has two prices or more in other embodiments. Two route prices 3555 are disclosed at $3 and $3.10. The former price of $3 is the price where a user is willing to buy or pay for a transportation unit along the given route 3545. The later price of $3.10 is the price at which a user is willing to sell a transportation unit along the given route 3545. The instructions of the auction may match the highest bidding price of $3 with the lowest selling price in the price queue when the prices match. In other words, in the exemplary embodiment, if a user 3515 wanted to sell a transportation unit at the current forward market auction queue 3555 on route 3545, the user 3515 would enter a price of $3 which is the current highest bidding price in the method and system queue 3555. By way of further example, another user may desire to buy a transportation unit on the forward transportation unit auction method and system on route 3545, to match, the user would enter a price of $3.10 which is the lowest selling price of a seller on the forward market transportation unit auction method and system. In some embodiments, alternative routes based on prices in alternative transportation unit auctions 3560 may have different prices based on supply and demand conditions. In some embodiments the market based routing layer 3530 serves as an alternative to time based routing or mileage based routing which are fundamentally different premises.

Figure 36:
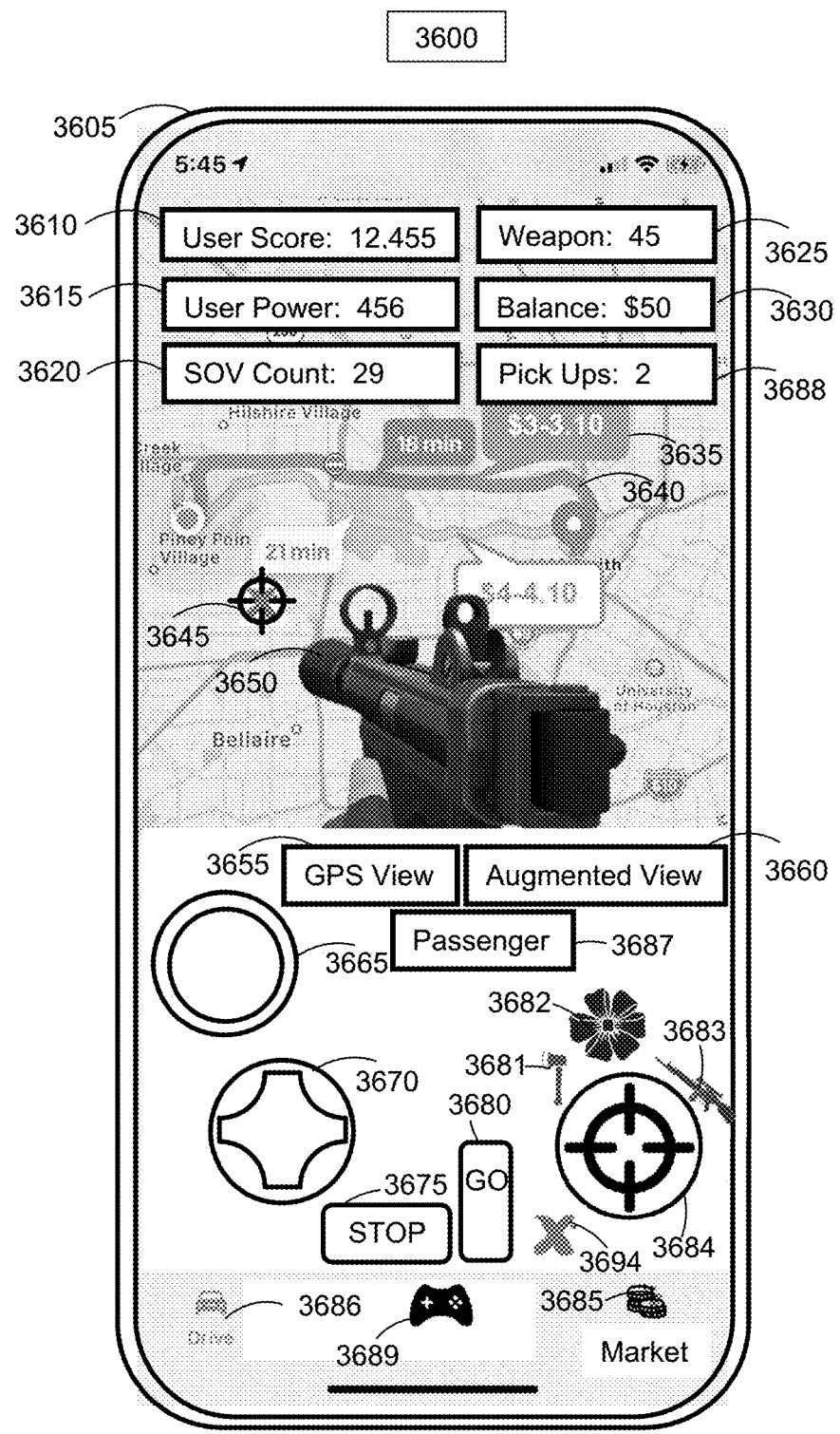
FIG. 36 illustrates an exemplary user interface and database configuration which allow the user to play a strategy based game overlay on the priced based navigation route.

FIG. 36 illustrates another exemplary network configuration 3600 integrating the disclosed method and system as a game layer on another internal mapping system or traditional third party map system in the setting of a mobile computing device. In some embodiments, the multi layered network node topology of participating, transacting and/or trading transportation or freight capacity for price based navigation configuration 3600 includes the following accounting elements, or a subset or superset thereof:

exemplary computing device 3605;
exemplary game overlay user score 3610;
exemplary game overlay user power 3615;
exemplary game overlay SOV (single occupancy vehicle) count 3620;
exemplary game overlay weapon strength 3625;
exemplary game overlay account balance 3630;
exemplary game overlay passenger pick ups 3688;
exemplary game overlay Single Occupancy Vehicle target 3645;
exemplary game overlay Single Occupancy Vehicle weapon 3650;
exemplary game overlay GPS standard map view 3655;
exemplary game overlay augmented or mixed reality view 3660;
exemplary game overlay passenger mode 3687;
exemplary game overlay fire button 3665;
exemplary game overlay multi-purpose direction button 3670;
exemplary game overlay go button 3680;
exemplary game overlay stop button 3675;
exemplary navigation overlay button 3686;
exemplary game overlay button 3689;
exemplary market overlay button 3685;
exemplary market overlay weapon selection button 3683, 3682, 3681, 3694;
exemplary market overlay aim finder toggle 3684.

In some embodiments, the game overlay 3689 awards score and points for destroying the single occupancy vehicle 3620, compute and distribute positive or negative transportation unit game auction strategy points 3610 or power 3615 or rewards 3630 based on any superset combination or subset combination of price 3635, route mileage 3640, number of single occupancy vehicles destroyed or passed 3620, number of passengers 3688, route time estimates 3640, transportation unit route 3640, transportation unit specifications 3415, transportation unit model type 4000 based on model type and age 4000, transportation unit make type 4000, transportation unit age 4000, matched transportation unit specification 800 and 620, matched transportation unit fuel type 4000, matched transportation unit emission specification 4000, cumulative user transportation unit specifications 4100, transportation unit rating 4100, transportation unit safety 4100, transportation unit time 4100, transportation unit delay, transportation unit driver rating 4100, transportation unit rider rating 4100, transportation unit timeliness relative to contract specification 4100.

In some embodiments, the game overlay 3689 may use a plurality of weapon or scoring configurations such as a rifle 3683, an axe 3681, a flower gift 3682, a X logo 3694 to take away points or gain points from other users on the system. In some embodiments the scoring may be independent of other players on the system, but dependent on the users actions in the game overlay 3689. In some embodiments a selected weapon 3650 may be used to destroy single occupancy vehicles. In some embodiments the user may accelerate with the go button 3680 to avoid an attack or fire. In some embodiments the user may slow down or stop with the stop button 3675 to avoid enemy fire or attack. In some embodiments, the stop button 3675 may interface with an autonomous driving system of a vehicle to pick up passengers along a price based navigation route to increase the score of the player 3610 and increase the balances 3630 by earning money on the system. In some embodiments user(s) may be identified by the X logo 3694 or by a person logo who is a bidder on the priced based navigation route 3640 to increase score and balances 3630. In some embodiments user(s) may scan navigation view 3655 or augmented reality view 3660 to look for single occupancy vehicle targets or X logo(s) 3694 or 3645 for users who are bidding on the price based navigation route 3640.

In some embodiments, the strategy of the priced based navigation game overlay is to pick up as many passengers or bidders as possible along the price based navigation route 3640, destroy as many single occupancy vehicles along the price based navigation route 3640 and to give flowers 3682 and rewards to transportation unit providers who have more than one person in the vehicle along the price based navigation route 3640. In some embodiments user(s) may work independently or collectively in tribes to maximize user score in strategy.

Figure 37:
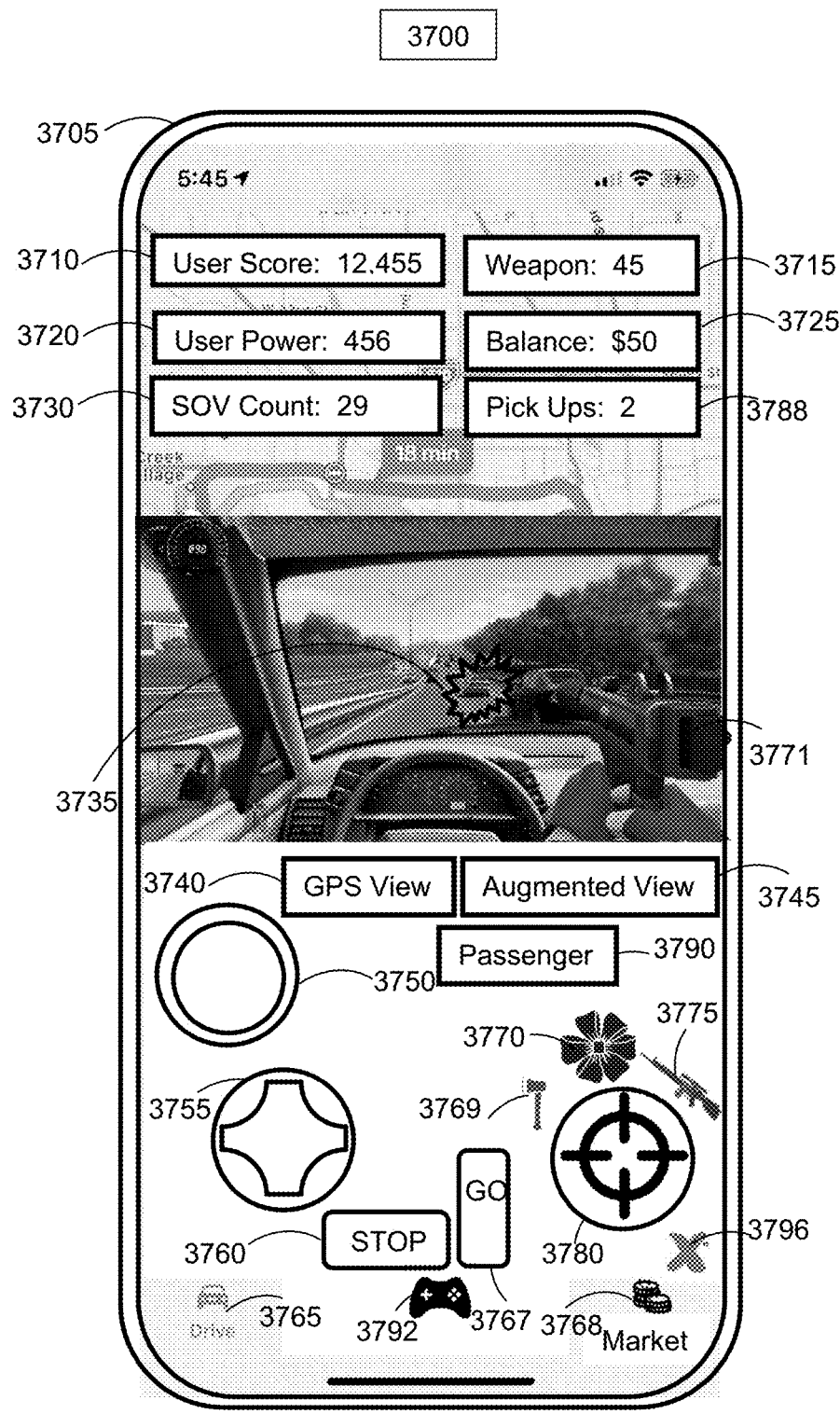
FIG. 37 illustrates an exemplary user interface and database configuration which allow the user to play a strategy based game overlay on the priced based navigation route with augmented reality.

FIG. 37 illustrates another exemplary network configuration 3700 integrating the disclosed method and system as a game layer on another internal mapping navigation system or traditional third party navigation map system in the setting of a mobile computing device. In some embodiments, the multi layered network node topology of participating, transacting and/or trading transportation or freight capacity for price based navigation configuration 3700 includes the following accounting elements, or a subset or superset thereof:

exemplary computing device 3705;
exemplary game overlay user score 3710;
exemplary game overlay user power 3720;
exemplary game overlay SOV (single occupancy vehicle) count 3730;
exemplary game overlay weapon strength 3715;
exemplary game overlay account balance 3725;
exemplary game overlay passenger pick ups 3788;
exemplary game overlay Single Occupancy Vehicle target 3735;
exemplary game overlay Single Occupancy Vehicle weapon 3771;
exemplary game overlay GPS standard map view 3740;
exemplary game overlay augmented or mixed reality view 3745;
exemplary game overlay passenger mode 3790;
exemplary game overlay fire button 3750;
exemplary game overlay multi-purpose direction button 3755;
exemplary game overlay go button 3767;
exemplary game overlay stop button 3760;
exemplary navigation overlay button 3765;
exemplary game overlay button 3792;
exemplary market overlay button 3768;
exemplary market overlay weapon selection button 3775, 3770, 3769, 3796;
exemplary market overlay aim finder toggle 3780.

In some embodiments, the game overlay view 3768 of the price based navigation system 3705 may alert the user to a single occupancy vehicle 3735 which would then be a target for the user to use a weapon 3771, 3775, 3769 to destroy the single occupancy vehicle to increase user score 3710. In some embodiments, the user may identify a vehicle as having more than one passenger in the vehicle and therefore award or gift flowers 3770 to the vehicle or transportation user in the price based navigation game strategy. In some embodiments, the user may use a weapon 3771 against a single occupancy vehicle 3735 at which point the vehicle would explode and the passenger would be left without a vehicle in the augmented reality view 3745 or GPS view 3740. In some embodiments, the user may award flowers 3770 to a vehicle with more than one passenger to increase their score 3710 and the score of the user that has more than one passenger in their vehicle.

Figure 38:
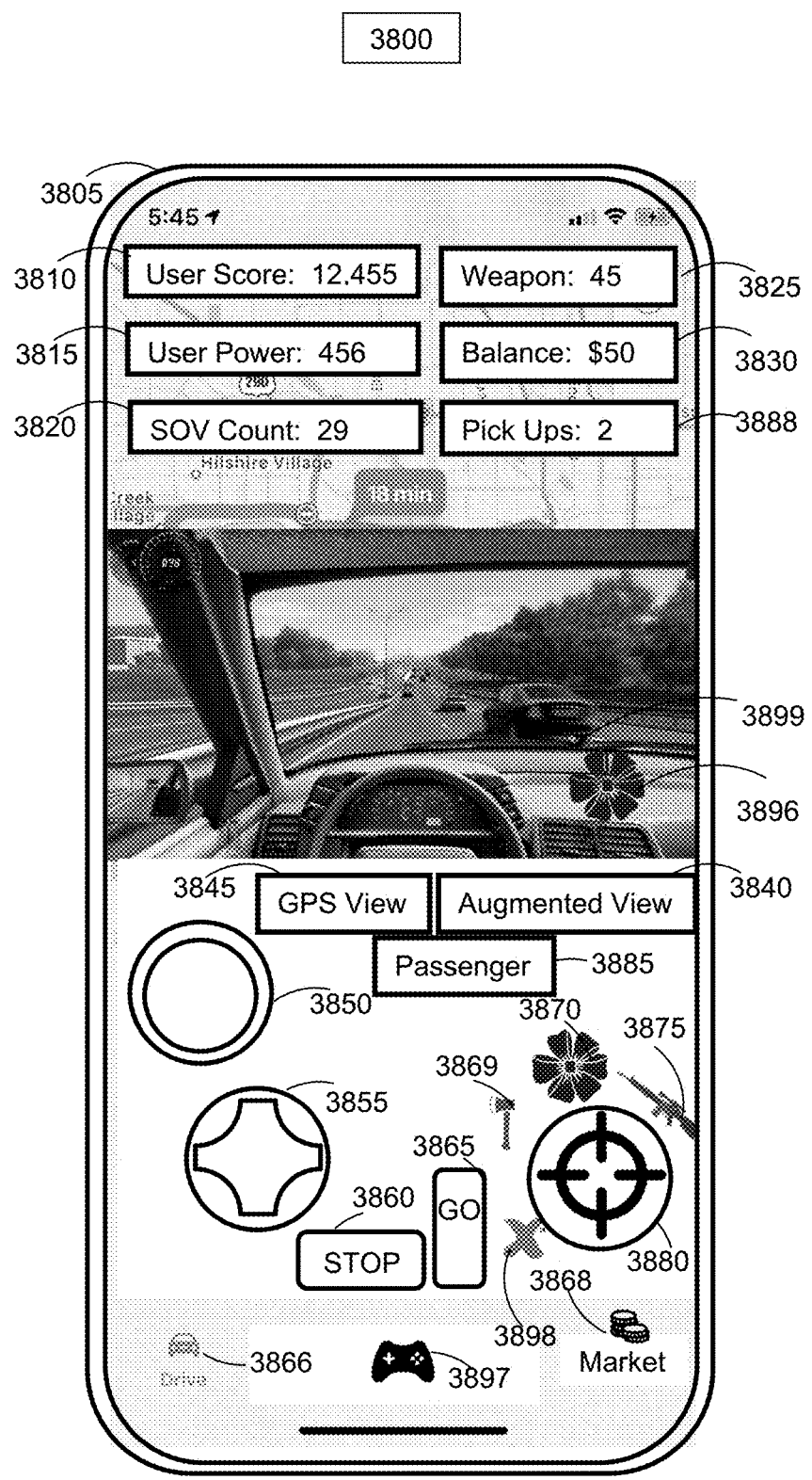
FIG. 38 illustrates an exemplary user interface and database configuration which allow the user to play a strategy based game overlay on the priced based navigation route with augmented reality.

FIG. 38 illustrates another exemplary network configuration 3800 integrating the disclosed method and system as a game layer on another internal mapping navigation system or traditional third party navigation map system in the setting of a mobile computing device. In some embodiments, the multi layered network node topology of participating, transacting and/or trading transportation or freight capacity for price based navigation configuration 3800 includes the following accounting elements, or a subset or superset thereof:

exemplary computing device 3805;
exemplary game overlay user score 3810;
exemplary game overlay user power 3815;
exemplary game overlay SOV (single occupancy vehicle) count 3820;
exemplary game overlay weapon strength 3825;
exemplary game overlay account balance 3830;
exemplary game overlay passenger pick ups 3888;
exemplary game overlay flower gift 3896;
exemplary game overlay GPS standard map view 3845;
exemplary game overlay augmented or mixed reality view 3840;
exemplary game overlay passenger mode 3885;
exemplary game overlay fire button 3850;
exemplary game overlay multi-purpose direction button 3855;
exemplary game overlay go button 3865;
exemplary game overlay stop button 3860;
exemplary navigation overlay button 3866;
exemplary game overlay button 3897;
exemplary market overlay button 3868;
exemplary market overlay weapon selection button 3869, 3870, 3875, 3898;
exemplary market overlay aim finder toggle 3880.

In some embodiments, the game overlay view 3897 of the price based navigation system 3805 may alert the user to a vehicle with more than one passenger 3899 which would then be a way for the user to gift a flower to the other user 3899.

Figure 39:
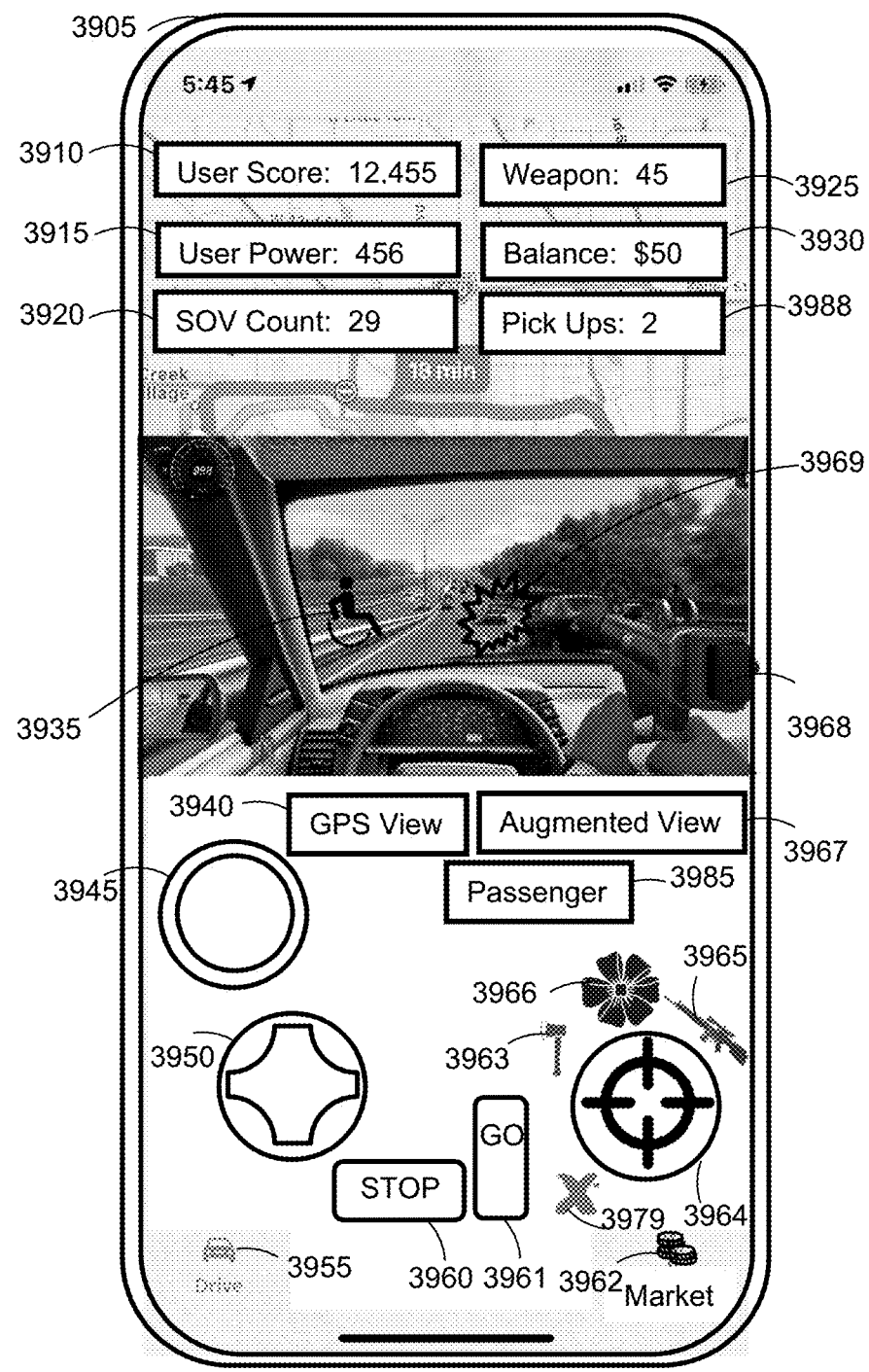
FIG. 39 illustrates an exemplary user interface and database configuration which allow the user to play a strategy based game overlay on the priced based navigation route with augmented reality.

FIG. 39 illustrates another exemplary network configuration 3900 integrating the disclosed method and system as a game layer on another internal mapping navigation system or traditional third party navigation map system in the setting of a mobile computing device. In some embodiments, the multi layered network node topology of participating, transacting and/or trading transportation or freight capacity for price based navigation configuration 3900 includes the following accounting elements, or a subset or superset thereof:

exemplary computing device 3905;
exemplary game overlay user score 3910;
exemplary game overlay user power 3915;
exemplary game overlay SOV (single occupancy vehicle) count 3920;
exemplary game overlay weapon strength 3925;
exemplary game overlay account balance 3930;
exemplary game overlay passenger pick ups 3988;
exemplary game overlay weapon 3968;
exemplary game overlay GPS standard map view 3940;
exemplary game overlay augmented or mixed reality view 3967;
exemplary game overlay passenger mode 3985;
exemplary game overlay fire button 3945;

exemplary game overlay multi-purpose direction button 3950;
exemplary game overlay go button 3961;
exemplary game overlay stop button 3960;
exemplary navigation overlay button 3955;
exemplary market overlay button 3962;
exemplary market overlay weapon selection button 3963, 3966, 3965, 3979;
exemplary market overlay aim finder toggle 3964;
exemplary user in augmented reality view who has had their single occupancy vehicle destroyed 3935.

In some embodiments, the game overlay view 3905 of the price based navigation system 3905 may show a user who has had their single occupancy vehicle destroyed 3935 which increases the score of the user 3910. In some embodiments, the user may target additional single occupancy vehicles 3969 to destroy along the priced based navigation route.

Figure 40:
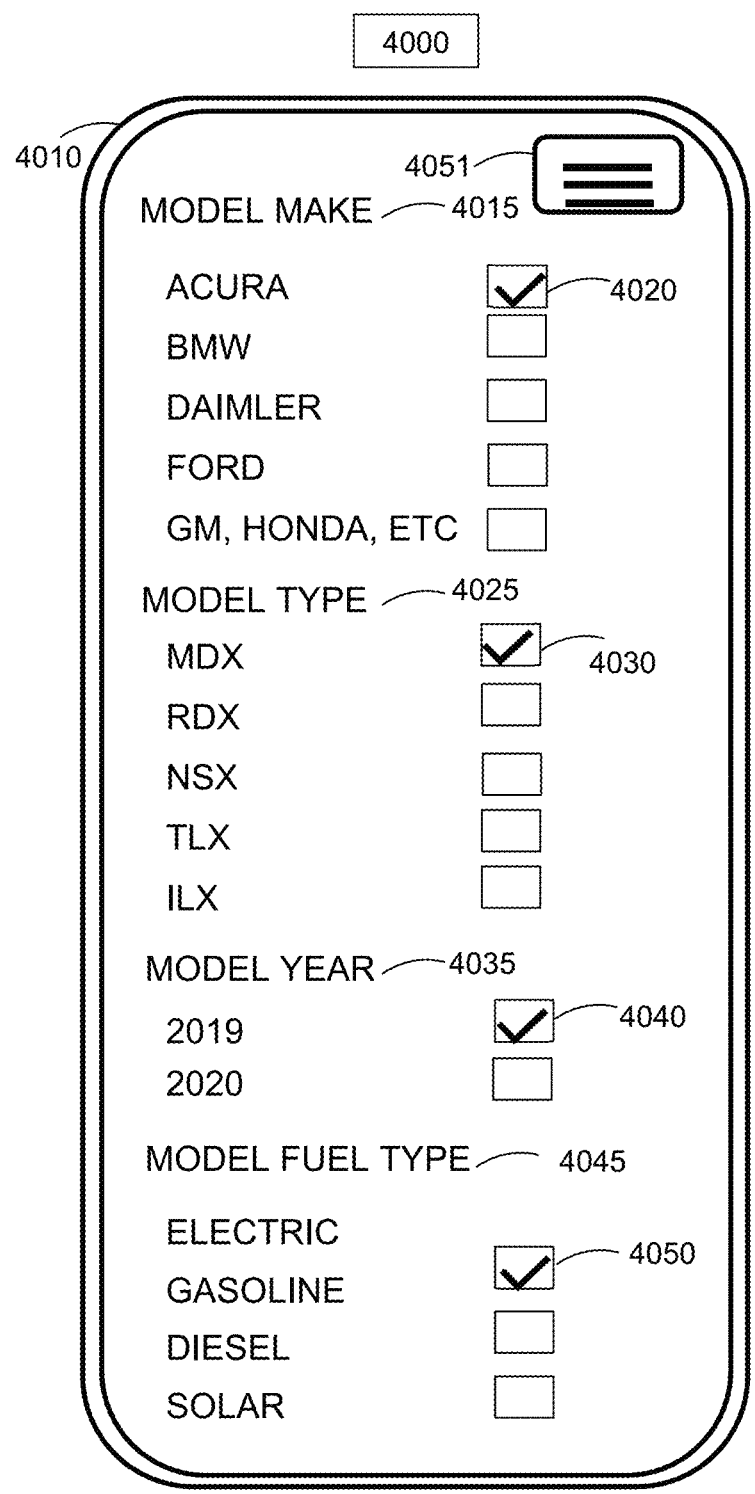
FIG. 40 illustrates an exemplary user interface and database configuration which allow the user to select model, make, type, year, fuel type in configuration for price based navigation.

FIG. 40 illustrates another exemplary network configuration 4000 module of the disclosed method and system which records the vehicle specifications for a given user on the system 4010 in the setting of a mobile computing device. In some embodiments, the multi layered network node topology of participating, transacting and/or trading transportation or freight capacity for price based navigation configuration 4000 includes the following elements, or a subset or superset thereof:

exemplary computing device 4010;
exemplary transportation unit model make 4015;
exemplary transportation unit model type 4025;
exemplary transportation unit model year 4035;
exemplary system menu toggle box 4051;
exemplary transportation unit model fuel type 4045;
exemplary transportation unit model make selection box toggle 4020;
exemplary transportation unit model type selection box toggle 4030;
exemplary transportation unit model year selection box toggle 4040;
exemplary transportation unit model fuel type selection box toggle 4050;

In some embodiments, the disclosed method and system may allow the user to select the model make such as by example an Acura 4020 as a model make 4015. In some embodiments the user may select an unlimited variety of vehicle types in the method and system not limiting the system to those vehicle make 4015 or model 4025 types in FIG. 40. In some embodiments, the user may configure the system for the transportation unit specification model year 4035 or the model fuel type 4045 or a plurality of other vehicle specifications for the purpose of recording specification for the priced based navigation system 4010.

Figure 41:
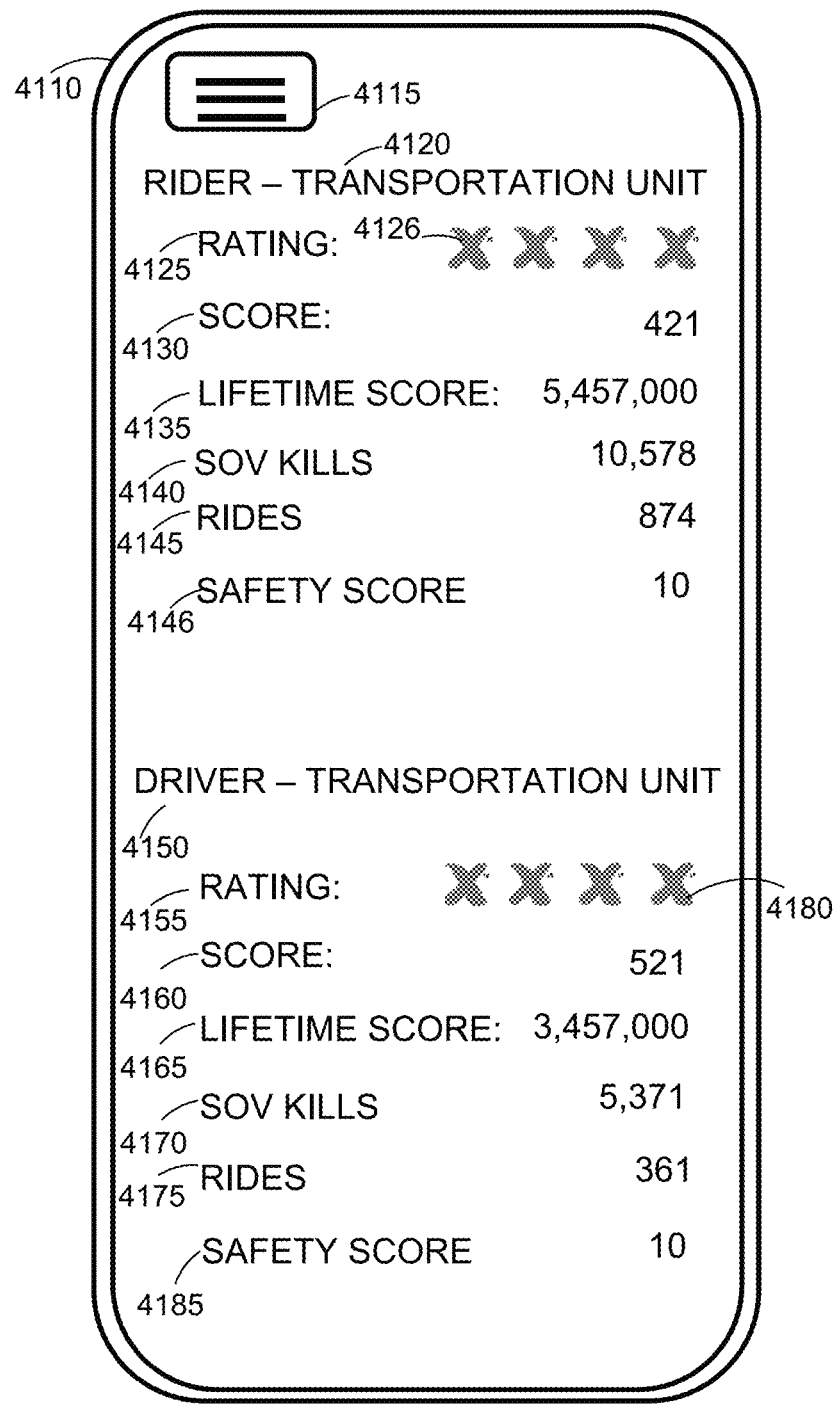
FIG. 41 illustrates an exemplary user interface and database configuration which display a plurality of metrics for the performance of the user in the game overlay and general system and method of priced based navigation.

FIG. 41 illustrates another exemplary network configuration 4100 module of the disclosed method and system which records the rider or driver transportation unit specification ratings for a given user on the system 4110 in the setting of a mobile computing device. In some embodiments, the multi layered network node topology of participating, transacting and/or trading transportation or freight capacity for price based navigation configuration 4100 includes the following elements, or a subset or superset thereof:

exemplary menu toggle box 4115;
exemplary rider transportation unit rating category summary 4120;
exemplary rider transportation unit rating summary 4125;
exemplary rider transportation unit rating X logo amount 4126;
exemplary rider transportation unit rating score for navigation route 4130;
exemplary rider transportation unit rating lifetime score 4135;
exemplary rider transportation unit SOV kills 4140;
exemplary rider transportation unit ride count 4145;
exemplary rider transportation unit ride safety score 4146;
exemplary driver transportation unit rating category summary 4150;
exemplary driver transportation unit rating summary 4155;
exemplary driver transportation unit rating X logo amount 4180;
exemplary driver transportation unit rating score for navigation route 4160;
exemplary driver transportation unit rating lifetime score 4165;
exemplary driver transportation unit SOV kills 5,371;
exemplary driver transportation unit ride count 4175;
exemplary driver transportation unit ride safety score 4185;

In some embodiments the price based navigation system game overlay layer uses a plurality of the aforementioned combinations to account for user actions in the game overlay of the disclosed method and system.

The aforementioned description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
    receiving transportation data from at least a first subset of a plurality of users, wherein the transportation data corresponds to a plurality of transportation vehicles of at least the first subset of the plurality of users, wherein respective transportation data from a respective user of at least the first subset comprises data corresponding to a transportation capacity, a geographic origin, and a geographic destination of a respective transportation vehicle of the respective user, and wherein the transportation capacity corresponds to a seat capacity of the respective transportation vehicle;
    determining a plurality of virtual hubs based on at least the transportation data, wherein the plurality of virtual hubs comprises one or more origin virtual hubs corresponding to at least the geographic origin and one or more destination virtual hubs corresponding to at least the geographic destination;
    determining a plurality of virtual hub routes based on the plurality of virtual hubs, wherein the plurality of virtual hub routes correspond to geographic routes between the one or more origin virtual hubs and the one or more destination virtual hubs;
    generating a plurality of transportation capacity units for at least the first subset of the plurality of users based on the transportation data, wherein a respective transportation capacity unit for the respective user represents a fungible forward contract for the transportation capacity of the respective transportation vehicle traveling along the plurality of virtual hub routes; and generating a transportation forward market platform for trading the plurality of transportation capacity units, comprising:

receiving market depth data from the plurality of users, wherein the market depth data comprises data indicating a plurality of bid prices and a plurality of offer prices provided by the plurality of users for the plurality of transportation capacity units;

generating one or more graphical layers based on the transportation data and at least a subset of the market depth data, wherein the subset of the market depth data comprises:

a first bid price and a first offer price for a first transportation capacity unit, wherein the first transportation capacity unit corresponds to a first transportation vehicle traveling along a first virtual hub route of the plurality of virtual hub routes; and a second bid price and a second offer price for a second transportation capacity unit, wherein the second transportation capacity unit corresponds to a second transportation vehicle traveling along a second virtual hub route of the plurality of virtual hub routes; and transmitting the market depth data to the plurality of users based on the virtual hub routes, wherein transmitting the market depth data comprises transmitting the one or more graphical layers to one or more user devices associated with at least a second subset of the plurality of users, wherein the one or more graphical layers are configured to be superimposed on to a navigational map interface being displayed by a respective user device, and wherein the navigational map interface being displayed includes a visualization of the first virtual hub route and a visualization of the second virtual hub route.

2. The method of claim 1, wherein:

the plurality of bid prices and the plurality of offer prices provided by the plurality of users comprises a plurality of offer prices provided by at least the first subset of the plurality of users;

the plurality of bid prices and the plurality of offer prices provided by the plurality of users comprises a plurality of bid prices provided by at least the second subset of the plurality of users;

the geographic origin for the respective transportation vehicle comprises a geographic location determined using one or more satellite navigation systems, and wherein the geographic origin corresponds to a location of the respective user of at least the first subset; or combinations thereof.

3. The method of claim 1, wherein the first transportation capacity unit corresponds to a first grade specification and the second transportation capacity unit corresponds to a second grade specification, wherein the first grade specification and the second grade specification are different.

4. The method of claim 1, wherein the subset of the market depth data further comprises a third bid price and a third offer price for a third transportation capacity unit, wherein the third transportation capacity unit corresponds to a third transportation vehicle traveling along a third virtual hub route of the plurality of virtual hub routes.

5. The method of claim 1, wherein the fungible forward contract represented by the respective transportation capacity unit comprises:

one or more conditional attributes to provide substitutability with another transportation capacity unit of the plurality of transportation capacity units;

a plurality of contract specifications, wherein the plurality of contract specifications comprises one or more cost of cover specifications, one or more liquidated damages specifications, one or more force majeure specifications, or combinations thereof; or both.

6. The method of claim 1, wherein the subset of the market depth data further comprises a first mileage estimate for the first virtual hub route, a first route time estimate for the first virtual hub route, a second mileage estimate for the second virtual hub route, a second route time estimate for the second virtual hub route, or combinations thereof.

7. The method of claim 1, wherein the one or more user devices comprise one or more vehicle computing systems associated with at least the second subset of the plurality of users, and wherein the one or more vehicle computing systems are configured to display the navigational map interface having the one or more graphical layers superimposed thereon.

8. The method of claim 1, wherein the first bid price corresponds to a highest bid price for the first transportation capacity unit, the first offer price corresponds to a lowest offer price for the first transportation capacity unit, the second bid price corresponds to a highest bid price for the second transportation capacity unit, the second offer price corresponds to a lowest offer price for the second transportation capacity unit, or combinations thereof.

9. The method of claim 1, wherein transmitting the market depth data further comprises:

receiving term specification data from a first user of the plurality of users, wherein the term specification data indicates a selection by the first user of a time period for traveling along the plurality of virtual hub routes; and transmitting the market depth data to the first user based on the received term specification data.

10. The method of claim 1, wherein transmitting the market depth data further comprises:

receiving constraint data from a first user of the plurality of users, wherein the constraint data indicates a selection by the first user of one or more conditions for traveling along the plurality of virtual hub routes, wherein the one or more conditions comprise cheapest route, single mode of transportation, multiple modes of transportation, fastest route, most scenic route, highest rated route, most available route, highest volume of participants for route, most frequent route, service level for route, highest safety and security level for route, gender of driver, security of driver, emissions reduction, rating of driver, or combinations thereof; and transmitting the market depth data to the first user based on the constraint data.

11. The method of claim 1, wherein transmitting the market depth data further comprises:

receiving transportation mode data from a first user of the plurality of users, wherein the transportation mode data indicates one or more selections by the first user of the plurality of transportation vehicles for traveling along the plurality of virtual hub routes, wherein the plurality of transportation vehicles comprise an automobile, an aircraft, an autonomous vehicle, a motorcycle, a bicycle, a boat, a bus, a subway car, a taxicab, a train, a delivery vehicle, or combinations thereof; and transmitting the market depth data to the first user based on the received transportation mode data.

12. A method, comprising:
receiving transportation data from at least a first subset of a plurality of users, wherein the transportation data corresponds to a plurality of transportation vehicles of at least the first subset of the plurality of users, and wherein respective transportation data from a respective user of at least the first subset comprises data corresponding to a freight capacity, a geographic origin, and a geographic destination of a respective transportation vehicle of the respective user, and wherein the freight capacity corresponds to a cargo capacity of the respective transportation vehicle;
determining a plurality of virtual hubs based on at least the transportation data, wherein the plurality of virtual hubs comprises one or more origin virtual hubs corresponding to at least the geographic origin and one or more destination virtual hubs corresponding to at least the geographic destination;
determining a plurality of virtual hub routes based on the plurality of virtual hubs, wherein the plurality of virtual hub routes correspond to geographic routes between the one or more origin virtual hubs and the one or more destination virtual hubs;
generating a plurality of freight capacity units for at least the first subset of the plurality of users based on the transportation data, wherein a respective freight capacity unit for the respective user represents a fungible forward contract for the cargo capacity of the respective transportation vehicle traveling along the plurality of virtual hub routes; and
generating a transportation forward market platform for trading the plurality of freight capacity units, comprising:
  receiving market depth data from the plurality of users, wherein the market depth data comprises data indicating a plurality of bid prices and a plurality of offer prices provided by the plurality of users for the plurality of freight capacity units;
  generating one or more graphical layers based on the transportation data and at least a subset of the market depth data, wherein the subset of the market depth data comprises:
    a first bid price and a first offer price for a first freight capacity unit, wherein the first freight capacity unit corresponds to a first transportation vehicle traveling along a first virtual hub route of the plurality of virtual hub routes; and
    a second bid price and a second offer price for a second freight capacity unit, wherein the second freight capacity unit corresponds to a second transportation vehicle traveling along a second virtual hub route of the plurality of virtual hub routes; and
  transmitting the market depth data to the plurality of users based on the virtual hub routes, wherein transmitting the market depth data comprises transmitting the one or more graphical layers to one or more user devices associated with at least a second subset of the plurality of users, wherein the one or more graphical layers are configured to be superimposed on to a navigational map interface being displayed by a respective user device, and wherein the navigational map interface being displayed includes a visualization of the first virtual hub route and a visualization of the second virtual hub route.

13. The method of claim 12, wherein:
the plurality of bid prices and the plurality of offer prices provided by the plurality of users comprises a plurality of offer prices provided by at least the first subset of the plurality of users;
the plurality of bid prices and the plurality of offer prices provided by the plurality of users comprises a plurality of bid prices provided by at least the second subset of the plurality of users;
the geographic origin for the respective transportation vehicle comprises a geographic location determined using one or more satellite navigation systems, and wherein the geographic origin corresponds to a location of the respective user of at least the first subset; or combinations thereof.

14. The method of claim 12, wherein the first freight capacity unit corresponds to a first grade specification and the second freight capacity unit corresponds to a second grade specification, wherein the first grade specification and the second grade specification are different.

15. The method of claim 12, wherein the subset of the market depth data further comprises a third bid price and a third offer price for a third freight capacity unit, wherein the third freight capacity unit corresponds to a third transportation vehicle traveling along a third virtual hub route of the plurality of virtual hub routes.

16. The method of claim 12, wherein the fungible forward contract represented by the respective freight capacity unit comprises:
one or more conditional attributes to provide substitutability with another freight capacity unit of the plurality of freight capacity units;
a plurality of contract specifications, wherein the plurality of contract specifications comprises one or more cost of cover specifications, one or more liquidated damages specifications, one or more force majeure specifications, or combinations thereof; or
both.

17. The method of claim 12, wherein the subset of the market depth data further comprises a first mileage estimate for the first virtual hub route, a first route time estimate for the first virtual hub route, a second mileage estimate for the second virtual hub route, a second route time estimate for the second virtual hub route, or combinations thereof.

18. The method of claim 12, wherein the one or more user devices comprise one or more vehicle computing systems associated with at least the second subset of the plurality of users, and wherein the one or more vehicle computing systems are configured to display the navigational map interface having the one or more graphical layers superimposed thereon.

19. A computing system, comprising:
one or more processors; and
at least one memory comprising program instructions executable by the one or more processors to:
  receive transportation data from at least a first subset of plurality of users, wherein the transportation data corresponds to a plurality of transportation vehicles of at least the first subset of the plurality of users, wherein respective transportation data from a respective user of at least the first subset comprises data corresponding to a transportation capacity, a geographic origin, and a geographic destination of a respective transportation vehicle of the respective user;
  determine a plurality of virtual hubs based on at least the transportation data, wherein the plurality of virtual hubs comprises one or more origin virtual hubs corresponding to at least the geographic origin and one or more destination virtual hubs corresponding to at least the geographic destination;

determine a plurality of virtual hub routes based on the plurality of virtual hubs, wherein the plurality of virtual hub routes correspond to geographic routes between the one or more origin virtual hubs and the one or more destination virtual hubs;

generate a plurality of transportation capacity units for at least the first subset of the plurality of users based on the transportation data, wherein a respective transportation capacity unit for the respective user represents a fungible forward contract for the transportation capacity of the respective transportation vehicle traveling along the plurality of virtual hub routes; and generate a transportation forward market platform for trading the plurality of transportation capacity units, comprising:

receive market depth data from the plurality of users, wherein the market depth data comprises data indicating a plurality of bid prices and a plurality of offer prices provided by the plurality of users for the plurality of transportation capacity units;

generate one or more graphical layers based on the transportation data and at least a subset of the market depth data, wherein the subset of the market depth data comprises:

a first bid price and a first offer price for a first transportation capacity unit, wherein the first transportation capacity unit corresponds to a first transportation vehicle traveling along a first virtual hub route of the plurality of virtual hub routes; and a second bid price and a second offer price for a second transportation capacity unit, wherein the second transportation capacity unit corresponds to a second transportation vehicle traveling along a second virtual hub route of the plurality of virtual hub routes; and transmit the market depth data to the plurality of users based on the virtual hub routes, wherein transmit the market depth data comprises transmit the one or more graphical layers to one or more user devices associated with at least a second subset of the plurality of users, wherein the one or more graphical layers are configured to be superimposed on to a navigational map interface being displayed by a respective user device, and wherein the navigational map interface being displayed includes a visualization of the first virtual hub route and a visualization of the second virtual hub route.

20. The computing system of claim 19, wherein:

the plurality of bid prices and the plurality of offer prices provided by the plurality of users comprises a plurality of offer prices provided by at least the first subset of the plurality of users;

the plurality of bid prices and the plurality of offer prices provided by the plurality of users comprises a plurality of bid prices provided by at least the second subset of the plurality of users;

the geographic origin for the respective transportation vehicle comprises a geographic location determined using one or more satellite navigation systems, and wherein the geographic origin corresponds to a location of the respective user of at least the first subset; or combinations thereof.

\* \* \* \* \*